(12) United States Patent
Sato

(10) Patent No.: US 10,911,772 B2
(45) Date of Patent: Feb. 2, 2021

(54) IMAGE PROCESSING DEVICE AND METHOD

(71) Applicant: Velos Media, LLC, Plano, TX (US)

(72) Inventor: Kazushi Sato, Kanagawa (JP)

(73) Assignee: Velos Media, LLC, Dallas, TX (US)

( * ) Notice: Subject to any disclaimer, the term of this patent is extended or adjusted under 35 U.S.C. 154(b) by 156 days.

(21) Appl. No.: 15/914,264

(22) Filed: Mar. 7, 2018

(65) Prior Publication Data

US 2018/0199056 A1   Jul. 12, 2018

Related U.S. Application Data

(63) Continuation of application No. 15/337,602, filed on Oct. 28, 2016, now Pat. No. 9,979,981, which is a
(Continued)

(30) Foreign Application Priority Data

Sep. 30, 2009   (JP) .................................. 2009-226220

(51) Int. Cl.
*G06K 9/36* (2006.01)
*H04N 19/52* (2014.01)
(Continued)

(52) U.S. Cl.
CPC ............... *H04N 19/52* (2014.11); *G06T 9/00* (2013.01); *H04N 19/105* (2014.11);
(Continued)

(58) Field of Classification Search
CPC ...... H04N 19/52; H04N 19/70; H04N 19/159; H04N 19/15; H04N 19/124; H04N 19/122;
(Continued)

(56) References Cited

U.S. PATENT DOCUMENTS

| | | | |
|---|---|---|---|
| 8,059,713 B2 | 11/2011 | Kazui et al. | |
| 8,744,182 B2 | 6/2014 | Sato | |

(Continued)

FOREIGN PATENT DOCUMENTS

| | | |
|---|---|---|
| CN | 1155218 | 7/1997 |
| CN | 1047055 | 1/1999 |

(Continued)

OTHER PUBLICATIONS

Draft ISO/IEC 14496-10 : 2002 (E), Joint Video Team (JVT) of ISO/IEC MPEG & ITU-T VCEG (ISO/IEC JTC1/SC29/WG11 and ITU-T SG16 Q.6), Wiegand, "Draft ITU-T Recommendation and Final Draft International Standard of Joint Video Specification (ITU-T Rec. H.264 | ISO/IEC 14496-10 AVC)", $8^{th}$ Meeting: Geneva, Switzerland, May 23-27, 2003.

(Continued)

*Primary Examiner* — Amara Abdi
(74) *Attorney, Agent, or Firm* — Nixon & Vanderhye P.C.

(57) ABSTRACT

The present invention relates to an image processing device and method, which realize improvement in encoding efficiency for color difference signals and reduction in address calculations for memory access. In a case where a block size of orthogonal transform is 4×4, and a macroblock of luminance signals is configured of four 4×4 pixel blocks appended with 0 through 1, the four luminance signal blocks are corresponded with one color difference signal 4×4 block appended with C. At this time, there exist four motion vector information of $mv_0$, $mv_1$, $mv_2$, and $mv_3$, as to the four luminance signal blocks. The motion vector information $mv_c$ of the one color difference signal 4×4 block is calculated by averaging processing using these four motion vector information. The present invention can be applied to an image encoding device which performed encoding based on the H.264/AVC format, for example.

6 Claims, 28 Drawing Sheets

Related U.S. Application Data continuation of application No. 14/602,497, filed on Jan. 22, 2015, now Pat. No. 9,544,644, which is a continuation of application No. 14/195,990, filed on Mar. 4, 2014, now Pat. No. 9,503,748, which is a continuation of application No. 13/498,096, filed as application No. PCT/JP2010/066388 on Sep. 22, 2010, now Pat. No. 8,744,182.

(51) Int. Cl.
| | |
|---|---|
| H04N 19/56 | (2014.01) |
| H04N 19/105 | (2014.01) |
| H04N 19/51 | (2014.01) |
| H04N 19/196 | (2014.01) |
| H04N 19/186 | (2014.01) |
| G06T 9/00 | (2006.01) |
| H04N 19/513 | (2014.01) |
| H04N 19/547 | (2014.01) |
| H04N 19/117 | (2014.01) |
| H04N 19/122 | (2014.01) |
| H04N 19/124 | (2014.01) |
| H04N 19/15 | (2014.01) |
| H04N 19/159 | (2014.01) |
| H04N 19/70 | (2014.01) |
| H04N 19/176 | (2014.01) |
| H04N 19/182 | (2014.01) |

(52) U.S. Cl.
CPC ......... *H04N 19/117* (2014.11); *H04N 19/122* (2014.11); *H04N 19/124* (2014.11); *H04N 19/15* (2014.11); *H04N 19/159* (2014.11); *H04N 19/186* (2014.11); *H04N 19/196* (2014.11); *H04N 19/51* (2014.11); *H04N 19/513* (2014.11); *H04N 19/547* (2014.11); *H04N 19/56* (2014.11); *H04N 19/70* (2014.11); *H04N 19/176* (2014.11); *H04N 19/182* (2014.11)

(58) Field of Classification Search
CPC .. H04N 19/117; H04N 19/547; H04N 19/513; H04N 19/186; H04N 19/196; H04N 19/51; H04N 19/105; H04N 19/56; H04N 19/182; H04N 19/176; G06T 9/00
See application file for complete search history.

(56) References Cited

U.S. PATENT DOCUMENTS

| | | | |
|---|---|---|---|
| 9,503,748 | B2 | 11/2016 | Sato |
| 9,544,644 | B2 | 1/2017 | Sato |
| 2004/0233993 | A1 | 11/2004 | Johansen et al. |
| 2005/0053294 | A1* | 3/2005 | Mukerjee ............ H04N 19/184 382/236 |
| 2006/0008038 | A1 | 1/2006 | Song et al. |
| 2008/0056376 | A1* | 3/2008 | Bjontegaard ........ H04N 19/109 375/240.24 |
| 2008/0219350 | A1 | 9/2008 | Guo et al. |
| 2009/0073319 | A1 | 3/2009 | Neuman |
| 2010/0086032 | A1 | 4/2010 | Chen et al. |
| 2010/0226429 | A1 | 9/2010 | Lee |
| 2012/0140830 | A1* | 6/2012 | Xu .................. H04N 19/46 375/240.18 |

FOREIGN PATENT DOCUMENTS

| | | |
|---|---|---|
| CN | 1795681 | 6/2006 |
| CN | 101164336 | 4/2008 |
| EP | 0 779 744 | 6/1997 |
| JP | 05-308662 | 11/1993 |
| JP | 06-189297 | 7/1994 |
| JP | 06-311533 | 11/1994 |
| JP | 07-236159 | 9/1995 |
| JP | 2000-023190 | 1/2000 |
| JP | 2004-254327 | 9/2004 |
| JP | 2007-502595 | 2/2007 |
| JP | 2008-172599 | 7/2008 |
| WO | WO 2004/105399 | 12/2004 |
| WO | WO2006/114945 | 11/2006 |
| WO | WO2008/032660 | 1/2010 |
| WO | WO2010/001918 | 1/2010 |

OTHER PUBLICATIONS

Translation of Chinese Office Action issued in Appln. No. 201410809336.2 dated May 2, 2017.
Translation of Chinese Office Action issued in Appln. No. 201410815270.8 dated May 17, 2017.
Apr. 3, 2014, JP communication issued for related JP application No. 2013-065323.
Dec. 18, 2012, Japanese Office Action for JP 2009-226220.
Chenn, Peisong, et al., "Video Coding Using Extended Block Sizes", Qualcomm Inc., International Telecommunication Union, Telecommunication Standardization Section, Sep. 30, 2009, pp. 1-4.
Feb. 25, 2014, JP Office Action for related Japanese application No. 2013-065323.
(The video Road-color subsampling, or what is 4:4:4 or 4:2:2, Adobe Biogs, Jun. 28, 2010).
Nov. 12, 2015, JP communication issued for related JP application No. 2014-048334.
Feb. 5, 2015, JP communication issued for related JP application No. 2014-048334.
Oct. 2, 2014, JP communication issued for related JP application No. 2013-065323.
Yuri Vatis, Prediction of P-and B Frames Using A Two-dimensional Non-separable Adaptive Wiener Interpolation Filter for H.264/AVC, ITU—Telecommunications Standardization Sector, Video Coding Experts Group (VCEG), Oct. 23-27, 2006, pp. 1-13, 20th Meeting: Hangzhou, CN.
Advanced video coding for generic audiovisual services, ITU-T Telecommunication Standardization Sector of ITU Series H: Audiovisual and Multimedia Systems, Infrastructure of audiovisual services—Coding of moving video H.264 Nov. 2007.
Oct. 29, 2015, JP communication issued for related JP application No. 2014-22006.
Notice of Allowance dated Dec. 6, 2017 in U.S. Appl. No. 15/337,602.
Office Action dated Jun. 7, 2017 in U.S. Appl. No. 15/337,602.
Notice of Allowance dated Sep. 16, 2016 in U.S. Appl. No. 14/602,497.
Office Action dated Jul. 13, 2016 in U.S. Appl. No. 14/602,497.
Advisory Action dated Feb. 2, 2016 in U.S. Appl. No. 14/602,497.
Final Office Action dated Nov. 23, 2015 in U.S. Appl. No. 14/602,497.
Office Action dated Jun. 19, 2015 in U.S. Appl. No. 14/602,497.
Notice of Allowance dated Aug. 2, 2016 in U.S. Appl. No. 14/195,990.
Advisory Action dated Jul. 18, 2016 in U.S. Appl. No. 14/195,990.
Advisory Action dated Apr. 11, 2016 in U.S. Appl. No. 14/195,990.
Final Office Action dated Feb. 1, 2016 in U.S. Appl. No. 14/195,990.
Office Action dated Nov. 18, 2015 in U.S. Appl. No. 14/195,990.
Advisory Action dated Oct. 13, 2015 in U.S. Appl. No. 14/195,990.
Final Office Action dated Jul. 30, 2015 in U.S. Appl. No. 14/195,990.
Office Action dated Apr. 24, 2015 in U.S. Appl. No. 14/195,990.
Notice of Allowance dated Dec. 3, 2014 in U.S. Appl. No. 14/195,990.
Office Action dated Sep. 23, 2014 in U.S. Appl. No. 14/195,990.
Notice of Allowance dated Jan. 29, 2014 in U.S. Appl. No. 13/498,096.
ITU-T Recommendation H.263, "Video Coding for Low Bit Rate Communication." Transmission of Non-Telephone Signals, ITU-T Study Group 15, Geneva, Mar. 1996.

* cited by examiner

| A | e₁ | b |   | A |
|---|----|---|---|---|
|   | e₂ | e₃|   |   |
| d |    | c |   | d |
|   |    |   |   |   |
| A |    | b |   | A |

IMAGE PROCESSING DEVICE AND METHOD

CROSS-REFERENCE TO PRIOR APPLICATION

This application is a continuation of U.S. patent application Ser. No. 15/337,602 (filed on Oct. 28, 2016), which is a continuation of U.S. patent application Ser. No. 14/602,497 (filed on Jan. 22, 2015 and issued as U.S. Pat. No. 9,544,644 on Jan. 10, 2017), which is a continuation of U.S. patent application Ser. No. 14/195,990 (filed on Mar. 4, 2014 and issued as U.S. Pat. No. 9,503,748 on Nov. 22, 2016), which is a continuation of U.S. patent application Ser. No. 13/498,096 (filed on Mar. 23, 2012 and issued as U.S. Pat. No. 8,744,182 on Jun. 3, 2014) which is a National Stage Patent Application of PCT International Patent Application No. PCT/JP2010/066388 (filed on Sep. 22, 2010) under U.S.C. § 371, which claims priority to Japanese Patent Application No. 2009-226220 (filed on Sep. 30, 2009), which are all hereby incorporated by reference in their entirety.

TECHNICAL FIELD

The present invention relates to an image processing device and method, and specifically relates to an image processing device and method which realize improvement in encoding efficiency for color difference signals and reduction in address calculations for memory access.

BACKGROUND ART

In recent years, devices have come into widespread use which subject an image to compression encoding by employing an encoding format handling image information as digital, and at this time compress the image by orthogonal transform such as discrete cosine transform or the like and motion compensation, taking advantage of redundancy which is a feature of the image information, in order to perform highly efficient transmission and storage of information. Examples of this encoding format include MPEG (Moving Picture Experts Group) and so forth.

In particular, MPEG2 (ISO/IEC 13818-2) is defined as a general-purpose image encoding format, and is a standard encompassing both of interlaced scanning images and sequential-scanning images, and standard resolution images and high definition images. For example, MPEG2 has widely been employed now by broad range of applications for professional usage and for consumer usage. By employing the MPEG2 compression format, a code amount (bit rate) of 4 through 8 Mbps is allocated in the event of an interlaced scanning image of standard resolution having 720×480 pixels, for example. By employing the MPEG2 compression format, a code amount (bit rate) of 18 through 22 Mbps is allocated in the event of an interlaced scanning image of high resolution having 1920×1088 pixels, for example. Thus, a high compression rate and excellent image quality can be realized.

MPEG2 has principally been aimed at high image quality encoding adapted to broadcasting usage, but does not handle lower code amount (bit rate) than the code amount of MPEG1, i.e., an encoding format having a higher compression rate. It is expected that demand for such an encoding format will increase from now on due to the spread of personal digital assistants, and in response to this, standardization of the MPEG4 encoding format has been performed. With regard to an image encoding format, the specification thereof was confirmed as international standard as ISO/IEC 14496-2 in December in 1998.

Further, in recent years, standardization of a standard called H.26L (ITU-T Q6/16 VCEG) has progressed with image encoding for television conference usage as the object. With H.26L, it has been known that though greater computation amount is requested for encoding and decoding thereof as compared to a conventional encoding format such as MPEG2 or MPEG4, higher encoding efficiency is realized. Also, currently, as part of activity of MPEG4, standardization for taking advantage of a function that is not supported by H.26L with this H.26L taken as base to realize higher encoding efficiency has been performed as Joint Model of Enhanced-Compression Video Coding. As a schedule of standardization, H.264 and MPEG-4 Part10 (Advanced Video Coding, hereafter referred to as H.264/AVC) become an international standard in March, 2003.

Further, as an extension thereof, standardization of FRExt (Fidelity Range Extension) including a coding tool necessary for business use such as RGB, 4:2:2, or 4:4:4, 8×8 DCT and quantization matrix stipulated by MPEG-2 has been completed as of February 2005. Accordingly, H.264/AVC can be used as an encoding format capable of suitably expressing even film noise included in movies, and has come to be employed for wide ranging applications such as Blu-Ray Disc (registered trademark) and so forth.

However, nowadays, needs for further high-compression encoding have been increased, such as intending to compress an image having around 4000×2000 pixels, which is quadruple of a high-vision image, or alternatively, needs for further high-compression encoding have been increased, such as intending to distribute a high-vision image within an environment with limited transmission capacity like the Internet. Therefore, with VCEG (=Video Coding Expert Group) under the control of ITU-T mentioned above, studies relating to improvement of encoding efficiency have continuously been performed.

Now, with motion prediction compensation according to the H.264/AVC format, prediction efficiency is improved by performing prediction/compensation processing with quarter-pixel precision.

For example, with the MPEG2 format, half-pixel precision motion prediction/compensation processing is performed by linear interpolation processing. On the other hand, with the H.264/AVC format, quarter-pixel precision prediction/compensation processing using a 6-tap FIR (Finite Impulse Response Filter) filter as an interpolation filter is performed.

FIG. 1 is a diagram for describing prediction/compensation processing of quarter-pixel precision with the H.264/AVC format. With the H.264/AVC format, quarter-pixel precision prediction/compensation processing is performed using 6-tap FIR (Finite Impulse Response Filter) filter.

In the example in FIG. 1, a position A indicates integer-precision pixel positions, positions b, c, and d indicate half-pixel precision positions, and positions e1, e2, and e3 indicate quarter-pixel precision positions. First, in the following Clip( ) is defined as in the following Expression (1).

[Mathematical Expression 1]

$$Clip1(a) = \begin{cases} 0; & \text{if}(a < 0) \\ a; & \text{otherwise} \\ max\_pix; & \text{if}(a > max\_pix) \end{cases} \quad (1)$$

Note that in the event that the input image is of 8-bit precision, the value of max_pix is 255.

The pixel values at positions b and d are generated as with the following Expression (2), using a 6-tap FIR filter.

[Mathematical Expression 2]

$$F = A_{-2} - 5 \cdot A_{-1} + 20 \cdot A_0 + 20 \cdot A_1 - 5 \cdot A_2 + A_3, d = \text{Clip1}((F+16) \gg 5) \quad (2)$$

The pixel value at the position c is generated as with the following Expression (3), using a 6-tap FIR filter in the horizontal direction and vertical direction.

[Mathematical Expression 3]

$$F = b_{-2} - 5 \cdot b_{-1} + 20 \cdot b_0 + 20 \cdot b_1 - 5 \cdot b_2 + b_3$$

or $$F = d_{-2} - 5 \cdot d_{-1} + 20 \cdot d_0 + 20 \cdot d_1 - 5 \cdot d_2 + d_3, c = \text{Clip1}((F+512) \gg 10) \quad (3)$$

Note that Clip processing is performed just once at the end, following having performed product-sum processing in both the horizontal direction and vertical direction.

The positions e1 through e3 are generated by linear interpolation as with the following Expression (4).

[Mathematical Expression 4]

$$e_1 = (A+b+1) \gg 1$$

$$e_2 = (b+d+1) \gg 1$$

$$e_3 = (b+c+1) \gg 1 \quad (4)$$

FIG. 2 is a diagram describing prediction/compensation processing relating to color difference signals with the H.264/AVC format. With the H.264/AVC format, quarter-pixel prediction/compensation processing is performed as described above with reference to FIG. 1, but in the case of 4:2:0 signals, ⅛-pixel precision prediction/compensation processing is performed regarding color difference signals.

In the example in FIG. 2, the black dots are pixels of integer-pixel precision stored in frame memory, and the A through D given to the black dots represent the pixel values of the pixels. If we say that the position ($d^x$, $d^y$) of a white dot is a position indicated by motion vector information in ⅛-pixel precision within a rectangular region surrounded by the pixels indicated by A through D, a prediction pixel value v at the position of the white dot is generated as with the following Expression (5).

[Mathematical Expression 5]

$$v = \frac{(s-d^x)(s-d^y)A + d^x(s-d^y)B + (s-d^x)d^yC + d^xd^yD}{s^2} \quad (5)$$

where s=8.

Also, what sort of processing with which to select motion vectors obtained in decimal-pixel precision as described above is important in obtaining compressed images with high encoding efficiency. One example of this processing is a method implemented in reference software (reference software), called JM (Joint Model), disclosed in NPL 1.

Next, a motion search method implemented in JM will be described with reference to FIG. 3.

In the example in FIG. 3, pixels A through I represent pixels having pixel values of integer-pixel precision (hereinafter referred to as integer-pixel precision pixels). Pixels 1 through 8 are pixels having pixel values of half-pixel precision around the pixel E (hereinafter referred to as half-pixel precision pixels). Pixels a through h are pixels having pixel values of quarter-pixel precision around the pixel 6 (hereinafter referred to as quarter-pixel precision pixels).

With JM, as a first step, a motion vector which minimizes a cost function value such as the SAD (Sum of Absolute Difference) within a predetermined search range is obtained. Let us say that the pixel corresponding to the motion vector obtained in this way is the pixel E.

Next, as a second step, a pixel with a pixel value which minimizes the above-described cost function value is obtained from the pixel E and the pixels 1 through 8 of half-pixel precision surrounding the pixel E, and this pixel (the pixel 6 in the case of the example in FIG. 2) is taken as the pixel corresponding to the optimal motion vector of half-pixel precision.

Then, as a third step, a pixel with a pixel value which minimizes the above-described cost function value is obtained from the pixel 6 and the pixels a through h of quarter-pixel precision surrounding the pixel 6. Thus, the motion vector corresponding to the obtained pixel is the optimal motion vector of quarter-pixel precision.

As described above, quarter-pixel precision prediction/compensation processing is performed with the H.264/AVC format, and multiple techniques for further improving encoding efficiency have been proposed for this quarter-pixel precision prediction/compensation processing.

For example, with the H.264/AVC format, the filter coefficients for the interpolation filter to generate pixel values of sampling positions as to decimal-pixel precision motion vectors described above with reference to FIG. 1 have been predetermined, as described in NPL 2.

Accordingly, proposed in NPL 3 is to adaptively switch the filter coefficients such that the prediction residual is the smallest for each prediction frame.

That is to say, with NPL 3, first, as a first step, normal H.264/AVC format motion prediction processing is performed, and motion vector values are calculated for each motion compensation block.

As a second step, filter optimization is performed such that the motion residual is minimal for the motion vector values obtained in the first step.

Then, as a third step, motion search is performed again using the filter coefficient obtained in the second step, and the motion vector value is updated. Thus, encoding efficiency can be improved.

Filter coefficients and motion vector values can be optimized by further repeating the above steps.

Also, as described above, the macroblock size is defined as 16×16 pixels with the H.264/AVC format. However, a macroblock size of 16×16 pixels is not optimal for a large image frame such as with UHD (Ultra High Definition; 4000 pixels×2000 pixels) which is the object of next-generation encoding formats.

Accordingly, it is proposed in NPL 4 and so forth to extend the macroblock size to be a size of 32 pixels×32 pixels, for example.

Note that the above-described FIG. 1 through FIG. 3 will also be used hereinafter to describe the present invention.

CITATION LIST

Non Patent Literature

NPL 1: H.264/AVC Software Coordination, Institut Nachrichtentechnik Heinrich-Hertz-Institut, (searched Aug. 24, 2009), Internet <URL: http://iphome.hhi.de/suehring/tml/index.htm>
NPL 2: "8.4.2.2.1 Luma sample interpolation process", "ITU-T Recommendation H.264 Advanced video coding for generic audiovisual", P162-P164 November 2007
NPL 3: "Prediction of P- and B-Frames Using a Two-dimensional Non-separable Adaptive Wiener Interpolation for H.264/AVC", VCEG-AD08, ITU-Telecommunications Standardization Sector STUDY GROUP Question 6 Video coding Experts Group (VCEG), 23-27 Oct. 2006
NPL 4: "Video Coding Using Extended Block Sizes", VCEG-AD09, ITU-Telecommunications Standardization Sector STUDY GROUP Question 16—Contribution 123, January 2009

SUMMARY OF INVENTION

Technical Problem

Now, in the event that the motion compensation block of luminance signals is 4×4 pixels, if the input signals are 4:2:0, the motion compensation block of color difference signals will be 2×2 pixels.

However, the smallest unit for orthogonal transform stipulated with the H.264/AVC format is 4×4 pixels. Accordingly, in the event that the color difference signal motion compensation block is 2×2 pixels, this means that there will be boundaries between motion compensation blocks within the orthogonal transform block.

Further, in the event that the motion compensation blocks are 2×2 pixels, address calculation for memory access has to be performed in these increments, which will press the memory bandwidth at both the encoding side and decoding side devices.

This fact is not restricted to cases where the motion compensation blocks of luminance signals are 4×4 pixels, and also exists in cases of 8×4 pixels and 4×8 pixels.

The present invention has been made in light of this situation, and enables realizing improvement in encoding efficiency for color difference signals and reduction in address calculations for memory access.

Solution to Problem

An image processing device according to a first aspect of the present invention includes: motion prediction means configured to perform motion prediction of a luminance block to be encoded, and generate a motion vector; block determining means configured to classify a color difference block, corresponding to the luminance block regarding which the motion vector has been generated by the motion prediction means, into a category according to a block size of orthogonal transform; and color difference motion vector generating means configured to, in the event that the color difference block has been classified by the block determining means into a category of a size smaller than a block size of orthogonal transform, correspond a single color difference block as to a plurality of the luminance blocks, so as to generate a motion vector for the single color difference block.

The color difference motion vector generating means may generate the motion vector for the single color difference block using at least one of motion vectors of a plurality of the luminance blocks generated by the motion prediction means.

The color difference motion vector generating means may generate the motion vector for the single color difference block by a function using at least one of motion vectors of a plurality of the luminance blocks generated by the motion prediction means.

The image processing device may further include encoding means configured to encode information of motion vectors of the luminance blocks generated by the motion prediction means; wherein the color difference motion vector generating means generate a prediction motion vector for the single color difference block by a function using at least one of motion vectors of a plurality of the luminance blocks obtained by the motion prediction means, and obtain a difference between the prediction motion vector that has been generated and the motion vector of the single color difference block searched from a predetermined range centered on the prediction motion vector; and wherein the encoding means encode information of the difference obtained by the color difference motion vector generating means.

In the event that the color difference block is classified into a category of a size equal to or greater than the orthogonal transform block size by the block determining means, the motion prediction means may generate the motion vector of the color difference block by a method according to an encoding standard.

An image processing method according to the first aspect of the present invention includes the steps of an image processing device performing motion prediction of a luminance block to be encoded, and generating a motion vector, classifying a color difference block, corresponding to the luminance block regarding which the motion vector has been generated, into a category according to a block size of orthogonal transform, and in the event that the color difference block has been classified into a category of a size smaller than a block size of orthogonal transform, corresponding a single color difference block as to a plurality of the luminance blocks, so as to generate a motion vector for the single color difference block.

An image processing device according to a second aspect of the present invention includes: decoding means configured to decode information of a prediction mode for a luminance block to be decoded; block determining means configured to classify a color difference block corresponding to the luminance block into a category corresponding to a block size of orthogonal transform, based on a size of the luminance block which information of the prediction mode decoded by the decoding means indicates; and color difference motion vector generating means configured to, in the event that the color difference block has been classified into a category by the block determining means of a size smaller than a block size of orthogonal transform, correspond a single color difference block as to a plurality of the luminance blocks, so as to generate a motion vector for the single color difference block.

The decoding means may decode information of a motion vector of the luminance block; with the color difference motion vector generating means generating the motion vector for the single color difference block using at least one of motion vectors of a plurality of the luminance blocks decoded by the decoding means.

The color difference motion vector generating means may generate the motion vector for the single color difference block by a function using at least one of motion vectors of a plurality of the luminance blocks decoded by the decoding means.

The decoding means may decode information of difference between a prediction motion vector for the single color difference block generated by calculating an average value using motion vectors of a plurality of the luminance blocks encoded at an encoding side, and the motion vector of the single color difference block searched from a predetermined range centered on the prediction motion vector; with the color difference motion vector generating means generating the motion vector for the single color difference block by generating a prediction motion vector for the single color difference block by a function using at least one of motion vectors of a plurality of the luminance blocks obtained by the motion prediction means, and adding the prediction motion vector that has been generated to the information of the difference decoded by the decoding means.

The image processing device may further include prediction image generating means configured to generate a prediction image of the luminance blocks using motion vectors of the luminance blocks; wherein, in the event that the color difference block is classified into a category of a size equal to or greater than the orthogonal transform block size by the block determining means, the prediction image generating means generate the motion vector of the color difference block by a method according to an encoding standard, and generate a prediction image for the color difference block.

An image processing method according to the second aspect of the present invention includes the steps of an image processing device decoding information of a prediction mode for a luminance block to be decoded, classifying a color difference block corresponding to the luminance block into a category corresponding to a block size of orthogonal transform, based on a size of the luminance block which information of the prediction mode that has been decoded indicates, and in the event that the color difference block has been classified into a category of a size smaller than a block size of orthogonal transform, corresponding a single color difference block as to a plurality of the luminance blocks, so as to generate a motion vector for the single color difference block.

With the first aspect of the present invention, motion prediction of a luminance block to be encoded is performed, a motion vector is generated, and a color difference block, corresponding to the luminance block regarding which the motion vector has been generated, is classified into a category according to a block size of orthogonal transform. Also, in the event that the color difference block has been classified into a category of a size smaller than a block size of orthogonal transform, a single color difference block is made to correspond as to a plurality of the luminance blocks, and a motion vector is generated for the single color difference block.

According to the second aspect of the present invention, information of a prediction mode for a luminance block to be decoded is decoded, and a color difference block corresponding to the luminance block is classified into a category corresponding to a block size of orthogonal transform, based on a size of the luminance block which information of the prediction mode that has been decoded indicates. Also, in the event that the color difference block has been classified into a category of a size smaller than a block size of orthogonal transform, a single color difference block is made to correspond as to a plurality of the luminance blocks, and a motion vector is generated for the single color difference block.

Note that the above-described image processing devices may each be stand-alone devices, or may be internal blocks making up a single image encoding device or image decoding device.

Advantageous Effects of Invention

According to the first aspect of the present invention, encoding efficiency of color difference signals can be improved. Also, according to the first aspect of the present invention, address calculations for memory access can be reduced.

According to the second aspect of the present invention, encoding efficiency of color difference signals can be improved. Also, according to the second aspect of the present invention, address calculations for memory access can be reduced.

DESCRIPTION OF EMBODIMENTS

Hereafter, an embodiment of the present invention will be described with reference to the drawings.
[Configuration Example of Image Encoding Device]

Figure 4:
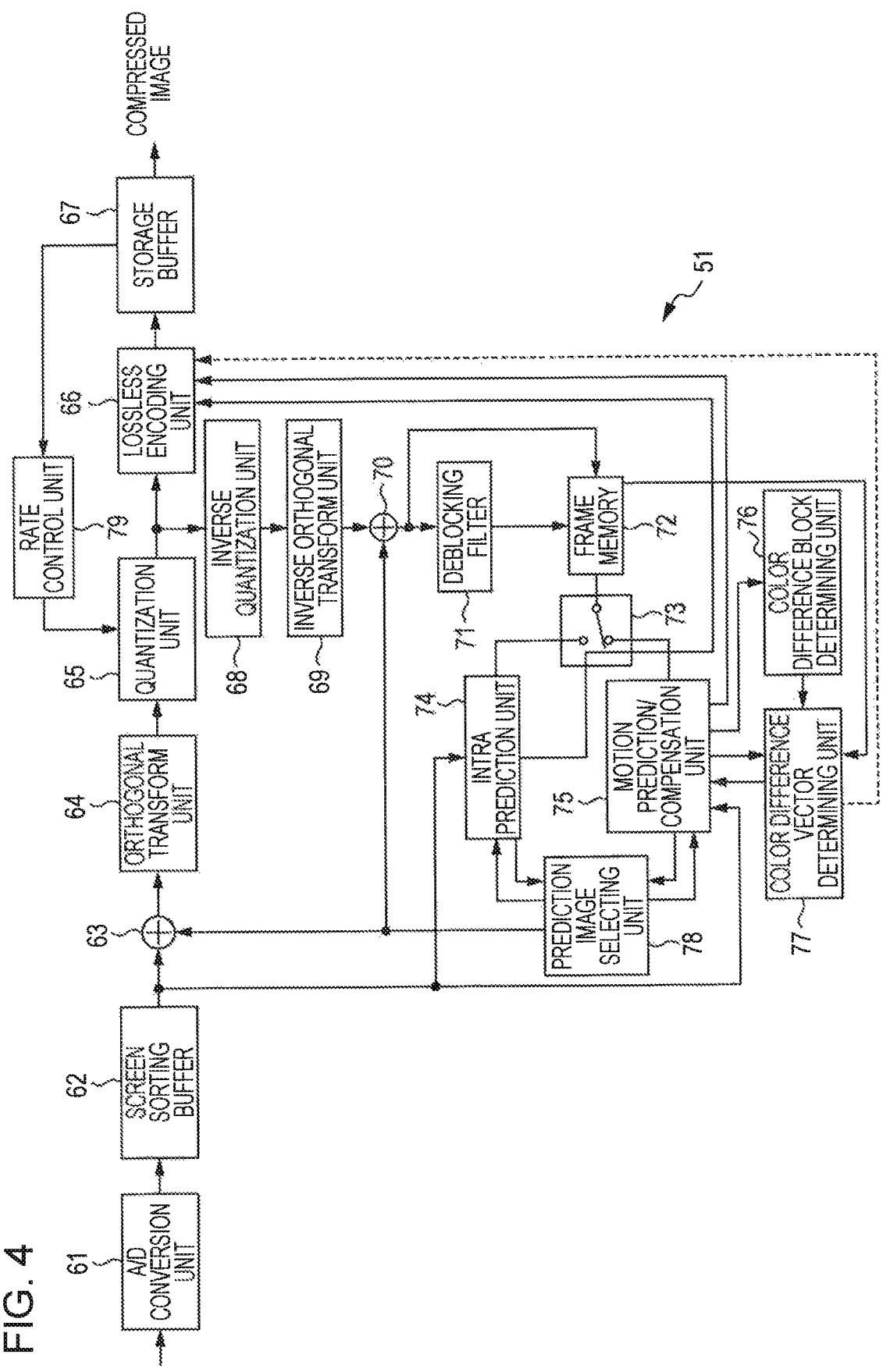
FIG. 4 is a block diagram illustrating a configuration of an embodiment of an image encoding device to which the present invention has been applied.

FIG. 4 represents the configuration of an embodiment of an image encoding device serving as an image processing device to which the present invention has been applied.

This image encoding device 51 is input with, for example, an image of 4:2:0 format input signals, and subjects the input image to compression encoding using the H.264 and MPEG-4 Part10 (Advanced Video Coding) (hereinafter written as H.264/AVC) format.

With the example in FIG. 4, the image encoding device 51 is configured of an A/D conversion unit 61, a screen rearranging buffer 62, a computing unit 63, an orthogonal transform unit 64, a quantization unit 65, a lossless encoding unit 66, an storage buffer 67, an inverse quantization unit 68, an inverse orthogonal transform unit 69, a computing unit 70, a deblocking filter 71, frame memory 72, a switch 73, an intra prediction unit 74, a motion prediction/compensation unit 75, a color difference block determining unit 76, a color difference motion vector determining unit 77, a prediction image selecting unit 78, and a rate control unit 79.

The A/D conversion unit 61 converts an input image from analog to digital, and outputs to the screen rearranging buffer 62 for storing. The screen rearranging buffer 62 sorts the images of frames in the stored order for display into the order of frames for encoding according to GOP (Group of Picture).

The computing unit 63 subtracts from the image read out from the screen rearranging buffer 62 the prediction image from the intra prediction unit 74 selected by the prediction image selecting unit 78 or the prediction image from the motion prediction/compensation unit 75, and outputs difference information thereof to the orthogonal transform unit 64. The orthogonal transform unit 64 subjects the difference information from the computing unit 63 to orthogonal transform, such as discrete cosine transform, Karhunen-Loéve transform, or the like, and outputs a transform coefficient thereof. The quantization unit 65 quantizes the transform coefficient that the orthogonal transform unit 64 outputs.

The quantized transform coefficient that is the output of the quantization unit 65 is input to the lossless encoding unit 66, and subjected to lossless encoding, such as variable length coding, arithmetic coding, or the like, and compressed.

The lossless encoding unit 66 obtains information indicating intra prediction from the intra prediction unit 74, and obtains information indicating an inter prediction mode, and so forth from the motion prediction/compensation unit 75. Note that, hereafter, the information indicating intra prediction and the information indicating inter prediction will be referred to as intra prediction mode information and inter prediction mode information, respectively.

The lossless encoding unit 66 encodes the quantized transform coefficient, and also encodes the information indicating intra prediction, the information indicating an inter prediction mode, and so forth, and takes these as part of header information in the compressed image. The lossless encoding unit 66 supplies the encoded data to the storage buffer 67 for storage.

For example, with the lossless encoding unit 66, lossless encoding processing, such as variable length coding, arithmetic coding, or the like, is performed. Examples of the variable length coding include CAVLC (Context-Adaptive Variable Length Coding) determined by the H.264/AVC format. Examples of the arithmetic coding include CABAC (Context-Adaptive Binary Arithmetic Coding).

The storage buffer 67 outputs the data supplied from the lossless encoding unit 66 to, for example, a downstream storage device or transmission path or the like not shown in the drawing, as a compressed image encoded by the H.264/AVC format.

Also, the quantized transform coefficient output from the quantization unit 65 is also input to the inverse quantization unit 68, subjected to inverse quantization, and then subjected to further inverse orthogonal transform at the inverse orthogonal transform unit 69. The output subjected to inverse orthogonal transform is added to the prediction image supplied from the prediction image selecting unit 78 by the computing unit 70, and changed into a locally decoded image. The deblocking filter 71 removes block distortion from the decoded image, and then supplies to the frame memory 72 for storage. An image before the deblocking filter processing is performed by the deblocking filter 71 is also supplied to the frame memory 72 for storage.

The switch 73 outputs the reference images stored in the frame memory 72 to the motion prediction/compensation unit 75 or intra prediction unit 74.

With this image encoding device 51, the I picture, B picture, and P picture from the screen rearranging buffer 62 are supplied to the intra prediction unit 74 as an image to be subjected to intra prediction (also referred to as intra processing), for example. Also, the B picture and P picture read out from the screen rearranging buffer 62 are supplied to the motion prediction/compensation unit 75 as an image to be subjected to inter prediction (also referred to as inter processing).

The intra prediction unit 74 performs intra prediction processing of all of the candidate intra prediction modes based on the image to be subjected to intra prediction read out from the screen rearranging buffer 62, and the reference image supplied from the frame memory 72 to generate a prediction image.

At this time, the intra prediction unit 74 calculates a cost function value as to all of the candidate intra prediction modes, and selects the intra prediction mode of which the calculated cost function value provides the minimum value, as the optimal intra prediction mode. Details of this cost function value will be described later with reference to FIG. 12.

The intra prediction unit 74 supplies the prediction image generated in the optimal intra prediction mode, and the cost function value thereof to the prediction image selecting unit 78. In the event that the prediction image generated in the optimal intra prediction mode has been selected by the prediction image selecting unit 78, the intra prediction unit 74 supplies the information indicating the optimal intra prediction mode to the lossless encoding unit 66. The lossless encoding unit 66 encodes this information, and takes this as part of the header information in a compressed image.

The motion prediction/compensation unit 75 is supplied with the image to be subjected to inter processing read out from the screen rearranging buffer 62, and the reference image from the frame memory 72 via the switch 73. The motion prediction/compensation unit 75 performs block motion prediction for all candidate inter prediction modes using luminance signals, generates motion vectors for each of the blocks, and stores these.

The motion prediction/compensation unit 75 calculates a cost function value as to all of the candidate inter prediction modes, using the motion vectors of the blocks that have been predicted. The motion prediction/compensation unit 75 determines, of the calculated cost function values, a prediction mode for the block that provides the minimum value, to be the optimal inter prediction mode, and supplies information of the determined prediction mode to the color difference block determining unit 76.

The motion prediction/compensation unit 75 subjects the reference image to compensation processing based on the motion vector in the optimal inter prediction mode, and generates a prediction image of the current luminance signal block (hereinafter also referred to as luminance block or luminance signal block as appropriate). In the event that a control signal is supplied from the color difference motion vector determining unit 77, the motion prediction/compensation unit 75 generates a motion vector for the current color difference signal block (hereinafter also referred to as color difference block or color difference signal block as appropriate) by the H.264/AVC format. The motion prediction/compensation unit 75 then generates a prediction image of the color difference signal block using the generated motion vector. Also, in the event that color difference motion vector information is supplied from the color difference motion vector determining unit 77, the motion prediction/compensation unit 75 generates a prediction image of the color difference signal block using the motion vector of the color difference signals indicated by this information.

The motion prediction/compensation unit 75 supplies the prediction image of the current block (luminance signal and color difference signal block) of the optimal inter prediction mode that has been generated, and the cost function value thereof, to the prediction image selecting unit 78. In the event that the prediction image of the current block in the optimal inter prediction mode has been selected by the prediction image selecting unit 78, the motion prediction/compensation unit 75 outputs information indicating the optimal inter prediction mode (inter prediction mode information) to the lossless encoding unit 66.

At this time, the motion vector information, reference frame information, and so forth are also output to the lossless encoding unit 66. The lossless encoding unit 66 also subjects the information from the motion prediction/compensation unit 75 to lossless encoding processing such as variable length coding or arithmetic coding, and inserts into the header portion of the compressed image.

The color difference block determining unit 76 determines the block size of the color difference signal block in accordance with the block size of the luminance signal block which the information of the prediction mode from the motion prediction/compensation unit 75 indicates. The color difference block determining unit 76 supplies the information of the color difference block size that has been determined to the color difference motion vector determining unit 77.

In the example in FIG. 4, the input signals are 4:2:0, so in the event that the block size of the luminance signal block is 8×8 pixels, the color difference block determining unit 76 determines that the block size of the corresponding color difference signal block is 4×4 pixels.

Based on the information of the color difference blocks size from the color difference block determining unit 76, the color difference motion vector determining unit 77 classifies which of two categories the color difference signal block belongs to. For example, color difference signal blocks with a block size of 4×4 pixels or greater belong to the first category. Color difference signal blocks with a block size smaller than 4×4 pixels belong to the second category.

In the event of having classified a color difference signal block into the first category, the color difference motion vector determining unit 77 supplies a control signal to the motion prediction/compensation unit 75 so as to perform motion prediction of the color difference signals according to the H.264/AVC format. On the other hand, in the event of having classified a color difference signal block into the second category, the color difference motion vector determining unit 77 corresponds a single color difference signal block as to multiple luminance signal blocks, and performs motion vector generating for the color difference signals in units of the same. For example, a motion vector of the single color difference signal block made to correspond to the multiple luminance signal blocks is generated by the motion prediction/compensation unit 75, and is generated using at least one of the motion vectors of the multiple luminance signal blocks that are stored. Information of the generated color difference motion vector is supplied to the motion prediction/compensation unit 75.

Note that an arrangement may be made wherein motion search is performed as to a single color difference signal block corresponding to multiple luminance signal blocks, difference information as to a motion vector generated using motion vectors of multiple luminance signal blocks such as described above is generated, and this is sent to the decoding side. In this case, the generated difference information is supplied to the lossless encoding unit 66 as indicated by the dotted line.

The prediction image selecting unit 78 determines the optimal prediction mode from the optimal intra prediction mode and the optimal inter prediction mode based on the cost function values output from the intra prediction unit 74 or motion prediction/compensation unit 75. The prediction image selecting unit 78 then selects the prediction image in the determined optimal prediction mode, and supplies to the computing units 63 and 70. At this time, the prediction image selecting unit 78 supplies the selection information of the prediction image to the intra prediction unit 74 or motion prediction/compensation unit 75.

The rate control unit 79 controls the rate of the quantization operation of the quantization unit 65 based on a compressed image stored in the storage buffer 67 so as not to cause overflow or underflow.

Note that hereinafter, when description is made simply of block, luminance signal block, color difference signal block, and so forth, this represents blocks for motion prediction/compensation.

[Description of H.264/AVC Format]

Figure 5:
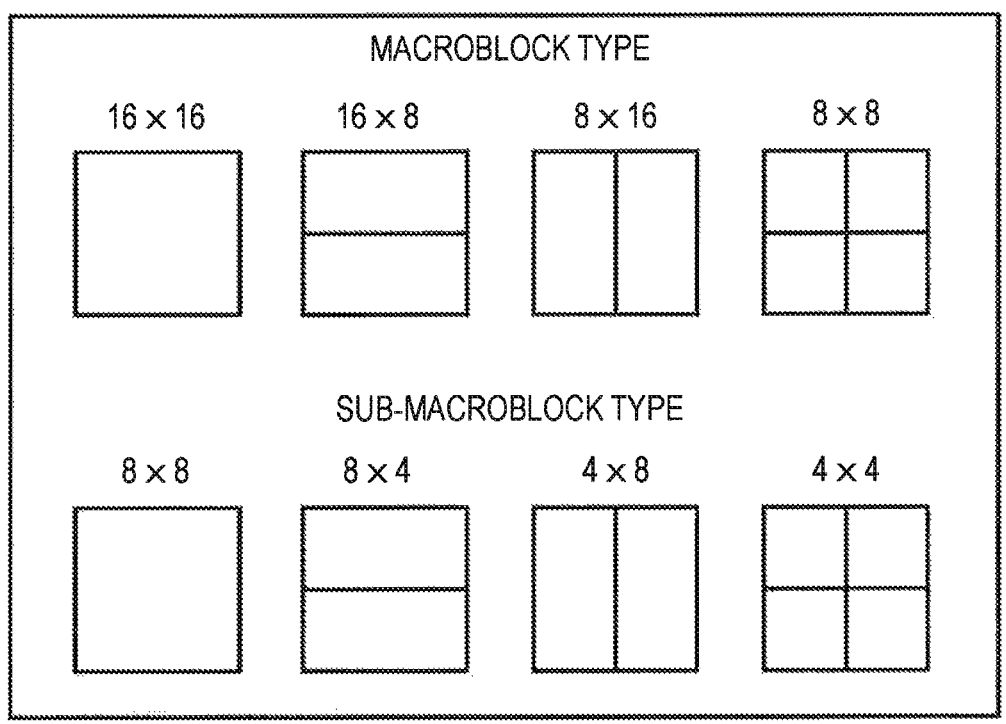
FIG. 5 is a diagram for describing motion prediction/compensation processing with variable block size.

FIG. 5 is a diagram illustrating an example of the block size of motion prediction/compensation according to the H.264/AVC format. With the H.264/AVC format, motion prediction/compensation is performed with the block size taken as variable.

Macroblocks made up of 16×16 pixels divided into 16×16-pixel, 16×8-pixel, 8×16-pixel, and 8×8-pixel partitions are shown from the left in order on the upper tier in FIG. 5. Also, 8×8-pixel partitions divided into 8×8-pixel, 8×4-pixel, 4×8-pixel, and 4×4-pixel sub partitions are shown from the left in order on the lower tier in FIG. 5.

Specifically, with the H.264/AVC format, one macroblock may be divided into one of 16×16-pixel, 16×8-pixel, 8×16-pixel, and 8×8-pixel partitions with each partition having independent motion vector information. Also, an 8×8-pixel partition may be divided into one of 8×8-pixel, 8×4-pixel, 4×8-pixel, and 4×4-pixel sub partitions with each sub partition having independent motion vector information.

Figure 6:
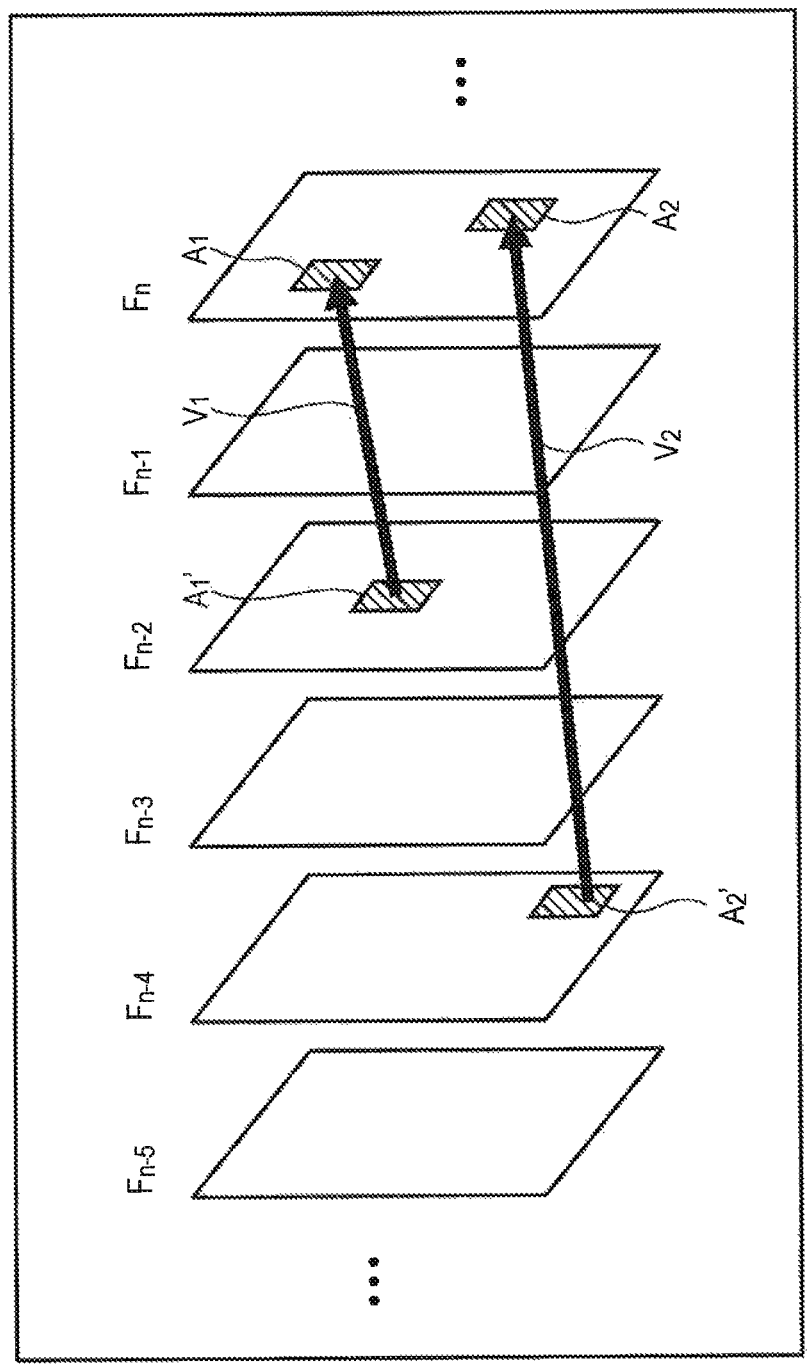
FIG. 6 is a diagram for describing a motion prediction/compensation format of multi-reference frames.

FIG. 6 is a diagram for describing the prediction/compensation processing of multi-reference frames according to the H.264/AVC format. With the H.264/AVC format, the motion prediction/compensation method of multi-reference frames (Multi-Reference Frame) has been determined.

With the example in FIG. 6, the current frame Fn to be encoded from now on, and encoded frames Fn-5 through Fn-1 are shown. The frame Fn-1 is, on the temporal axis, a frame one frame ahead of the current frame Fn, the frame Fn-2 is a frame two frames ahead of the current frame Fn, and the frame Fn-3 is a frame three frames ahead of the current frame Fn. Similarly, the frame Fn-4 is a frame four frames ahead of the current frame Fn, and the frame Fn-5 is a frame five frames ahead of the current frame Fn. In general, the closer to the current frame Fn a frame is on the temporal axis, the smaller a reference picture number (ref_id) to be added is. Specifically, the frame Fn-1 has the smallest reference picture number, and hereafter, the reference picture numbers are small in the order of Fn-2, . . . , Fn-5.

With the current frame Fn, a block A1 and a block A2 are shown, a motion vector V1 is searched with assuming that the block A1 is correlated with a block A1' of the frame Fn-2 that is two frames ahead of the current frame Fn. Similarly, a motion vector V2 is searched assuming that the block A2 is correlated with a block A2' of the frame Fn-4 that is four frames ahead of the current frame Fn.

As described above, with the H.264/AVC format, different reference frames may be referenced in one frame (picture) with multi-reference frames stored in memory. Specifically, for example, such that the block A1 references the frame Fn-2, and the block A2 references the frame Fn-4, independent reference frame information (reference picture number (ref_id)) may be provided for each block in one picture.

Here, the blocks indicate one of 16×16-pixel, 16×8-pixel, 8×16-pixel, and 8×8-pixel partitions described above with reference to FIG. 5. Reference frames within an 8×8-pixel sub-block partition have to agree.

Figures 1, 2:
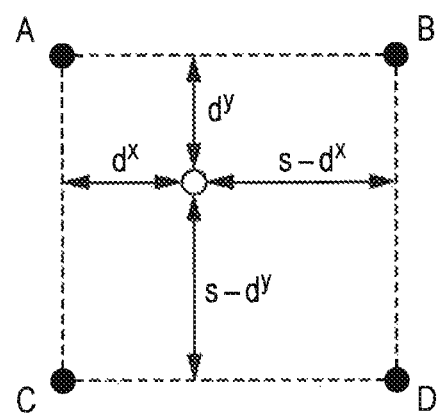
FIG. 1 is a diagram describing quarter-pixel precision motion prediction/compensation processing according to the H.264/AVC format.
FIG. 2 is a diagram describing motion prediction/compensation processing of color difference signals according to the H.264/AVC format.

With the H.264/AVC format, by the quarter-pixel precision motion prediction/compensation processing described above with reference to FIG. 1, and the motion prediction/compensation processing described above with reference to FIG. 5 and FIG. 6 being performed, vast amounts of motion vector information are generated. If these vast amounts of motion vector information are encoded without change, this will lead to deterioration in encoding efficiency. As to this, with the H.264/AVC format, according to a method shown in FIG. 7, reduction in motion vector coding information has been realized.

Figure 7:
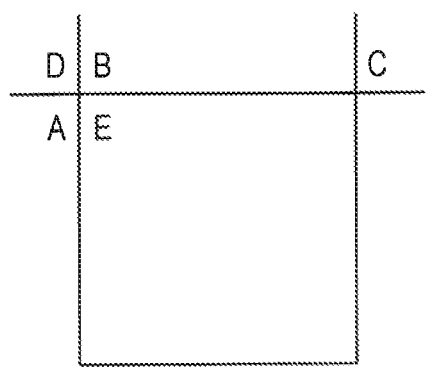
FIG. 7 is a diagram for describing an example of a motion vector information generating method.

FIG. 7 is a diagram for describing a motion vector information generating method according to the H.264/AVC format.

With the example in FIG. 7, a current block E to be encoded from now on (e.g., 16×16 pixels), and blocks A through D, which have already been encoded, adjacent to the current block E are shown.

Specifically, the block D is adjacent to the upper left of the current block E, the block B is adjacent to above the current block E, the block C is adjacent to the upper right of the current block E, and the block A is adjacent to the left of the current block E. Note that the reason why the blocks A through D are not sectioned is because each of the blocks represents a block having one structure of 16×16 pixels through 4×4 pixels described above with reference to FIG. 4.

For example, let us say that motion vector information as to X (=A, B, C, D, E) is represented with $mv_X$. First, prediction motion vector information $pmv_E$ as to the current block E is generated as with the following Expression (6) by median prediction using motion vector information regarding the blocks A, B, and C.

$$pmv_E = med(mv_A, mv_B, mv_C) \qquad (6)$$

The motion vector information regarding the block C may not be used (may be unavailable) due to a reason such as the edge of an image frame, before encoding, or the like. In this case, the motion vector information regarding the block D is used instead of the motion vector information regarding the block C.

Data $mvd_E$ to be added to the header portion of the compressed image, serving as the motion vector information as to the current block E, is generated as with the following Expression (7) using $pmv_E$.

$$mvd_E = mv_E - pmv_E \qquad (7)$$

Note that, in reality, processing is independently performed as to each of the components in the horizontal direction and vertical direction of the motion vector information.

In this way, prediction motion vector information is generated, and difference between the prediction motion vector information generated based on correlation with an adjacent block and the motion vector information is added to the header portion of the compressed image, whereby the motion vector information can be reduced.

[Configuration Example of Motion Prediction/Compensation Unit and Color Difference Motion Vector Determining Unit]

Figure 8:
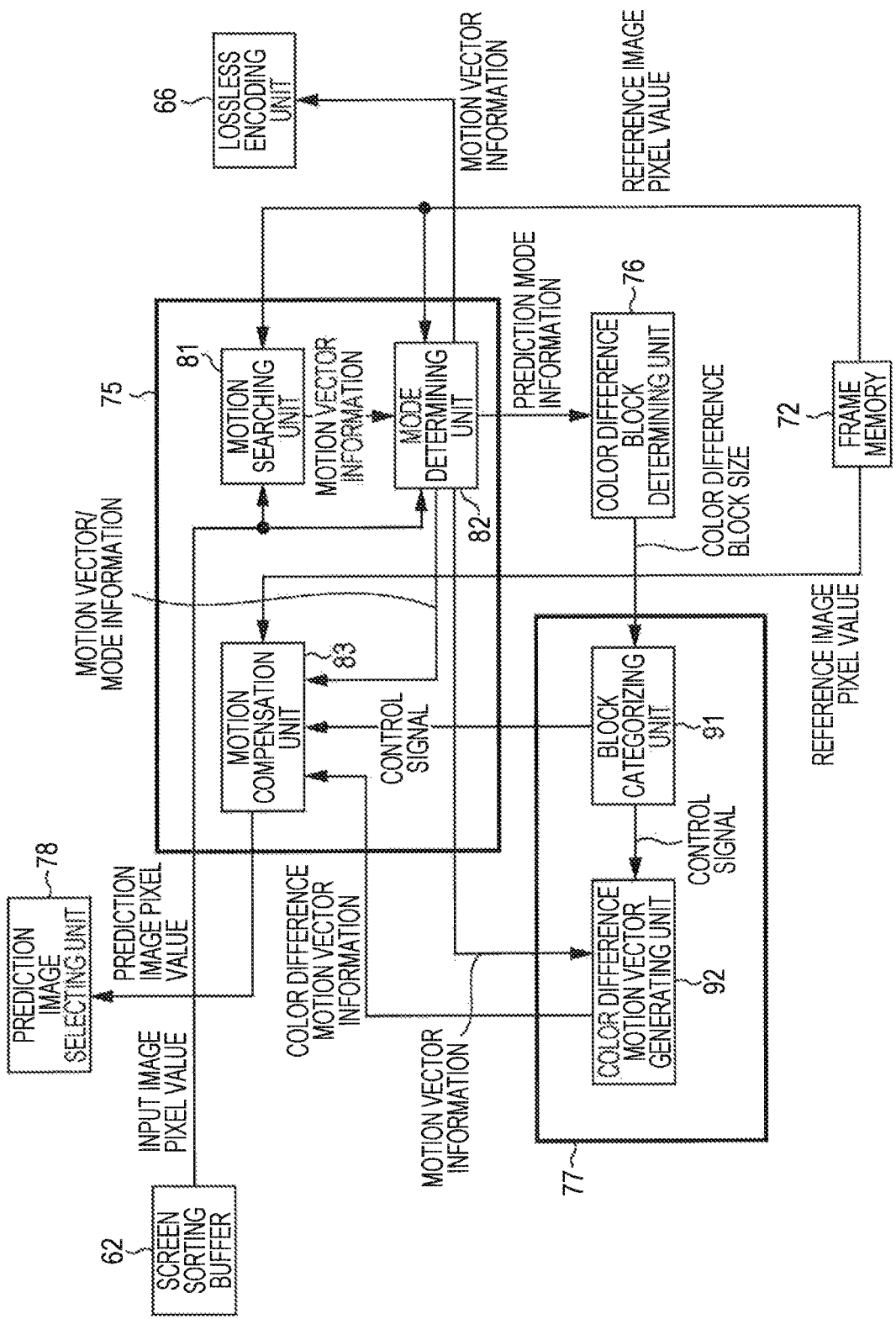
FIG. 8 is a block diagram illustrating a configuration example of the motion prediction/competition unit and color difference motion vector determining unit in FIG. 4.

FIG. 8 is a block diagram illustrating a detailed configuration example of the motion prediction/compensation unit 75 and color difference motion vector determining unit 77. Note that the switch 73 in FIG. 4 is omitted from FIG. 8.

In the example in FIG. 8, the motion prediction/compensation unit 75 is configured of a motion searching unit 81, a mode determining unit 82, and a motion compensation unit 83.

The color difference motion vector determining unit 77 is configured of a block categorizing unit 91 and a color difference motion vector generating unit 92.

The reference image pixel value from the frame memory 72 is supplied to the motion searching unit 81, mode determining unit 82, and motion compensation unit 83. Also, the image (input image) pixel value for inter processing from the screen rearranging buffer 62 is supplied to the motion searching unit 81 and mode determining unit 82.

Figure 3:
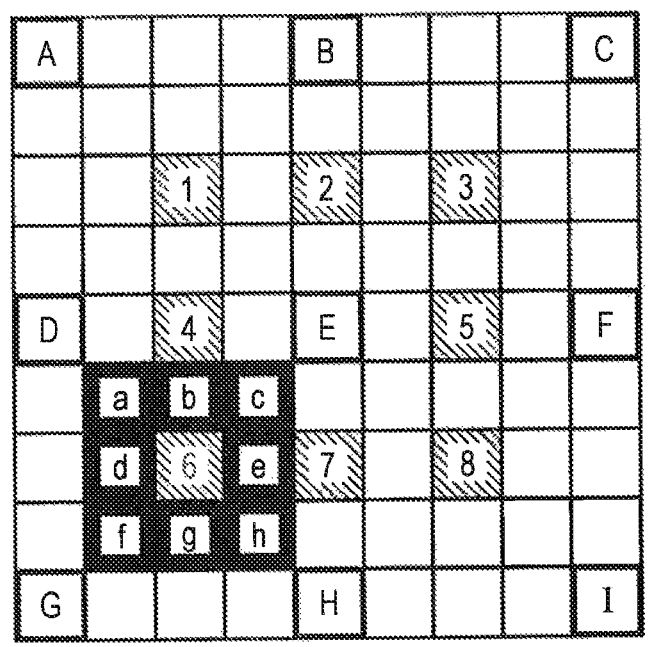
FIG. 3 is a diagram describing a motion search method according to the H.264/AVC format.

The motion searching unit 81 uses the image for inter processing and reference image pixel values of integer-pixel precision to perform a motion search of the each of the current blocks of luminance signals regarding all candidate inter prediction modes. Note that at the motion searching unit 81, integer-pixel precision motion vectors are obtained and decimal-pixel precision motion vectors are obtained, based on the motion searching method implemented in the JM (Joint Model) described above with reference to FIG. 3. Each motion vector information obtained regarding each current block of luminance signals by the motion searching unit 81 is supplied to the mode determining unit 82.

Figure 12:
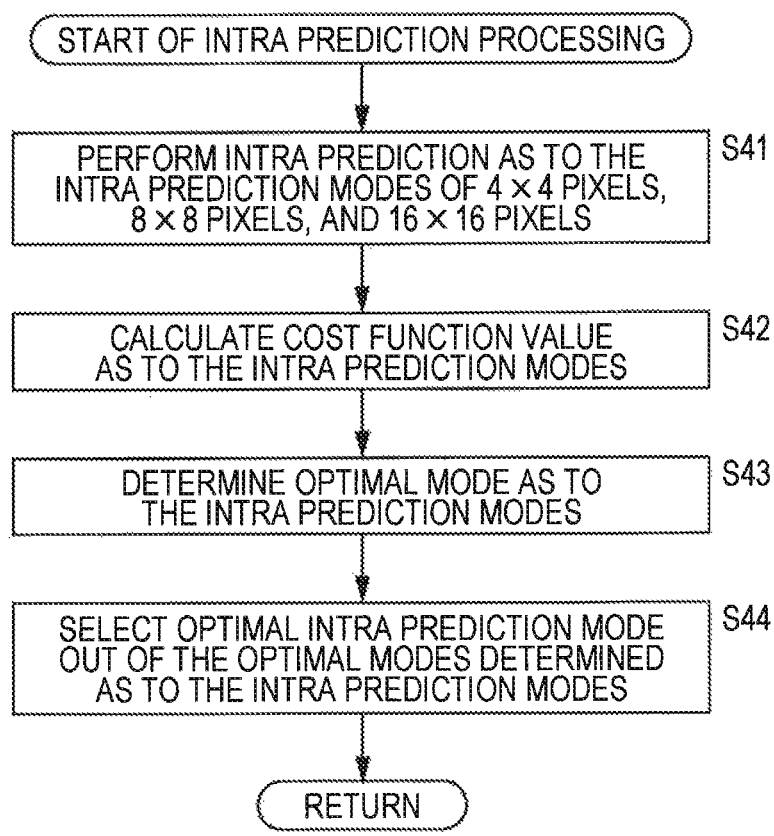
FIG. 12 is a flowchart for describing intra prediction processing in step S31 in FIG. 11.

The mode determining unit 82 uses the image for inter processing and reference image pixel values of integer-pixel precision to calculate a cost function value described later with reference to FIG. 12, for all candidate inter prediction modes regarding which a motion vector has been obtained by the motion searching unit 81. The mode determining unit 82 determines the inter prediction mode which yields the smallest value for the calculated cost function value to be the optimal inter prediction mode for that current block.

The mode determining unit 82 supplies information of the determined optimal inter prediction mode, and motion vector information corresponding thereto, to the motion compensation unit 83. The mode determining unit 82 supplies the information of the determined optimal inter prediction mode to the color difference block determining unit 76 as well.

Further, in the event that a prediction image of the optimal inter prediction mode has been selected by the prediction image selecting unit 78, the mode determining unit 82 supplies the information of the optimal inter prediction mode, difference information of the motion vector corresponding to the optimal inter prediction mode obtained at the time of calculating the cost function value, reference frame information, and so forth, to the lossless encoding unit 66.

The motion compensation unit 83 subjects the reference image to compensation processing based on the motion vector of the optimal inter prediction mode from the mode determining unit 82, and generates a prediction image of the current luminance signal block. Also, in the event that a control signal is supplied from the block categorizing unit 91, the motion compensation unit 83 generates a color difference signal motion vector according to the H.264/AVC format, and uses the generated motion vector to perform compensation processing and generate a prediction image of the current color difference signal block. In the event that color difference motion vector information is supplied from the color difference motion vector generating unit 92, the motion compensation unit 83 performs compensation processing using the motion vector of the color difference signals indicated by that information, and generates a prediction image of the current color difference signal block.

The motion compensation unit 83 supplies the generated prediction image of the current block of the optimal inter prediction mode, and the cost function value thereof, to the prediction image selecting unit 78. Note that this cost function value may be that which has been calculated by the mode determining unit 82 being supplied, or may be obtained again at the motion compensation unit 83 and supplied to the prediction image selecting unit 78.

Based on the information of the color difference block size from the color difference block determining unit 76, the block categorizing unit 91 classifies which of the two categories the color difference signal block belongs to. In the event of classifying the color difference signal block to the first category, the block categorizing unit 91 supplies a control signal to the motion compensation unit 83, and causes performing thereat of color difference signal motion prediction according to the H.264/AVC format. Also, in the event of classifying the color difference signal block to the second category, the block categorizing unit 91 supplies a control signal to the color difference motion vector generating unit 92, and causes performing thereat of color difference signal motion prediction.

The color difference motion vector generating unit 92 corresponds a single color difference signal block as to multiple luminance signal blocks based on the control signal from the block categorizing unit 91. The color difference motion vector generating unit 92 then uses the motion vector information of the multiple luminance signal blocks obtained from the mode determining unit 82 to generate a motion vector for the corresponded single color difference signal block. The color difference motion vector generating unit 92 supplies the generated color difference signal motion vector information to the motion compensation unit 83.

[Description of Color Difference Signal Motion Prediction Processing]

Now, color difference signal motion prediction processing will be described in detail with reference to FIG. 5 again.

At the motion prediction/compensation unit 75, motion prediction/compensation processing is performed according to one of the motion partition (block) sizes or sub motion partition sizes shown in FIG. 5. Note that the sizes shown in FIG. 5 relate to luminance signals, and in the case of the input image signals being of 4:2:0 format, both the horizontal and vertical size of the block as to the color difference signals will be ½ that of the block as to the luminance signals.

Information relating to which block size that luminance signals have been subjected to motion prediction, i.e., information of the prediction mode, is supplied to the color difference block determining unit 76. At the color difference block determining unit 76, the block sizes of the current block of color difference signals is distinguished in accordance with the block size of the current block of luminance signals which the prediction mode information indicates, and the information of the distinguished color difference block size is supplied to the block categorizing unit 91.

At the block categorizing unit 91, the current block is classified into the above-described two categories. That is to say, of the block sizes for luminance signals, blocks of one of the sizes of 16×16 pixels, 16×8 pixels, 8×16 pixels, and 8×8 pixels, in FIG. 5 belong to the first category. Also, of the block sizes for luminance signals, blocks of other sizes belong to the second category.

Also, in the event that the input signals are 4:2:0, of the block sizes for color difference signals, blocks of one of the sizes of 8×8 pixels, 8×4 pixels, 4×8 pixels, and 4×4 pixels, belong to the first category. Also, of the block sizes for luminance signals, blocks of other sizes (i.e., 4×2 pixels, 2×4 pixels, 2×2 pixels) belong to the second category.

Now, the block size of orthogonal transform which the orthogonal transform unit 64 performs is 4×4 pixels. That is to say, the block categorizing unit 91 classifies the blocks of color difference signals into categories according to the orthogonal transform block size. In other words, the first category is a category to which blocks of a size equal to or greater than the orthogonal transform block size belong, and the second category is a category to which blocks smaller than the orthogonal transform block size belong.

With regard to a current block classified to the first category in this way, the block categorizing unit 91 supplies a control signal, to cause color difference signal motion prediction according to the H.264/AVC format to be performed, to the motion compensation unit 83.

On the other hand, with regard to a current block classified to the second category in this way, the block categorizing unit 91 supplies a control signal, to cause color difference signal motion prediction described next with reference to FIG. 9 to be performed, to the color difference motion vector generating unit 92.

Figure 9:
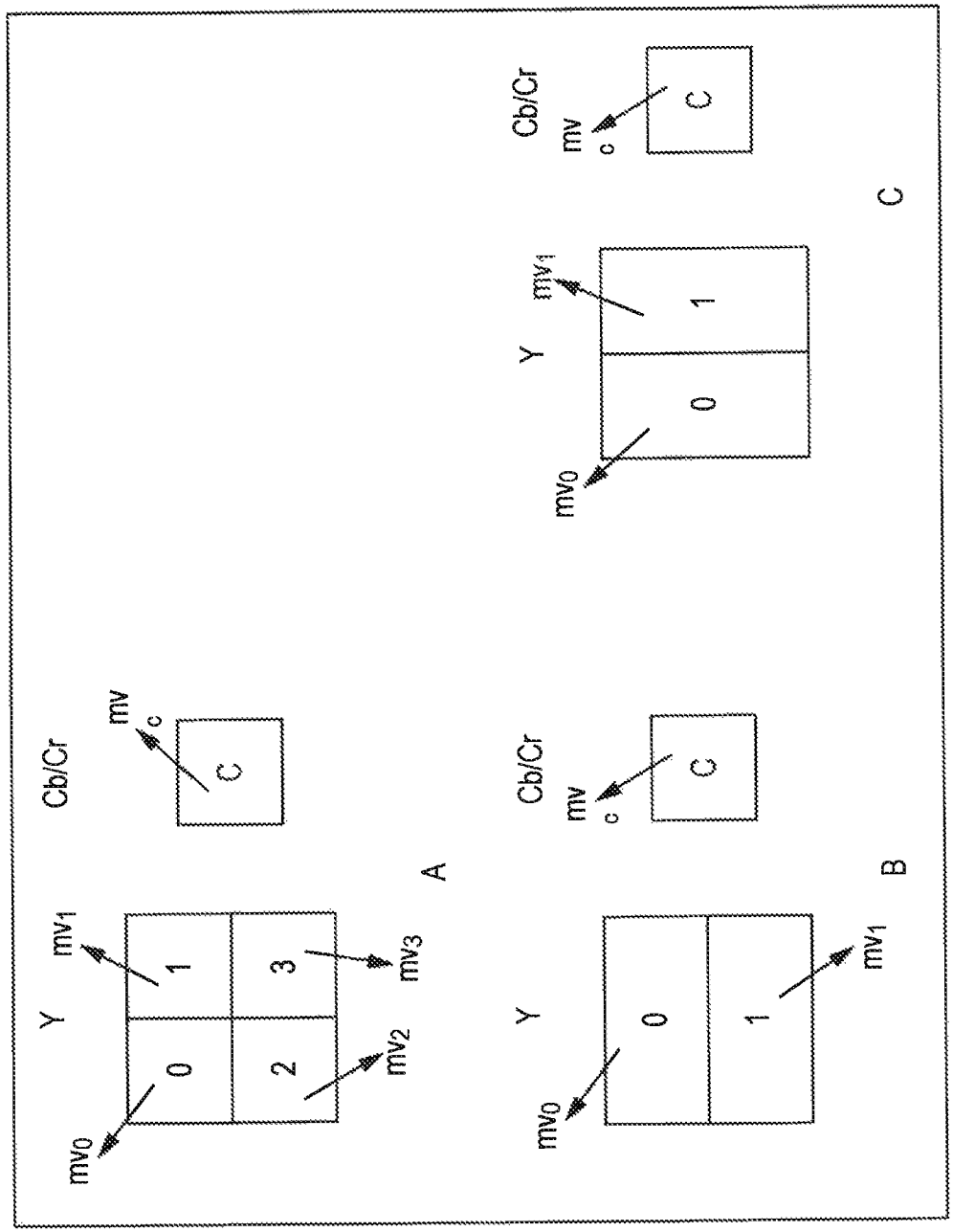
FIG. 9 is a diagram describing motion prediction processing of color difference signals.

FIG. 9 is a diagram for describing color difference signal motion prediction processing at the color difference motion vector generating unit 92. Note that A in FIG. 9 illustrates an example of color difference signals with a case where a macroblock of luminance signals is configured of four 4×4 pixel blocks. B in FIG. 9 illustrates an example of color difference signals with a case where a macroblock of luminance signals is configured of two 8×4 pixel blocks. C in FIG. 9 illustrates an example of color difference signals with a case where a macroblock of luminance signals is configured of two 4×8 pixel blocks.

First, in a case where a macroblock of luminance signals is configured of four 4×4 pixel blocks appended with 0 through 3, the four luminance signal blocks are corresponded with one color difference signal 4×4 block appended with C, as shown in A in FIG. 9.

For reference, in the case of the H.264/AVC format, color difference signals are configured of four 2×2 blocks. That is to say, a single color difference signal 4×4 block is re-corresponded with the four luminance signal blocks, rather than the four color difference signal 2×2 blocks corresponding in the encoding stipulations. To further restate this, a single color difference signal 4×4 block is newly made to correspond to the four luminance signal blocks.

At this time, there exist four motion vector information of $mv_0$, $mv_1$, $mv_2$, and $mv_3$, as to the four luminance signal blocks. The color difference motion vector generating unit 92 calculates the motion vector information $mv_c$ of the above-described one color difference signal 4×4 block as shown in the following Expression (8), using these four motion vector information.

$$mv_c = f(mv_0, mv_1, mv_2, mv_3) \quad (8)$$

In Expression (8), processing by averaging, for example, is performed for f( ). In this case, the motion vector information $mv_c$ is calculated at the color difference motion vector generating unit 92 for each of the horizontal component and vertical component, as shown in the next Expression (9).

[Mathematical Expression 6]

$$mv_c = \frac{mv_0 + mv_1 + mv_2 + mv_3 + 4}{8} \quad (9)$$

Note that in the event that the input signals are of the 4:2:0 format, the color difference signals only have half the resolution as to the luminance signals, so at the right side of the Expression (9), this is division by 8 (/8) and not division by 4 (/4).

Alternatively, motion vector difference information $dmv_c$ is obtained as in the following Expression (11), using the prediction motion vector information $pmv_c$ regarding the color difference signals calculated as with the following Expression (10) and the motion vector information $mv_c$ from a motion search performed as to the color difference signals.

$$pmv_c = f(mv_0, mv_1, mv_2, mv_3) \quad (10)$$

In Expression (10) as well, processing by averaging such as shown in Expression (9) for example, is performed for f( ).

$$dmv_c = mv_c - pmv_c \quad (11)$$

This motion vector difference information may be sent to the decoding side. Note that details thereof will be described later with reference to FIG. 15 and FIG. 16.

The above-described motion prediction processing for color difference signals may be performed for both of Cb/Cr, or for Cb/Cr each independently. That is to say, both Cb/Cr may be made to have the single motion vector information $mv_c$, or Cb/CR may be made to independently have motion vector information $mv_{cb}$ and $mv_{cr}$.

Now, while description has been made regarding a case that the current block for luminance signals is 4×4 pixels (case of A in FIG. 9) in the above description, in the event that the current block for luminance signals is 8×4 pixels a single color difference signal 4×4 block indicated by C is made to correspond to the two luminance signals indicated by 0 and 1, as shown in B in FIG. 9. The motion vector information of the two 8×4 blocks is then used to calculate the motion vector information $mv_c$ of the single color difference signal 4×4 block.

In the same way, in the event that the current block for luminance signals is 4×8 pixels, a single color difference signal 4×4 block indicated by C is made to correspond to the two luminance signal blocks indicated by 0 and 1, as shown in C in FIG. 9. The motion vector information of the two 8×4 blocks is then used to calculate the motion vector information $mv_c$ of the single color difference signal 4×4 block.

Incidentally, in the case of the H.264/AVC format, color difference signals are configured of two 2×4 pixel blocks while luminance signals are configured of two 4×8 pixel blocks. Color difference signals are configured of two 4×2 pixel blocks while luminance signals are configured of two 8×4 pixel blocks.

Also, besides processing by averaging, processing shown in the next Expression (12), for example, may be performed for f( ) in the above-described Expression (8). Note that the processing shown in Expression (12), for example, may be performed for f( ) in Expression (10) as well, as a matter of course.

[Mathematical Expression 7]

$$mv_{ci} = \frac{mv_i + 1}{2}; i = 0, \ldots, 3 \quad (12)$$

Specifically, the color difference motion vector generating unit 92 uses the motion vector information $mv_0$, $mv_1$, $mv_2$, and $mv_3$, corresponding to the four luminance signal blocks, to calculate $mv_{ci}$ as shown in Expression (12), and selects the $mv_{ci}$ which realizes the highest encoding efficiency with the smallest residual out of i=0 through 3, as $mv_c$.

That is to say, the color difference motion vector generating unit 92 selects from the motion vectors for the corresponding luminance signal blocks that which yields the highest encoding efficiency as to color difference signals, and performs scaling thereof taking into consideration the format of color difference signals such as 4:2:0 for example, thereby generating a motion vector for the color difference signal block. At this time, the color difference motion vector generating unit 92 generates a flag relating to which i was used from i=0 through 3, and supplies this to the lossless encoding unit 66, so as to be added to the header of the compressed image to be transmitted to the decoding side.

The flag may be transmitted separately for the horizontal direction and vertical direction, or a single flag may be transmitted for both the horizontal direction and vertical direction. A later-described image decoding device 101 can decode the compressed image and obtain this flag, thereby reconstructing $mv_c$.

As described above, in the event that the block size of the color difference signals is smaller than the block size of orthogonal transform, the motion vector of a single color difference signal block corresponding to multiple luminance signal blocks is generated using the motion vectors of the multiple luminance signal blocks.

This means that no boundaries of blocks for motion prediction (compensation) exist within the 4×4 size block relating to color difference, and occurrence of non-zero coefficients due to orthogonal transform is reduced, whereby encoding efficiency can be improved.

Moreover, at the time of motion prediction, if the current block of luminance signals is 4×4 pixels, with regard to color difference signals there has been the need with the H.264/AVC format to calculate addresses for four 2×2 blocks and perform memory access. In contrast with this, by performing the above-described processing, memory access calculation has to be performed only once, so the necessary memory bandwidth can be reduced.

[Description of Encoding Processing of Image Encoding Device]

Next, the encoding processing of the image encoding device 51 in FIG. 4 will be described with reference to the flowchart in FIG. 10.

In step S11, the A/D conversion unit 61 converts an input image from analog to digital. In step S12, the screen rearranging buffer 62 stores the image supplied from the A/D conversion unit 61, and performs sorting from the sequence for displaying the pictures to the sequence for encoding.

In step S13, the computing unit 63 computes difference between an image sorted in step S12 and the prediction image. The prediction image is supplied to the computing unit 63 from the motion prediction/compensation unit 75 in the event of performing inter prediction, and from the intra prediction unit 74 in the event of performing intra prediction, via the prediction image selecting unit 78.

The difference data is smaller in the data amount as compared to the original image data. Accordingly, the data amount can be compressed as compared to the case of encoding the original image without change.

In step S14, the orthogonal transform unit 64 subjects the difference information supplied from the computing unit 63 to orthogonal transform. Specifically, orthogonal transform, such as discrete cosine transform, Karhunen-Loéve transform, or the like, is performed, and a transform coefficient is output. In step S15, the quantization unit 65 quantizes the transform coefficient. At the time of this quantization, a rate is controlled such that later-described processing in step S25 will be described.

The difference information thus quantized is locally decoded as follows. Specifically, in step S16, the inverse quantization unit 68 subjects the transform coefficient quantized by the quantization unit 65 to inverse quantization using a property corresponding to the property of the quantization unit 65. In step S17, the inverse orthogonal transform unit 69 subjects the transform coefficient subjected to inverse quantization by the inverse quantization unit 68 to inverse orthogonal transform using a property corresponding to the property of the orthogonal transform unit 64.

In step S18, the computing unit 70 adds the prediction image input via the prediction image selecting unit 78 to the locally decoded difference information, and generates a locally decoded image (the image corresponding to the input to the computing unit 63). In step S19, the deblocking filter 71 subjects the image output from the computing unit 70 to filtering. Thus, block distortion is removed. In step S20, the frame memory 72 stores the image subjected to filtering. Note that an image not subjected to filtering processing by the deblocking filter 71 is also supplied from the computing unit 70 to the frame memory 72 for storing.

In step S21, the intra prediction unit 74 and motion prediction/compensation unit 75 each perform image prediction processing. Specifically, in step S21, the intra prediction unit 74 performs intra prediction processing in the intra prediction mode. The motion prediction/compensation unit 75 performs motion prediction and compensation processing in the inter prediction mode.

While details of prediction processing in step S21 will be described later with reference to FIG. 11, first, due to this processing, prediction processing is performed in each of all of the candidate intra prediction modes, and cost function values are each obtained for all of the candidate intra prediction modes. Then, based on the calculated cost function values, an optimal intra prediction mode is selected, and a prediction image generated by intra prediction in the optimal intra prediction mode, and the cost function value thereof, are supplied to the prediction image selecting unit 78.

Also, due to this processing, prediction processing is performed in each of all the candidate inter prediction modes, and cost function values are each obtained for all of the candidate inter prediction modes. Based on the calculated cost function values, an optimal inter prediction mode is selected from the inter prediction modes.

Note that specifically, motion prediction, calculation of cost function values, and determination of optimal inter prediction mode, are performed for luminance signals. Current blocks are classified into categories according to the block size indicated in the optimal inter prediction mode, and motion prediction according to the classified categories is performed for the color difference signals. A prediction image is then generated in the optimal inter prediction mode, and the generated prediction image and the cost function value thereof are supplied to the prediction image selecting unit 78.

In step S22, the prediction image selecting unit 78 determines one of the optimal intra prediction mode and the optimal inter prediction mode to be the optimal prediction mode based on the cost function values output from the intra prediction unit 74 and the motion prediction/compensation unit 75. The prediction image selecting unit 78 then selects the prediction image in the determined optimal prediction mode, and supplies to the computing units 63 and 70. This prediction image is, as described above, used for calculations in steps S13 and S18.

Note that the selection information of this prediction image is supplied to the intra prediction unit 74 or motion prediction/compensation unit 75. In the event that the prediction image in the optimal intra prediction mode has been selected, the intra prediction unit 74 supplies information indicating the optimal intra prediction mode (i.e., intra prediction mode information) to the lossless encoding unit 66.

In the event that the prediction image in the optimal inter prediction mode has been selected, the motion prediction/compensation unit 75 outputs information indicating the optimal inter prediction mode, and further, if necessary, information according to the optimal inter prediction mode, to the lossless encoding unit 66. Examples of the information according to the optimal inter prediction mode include motion vector information, reference frame information, and so forth.

In step S23, the lossless encoding unit 66 encodes the quantized transform coefficient output from the quantization unit 65. Specifically, the difference image is subjected to lossless encoding such as variable length coding, arithmetic coding, or the like, and compressed. At this time, the intra prediction mode information from the intra prediction unit 74, or the information according to the optimal inter prediction mode from the motion prediction/compensation unit 75, and so forth input to the lossless encoding unit 66 in step S22 described above are also encoded, and added to the header information.

For example, information indicating the inter prediction mode is encoded for each macroblock. The motion vector information and reference frame information are encoded for each current block.

Note that in the event that motion vector difference information of color difference signals is generated by the inter motion prediction in step S21, the generated motion vector difference information of color difference signals is supplied from the color difference motion vector determining unit 77, so this information is also encoded. This will be described later in detail with reference to FIG. 15 and FIG. 16.

In step S24, the storage buffer 67 stores the difference image as the compressed image. The compressed image stored in the storage buffer 67 is read out as appropriate, and transmitted to the decoding side via the transmission path.

In step S25, the rate control unit 79 controls the rate of the quantization operation of the quantization unit 65 based on the compressed image stored in the storage buffer 67 so as not to cause overflow or underflow.

[Description of Prediction Processing]

Next, the prediction processing in step S21 in FIG. 10 will be described with reference to the flowchart in FIG. 11.

In the event that the image to be processed, supplied from the screen rearranging buffer 62, is an image in a block to be subjected to intra processing, the decoded image to be referenced is read out from the frame memory 72, and supplied to the intra prediction unit 74 via the switch 73. In step S31, based on these images, the intra prediction unit 74 performs intra prediction as to the pixels in the block to be processed using all of the candidate intra prediction modes. Note that pixels not subjected to deblocking filtering by the deblocking filter 71 are used as the decoded pixels to be referenced.

The details of the intra prediction processing in step S31 will be described later with reference to FIG. 12, but according to this processing, intra prediction is performed using all of the candidate intra prediction modes, and a cost function value is calculated as to all of the candidate intra prediction modes. The optimal intra prediction mode is then selected based on the calculated cost function values, and the prediction image generated by the intra prediction in the optimal intra prediction mode, and the cost function value thereof are supplied to the prediction image selecting unit 78.

In the event that the image to be processed supplied from the screen rearranging buffer 62 is an image to be subjected to inter processing, the image to be referenced is read out from the frame memory 72, and supplied to the motion searching unit 81 via the switch 73. In step S32, based on these images, the motion searching unit 81 performs inter motion prediction processing using luminance signals. That is to say, the motion searching unit 81 references the image supplied from the frame memory 72 to perform the motion prediction processing using luminance signals in all of the candidate inter prediction modes.

Figure 13:
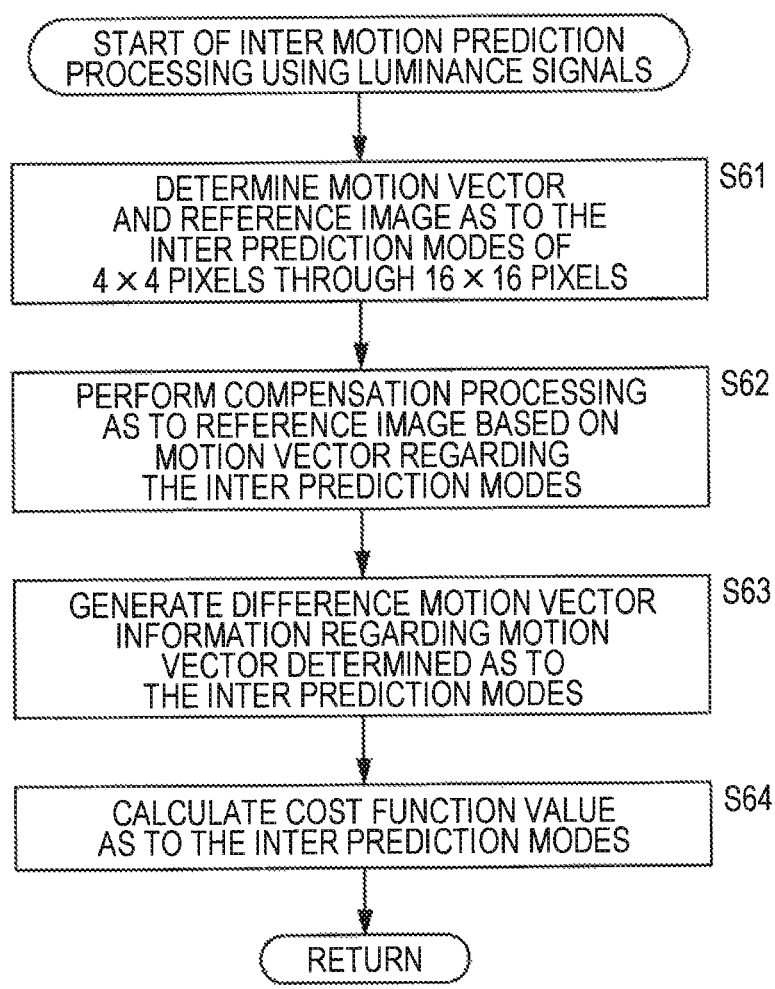
FIG. 13 is a flowchart for describing inter motion prediction processing using luminance signals in step S32 in FIG. 11.

The details of the inter motion prediction processing in step S32 will be described later with reference to FIG. 13. According to this processing, motion prediction processing is performed in all of the candidate inter prediction modes using luminance signals, and a cost function value is calculated by the mode determining unit 82 for each of all candidate inter prediction modes.

In step S33, the mode determining unit 82 determines the optimal inter prediction mode from all candidate inter prediction modes, based on the calculated cost function values. That is to say, the mode determining unit 82 determines the prediction mode of which the cost function value is the smallest to be the optimal intra prediction mode.

The mode determining unit 82 supplies information of the optimal inter prediction mode that has been determined, and motion vector information corresponding thereto, to the motion compensation unit 83. Also, the mode determining unit 82 supplies information of the optimal inter prediction mode that has been determined to the color difference block determining unit 76 as well.

In step S34, the color difference block determining unit 76, color difference motion vector determining unit 77, and motion compensation unit 83 execute motion prediction processing as to the color difference signals.

Figure 14:
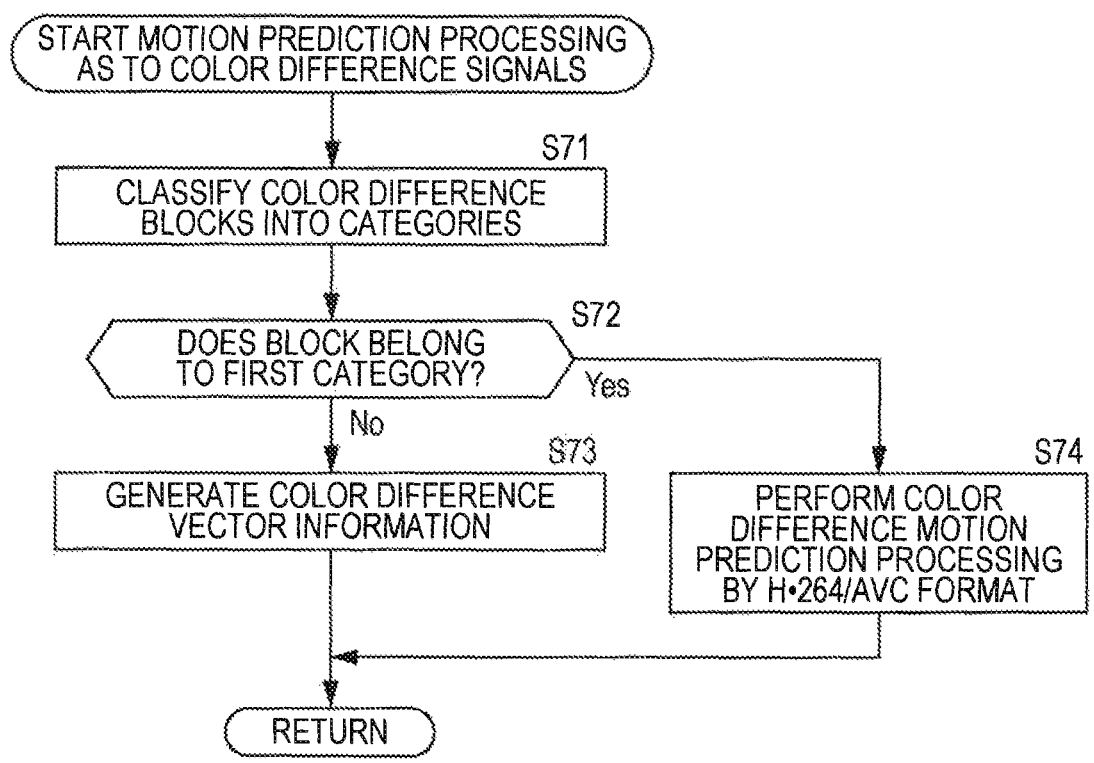
FIG. 14 is a flowchart for describing motion prediction processing as to color difference signals in step S34 in FIG. 11.

Details of the motion prediction processing as to the color difference signals in step S34 will be described later with reference to FIG. 14. Due to this processing, color difference signal motion prediction is performed in accordance with the block size of the optimal inter prediction mode.

That is to say, the color difference signal blocks are classified into categories based on the color difference signal block size determined from the block size which the optimal inter prediction mode indicates, and motion vectors are generated for the color difference signal blocks.

In step S35, the motion compensation unit 83 subjects the reference image to compensation processing based on the motion vector in the optimal inter prediction mode from the mode determining unit 82, and generates a prediction image for the current block.

That is to say, the motion compensation unit 83 subjects the reference image to compensation processing based on the motion vector in the optimal inter prediction mode from the mode determining unit 82, and generates a prediction image for the current luminance signal block. In the event that a control signal is supplied from the block categorizing unit 91, the motion compensation unit 83 then generates a motion vector for the color difference signals by the H.264/AVC format, and generates a prediction image for the current color difference signal block using the generated motion vector. On the other hand, in the event that color difference motion vector information is supplied from the color difference motion vector generating unit 92, the motion compensation unit 83 performs compensation processing using the motion vector of the color difference signals which this information indicates, and generates a prediction image of the current color difference signal block.

The prediction image of the optimal inter prediction mode generated as described above, and the cost function value hereof, are supplied to the prediction image selecting unit 78.

[Description of Intra Prediction Processing]

Next, the intra prediction processing in step S31 in FIG. 11 will be described with reference to the flowchart in FIG. 12. Note that, with the example in FIG. 12, description will be made regarding a case of a luminance signal as an example.

In step S41, the intra prediction unit 74 performs intra prediction as to the intra prediction modes of 4×4 pixels, 8×8 pixels, and 16×16 pixels.

With regard to intra prediction modes for a luminance signal, there are provided prediction modes in nine kinds of block units of 4×4 pixels and 8×8 pixels, and in four kinds of macroblock units of 16×16 pixels, and with regard to intra prediction modes for a color difference signal, there are provided four kinds of prediction modes in block units of 8×8 pixels. The intra prediction modes for color difference signals may be set independently from the intra prediction modes for luminance signals. With regard to the intra prediction modes of 4×4 pixels and 8×8 pixels of a luminance signal, one intra prediction mode is defined for each luminance signal block of 4×4 pixels and 8×8 pixels. With regard to the intra prediction mode of 16×16 pixels of a luminance signal, and the intra prediction mode of a color difference signal, one prediction mode is defined as to one macroblock.

Specifically, the intra prediction unit 74 performs intra prediction as to the pixels in the block to be processed with reference to the decoded image read out from the frame memory 72 and supplied via the switch 73. This intra prediction processing is performed in the intra prediction modes, and accordingly, prediction images in the intra prediction modes are generated. Note that pixels not subjected to deblocking filtering by the deblocking filter 71 are used as the decoded pixels to be referenced.

In step S42, the intra prediction unit 74 calculates a cost function value as to the intra prediction modes of 4×4 pixels, 8×8 pixels, and 16×16 pixels. Here, calculation of a cost function value is performed based on one of the techniques of a High Complexity mode or Low Complexity mode. These modes are determined in JM that is reference software in the H.264/AVC format.

Specifically, in the High Complexity mode, tentatively, up to encoding processing is performed as to all of the candidate prediction modes the processing in step S41. A cost function value represented with the following Expression (13) is then calculated as to the prediction modes, and a prediction mode that provides the minimum value thereof is selected as the optimal prediction mode.

$$\text{Cost(Mode)} = D + \lambda \cdot R \quad (13)$$

D denotes difference (distortion) between the raw image and a decoded image, R denotes a generated code amount including an orthogonal transform coefficient, and λ denotes a LaGrange multiplier to be provided as a function of a quantization parameter QP.

On the other hand, in the Low Complexity mode, a prediction image is generated, and up to header bits of motion vector information, prediction mode information, flag information, and so forth are calculated as to all of the candidate prediction modes as the processing in step S41. A cost function value represented with the following Expression (13) is then calculated as to the prediction modes, and a prediction mode that provides the minimum value thereof is selected as the optimal prediction mode.

$$\text{Cost(Mode)} = D + Q P \text{toQuant}(QP) \cdot \text{Header\_Bit} \quad (14)$$

D denotes difference (distortion) between the raw image and a decoded image, Header_Bit denotes header bits as to a prediction mode, and QPtoQuant is a function to be provided as a function of the quantization parameter QP.

In the Low Complexity mode, a prediction image is only generated as to all of the prediction modes, and there is no need to perform encoding processing and decoding processing, and accordingly, a calculation amount can be reduced.

In step S43, the intra prediction unit 74 determines the optimal mode as to the intra prediction modes of 4×4 pixels, 8×8 pixels, and 16×16 pixels. Specifically, as described above, in the event of the intra 4×4 prediction mode and intra 8×8 prediction mode, the number of prediction mode types is nine, and in the event of the intra 16×16 prediction mode, the number of prediction mode types is four. Accordingly, the intra prediction unit 74 determines, based on the cost function values calculated in step S42, the optimal intra 4×4 prediction mode, optimal intra 8×8 prediction mode, and optimal intra 16×16 prediction mode out thereof.

In step S44, the intra prediction unit 74 selects the optimal intra prediction mode out of the optimal modes determined as to the intra prediction modes of 4×4 pixels, 8×8 pixels, and 16×16 pixels based on the cost function values calculated in step S42. Specifically, the intra prediction unit 74 selects a mode of which the cost function value is the minimum value out of the optimal modes determined as to 4×4 pixels, 8×8 pixels, and 16×16 pixels, as the optimal intra prediction mode. The intra prediction unit 74 then supplies the prediction image generated in the optimal intra prediction mode, and the cost function value thereof to the prediction image selecting unit 78.

[Description of Inter Motion Prediction Processing Using Luminance Signals]

Next, the inter motion prediction processing using luminance signals in step S32 of FIG. 11 will be described with reference to the flowchart in FIG. 13. Note that at the motion searching unit 81, based on the motion searching method implemented in JM described above with reference to FIG. 3, a motion vector of integer pixel precision is obtained, and a motion vector of decimal pixel precision is obtained.

In step S61, the motion searching unit 81 uses luminance signals to determine motion vectors and reference images for each of the eight types of inter prediction modes made up of 16×16 pixels through 4×4 pixels, described above with reference to FIG. 5.

That is to say, the motion searching unit 81 is supplied with the image for inter processing from the screen rearranging buffer 62, and reference image pixel values of integer pixel precision from the frame memory 72. The motion searching unit 81 uses the luminance signals of these images to obtain an integer pixel precision motion vector and reference image yielding the smallest cost function value such as SAD or the like within a predetermined search range of a candidate reference image, for each of the inter prediction modes. Also, the motion searching unit 81 obtains a half-pixel precision motion vector and reference image yielding the smallest cost function value such as SAD or the like, and further obtains a quarter-pixel precision motion vector and reference image yielding the smallest cost function value such as SAD or the like.

Thus, the motion vector and reference image are each determined for the luminance signals, with regard to the current block to be processed in each inter prediction mode. Each motion vector information obtained regarding each current block of the luminance signals by the motion searching unit 81 is supplied to the mode determining unit 82.

The mode determining unit 82 performs the processing of the following steps S62 through S64 in order to calculate the cost function values shown in the above-described Expression (13) or Expression (14).

That is to say, in step S62, the mode determining unit 82 performs compensation processing on the reference image, based on the motion vector from the motion searching unit 81. Specifically, the mode determining unit 82 generates a prediction image of the current block by performing interpolation of decimal pixel precision pixel values, using the reference image pixel values of integer pixel precision from the frame memory 72, motion vector information of decimal pixel precision, and a filter coefficient of an interpolation filter.

In step S63, the mode determining unit 82 generates difference motion vector information $mdv_E$ regarding the eight types of inter prediction modes made up of 16×16 pixels through 4×4 pixels. At this time, the motion vector generating method described above with reference to FIG. 7 is used.

Specifically, the mode determining unit 82 uses adjacent block motion vector information to calculate prediction motion vector information $pmv_E$ as to the current block E by median prediction with the above-described Expression (6). The mode determining unit 82 then obtains difference motion vector information $mdv_E$ from the difference between the motion vector information $mv_E$ from the mode determining unit 82 and the prediction motion vector information $pmv_E$ that has been calculated.

The obtained calculated difference motion vector information is used at the time of calculating the cost function value in the next step S64, and in the event that the prediction image selecting unit 78 ultimately selects the corresponding prediction image, this is supplied to the lossless encoding unit 66 along with the prediction mode information and reference frame information and so forth.

In step S64, the mode determining unit 82 calculates the cost function values shown in the above-described Expression (13) or Expression (14) for each of the eight types of inter prediction modes made up of 16×16 pixels through 4×4 pixels.

Specifically, the mode determining unit 82 calculates the cost function value, using the image for inter processing from the screen rearranging buffer 62, integer pixel precision reference image pixel value from the frame memory 72, decimal pixel precision motion vector information, and difference motion vector information and so forth. The cost function value calculated here is used at the time of determining the optimal inter prediction mode in step S33 in FIG. 11 described above.

[Description of Motion Prediction Processing as to Luminance Signals]

Next motion prediction processing as to color difference signals will be described with reference to the flowchart in FIG. 14.

The color difference block determining unit 76 is supplied with information of the optimal inter prediction mode from the mode determining unit 82. The color difference block determining unit 76 determines the block size of the color difference signal block in accordance with the block size of the luminance signal block which the optimal inter prediction mode indicates, and supplies information of the color difference block size that has been determined to the block categorizing unit 91.

That is to say, in the event that the block size of luminance signals is 16×16 pixels, 16×8 pixels, 8×16 pixels, or 8×8 pixels, the color difference block determining unit 76 determines that the block size at the color difference signals is 8×8 pixels, 8×4 pixels, 4×8 pixels, or 4×4 pixels, respectively. Also, in the event that the block size of luminance signals is 8×4 pixels, 4×8 pixels, or 4×4 pixels, the color difference block determining unit 76 determines that the block size at the color difference signals is 4×2 pixels, 2×4 pixels, or 2×2 pixels.

In step S71, the block categorizing unit 91 classifies color difference signal blocks into categories. For example, in the event that the block size of color difference signals is one size of 8×8 pixels, 8×4 pixels, 4×8 pixels, or 4×4 pixels, the block categorizing unit 91 classifies the color difference signal block into the first category. On the other hand, in the event that the block size of color difference signals is one size of 4×2 pixels, 2×4 pixels, or 2×2 pixels, the block categorizing unit 91 classifies the color difference signal block into the second category.

In step S72, the block categorizing unit 91 determines whether or not the color difference signal block is a block which belongs to the first category.

In the event that determination is made in step S72 that the block does not belong to the first category, i.e., is a block belonging to the second category, the processing advances to step S73. In this case, a control signal which causes motion compensation of color difference signals to be performed is supplied from the block categorizing unit 91 to the color difference motion vector generating unit 92.

Correspondingly, in step S73 the color difference motion vector generating unit 92 generates color difference motion vector information. That is to say, as described with reference to A in FIG. 9 above, the color difference motion vector generating unit 92 corresponds a single color difference signal block (e.g., one 4×4 block) to multiple luminance signal blocks (e.g., four 4×4 blocks) deemed to belong to the second category. The color difference motion vector generating unit 92 then generates motion vector information of the single color difference signal block, using the motion vector information obtained from the mode determining unit 82.

Figure 11:
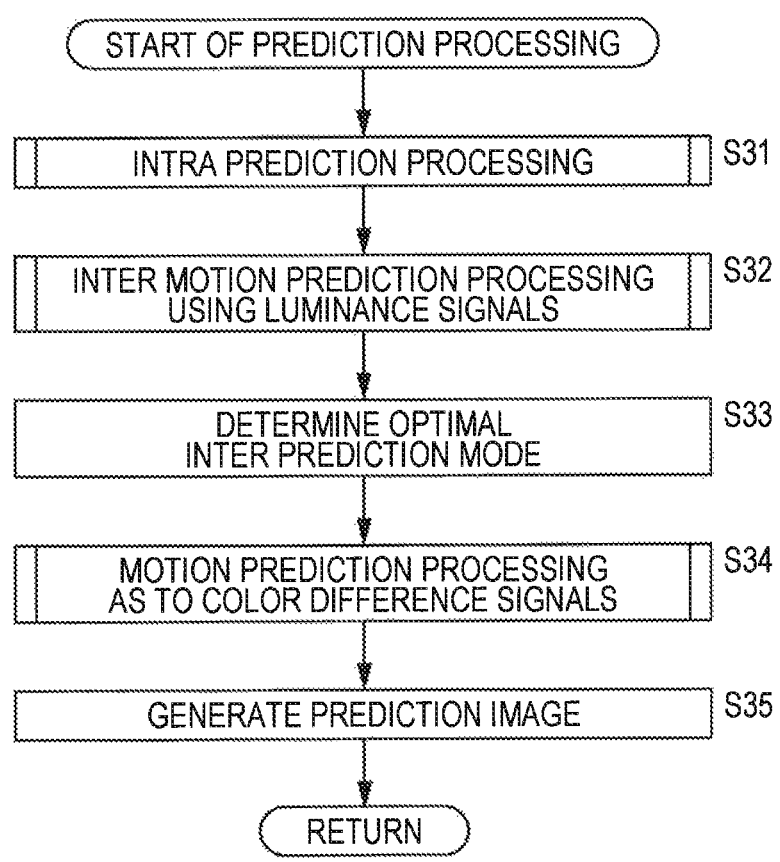
FIG. 11 is a flowchart for describing prediction processing in step S21 in FIG. 10.

The generated color difference motion vector information is supplied to the motion compensation unit 83, and is used for generating a color difference signal prediction image in step S35 in FIG. 11.

On the other hand, in the event that determination is made in step S72 that the block belongs to the first category, the processing advances to step S74. In this case, a control signal for causing motion prediction of color difference signals according to the H.264/AVC format to be performed is output from the block categorizing unit 91 to the motion compensation unit 83.

Accordingly, in step S74 the motion compensation unit 83 performs color difference motion prediction processing according to the H.264/AVC format. For example, in the event that the luminance signal block is a 8×8 pixel block, the motion compensation unit 83 performs motion prediction processing described with reference to FIG. 2 on a color difference signal block which is a 4×4 pixel block.

The generated color difference motion vector information is used for generating a prediction image of color difference signals in step S35 in FIG. 11.

As described above, color difference motion vector information is generated using motion vector information of the luminance signal block, so there is no need to send to the decoding side. On the other hand, an arrangement may be made where, as described next, prediction motion vector information is obtained, a motion vector for the color difference signal block is also searched, and difference information of these is sent to the decoding side.

[Configuration Example of Motion Prediction/Compensation Unit and Color Difference Motion Vector Determining Unit]

Figure 15:
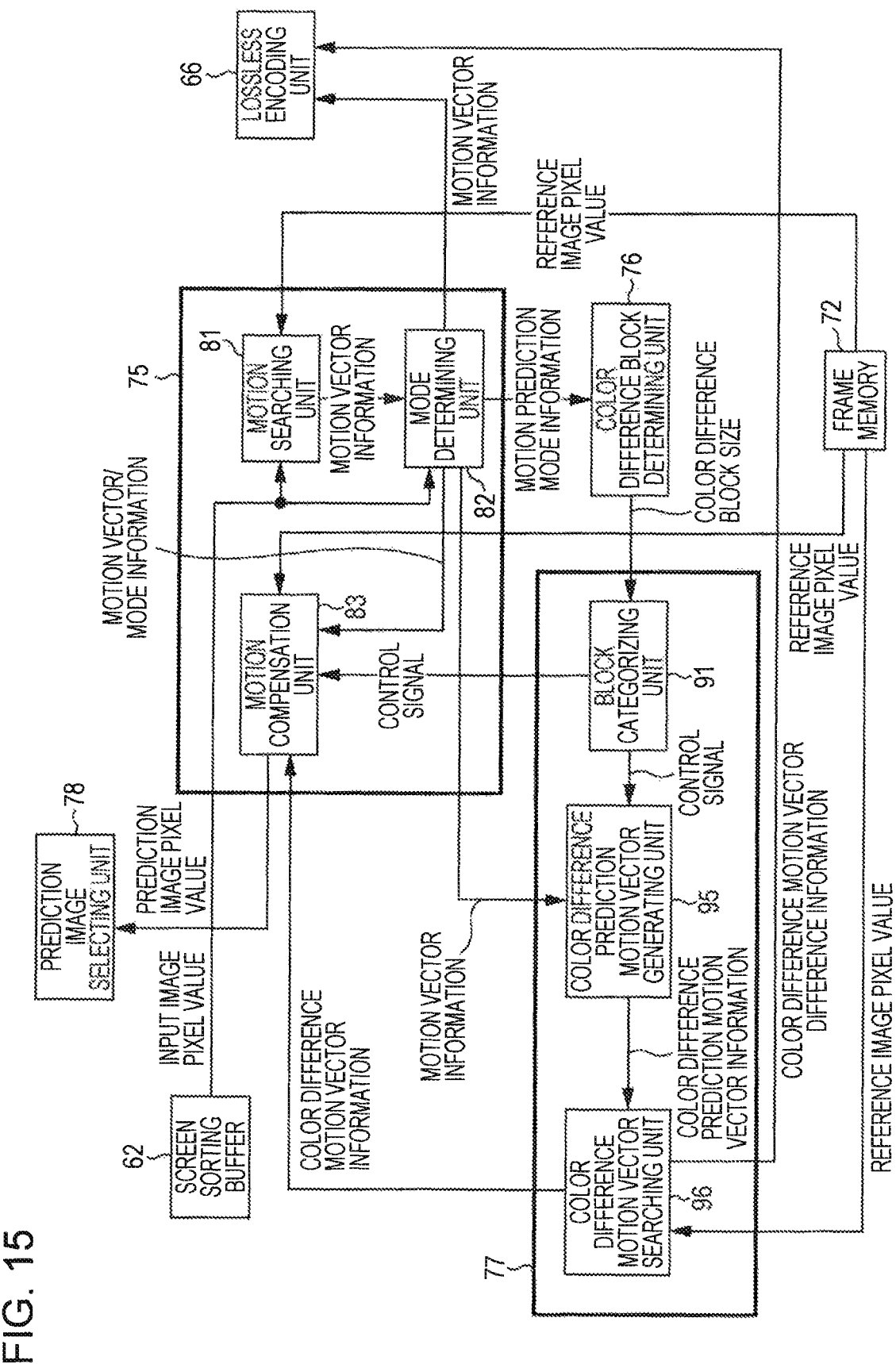
FIG. 15 is a block diagram illustrating another configuration example of the motion prediction/compensation unit and color difference motion vector determining unit in FIG. 4.

FIG. 15 is a block diagram illustrating a detailed configuration example of the motion prediction/compensation unit 75 and color difference motion vector determining unit 77 in a case of sending color difference motion vector difference information to the decoding side.

The motion prediction/compensation unit 75 in FIG. 15 has in common with the motion prediction/compensation unit 75 in FIG. 8 the point of having the motion searching unit 81, mode determining unit 82, and motion compensation unit 83. The color difference motion vector determining unit 77 in FIG. 15 has in common with the motion prediction/compensation unit 75 in FIG. 8 is the point of having the block categorizing unit 91. On the other hand, the color difference motion vector determining unit 77 in FIG. 15 differs in the point of the color difference motion vector generating unit 92 having been replaced by a color difference prediction motion vector generating unit 95, and a color difference motion vector searching unit 96 has been added. Note however, that the color difference prediction motion vector generating unit 95 is different only in name, and basically performs the same processing as the color difference motion vector generating unit 92 in FIG. 8.

That is to say, the color difference prediction motion vector generating unit 95 corresponds a single color difference signal block as to multiple luminance signal blocks, based on control signals from the block categorizing unit 91. The color difference prediction motion vector generating unit 95 then generates prediction motion vector information of the single block of color difference signals as with Expression (10) described above, using the motion vector information of multiple luminance blocks obtained from the mode determining unit 82.

The generated prediction motion vector information of color difference signals (color difference prediction motion vector information) is supplied to the color difference motion vector searching unit 96.

The color difference motion vector searching unit 96 obtains motion vector information for the color difference signal block which the color difference prediction motion vector generating unit 95 has made to correspond with the multiple luminance signals, using the reference image pixel values from the frame memory 72. At this time, the color difference motion vector searching unit 96 obtains a motion vector for the color difference signals within a predetermined search range centered on the color difference prediction motion vector generated by the color difference prediction motion vector generating unit 95.

Note that in this case as well, an integer pixel precision motion vector is obtained, and a decimal pixel precision motion vector is obtained, based on the motion search method implemented in JM described above with reference to FIG. 3. Accordingly, a cost function such as SAD is obtained, and an optimal motion vector is obtained, so an image for inter from the screen rearranging buffer 62 is also input, although omitted from the drawing.

The color difference motion vector searching unit 96 supplies the color difference motion vector information obtained regarding the color difference signal block to the motion compensation unit 83. Also, the color difference motion vector searching unit 96 obtains the difference between the color difference motion vector information and the color difference prediction motion vector information from the color difference prediction motion vector generating unit 95, and supplies the color difference motion vector difference information to the lossless encoding unit 66.

[Description of Motion Prediction Processing as to Luminance Signals]

Figure 16:
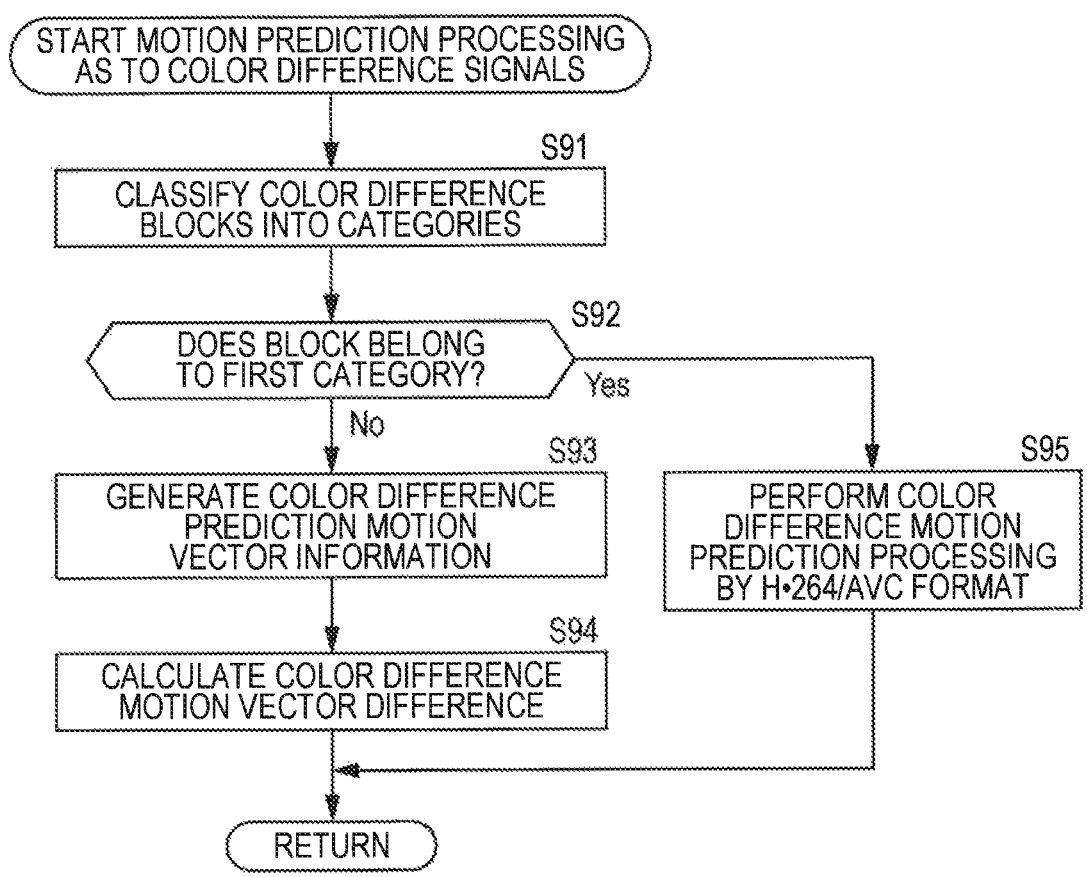
FIG. 16 is a flowchart for describing another example of motion prediction processing as to color difference signals in step S34 in FIG. 11.

Next, motion prediction processing as to color difference signals in step S34 of FIG. 11 in the case of FIG. 15 will be described with reference to the flowchart in FIG. 16. Note that other processing is basically the same processing as the processing of the case of FIG. 8 described above with reference to FIG. 10, and description which would be redundant will be omitted. Also, the processing of steps S91, S92, and S95 in FIG. 16 is the same as the processing of steps S71, S72, and S74 in FIG. 14.

The color difference block determining unit 76 is supplied with information of the optimal inter prediction mode from the mode determining unit 82. The color difference block determining unit 76 determines the block size of the color difference signal block in accordance with the block size of the luminance signal block which the optimal inter prediction mode indicates, and supplies information of the color difference block size that has been determined to the block categorizing unit 91.

In step S91, the block categorizing unit 91 classifies color difference signal blocks into categories. For example, in the event that the block size of color difference signals is one size of 8×8 pixels, 8×4 pixels, 4×8 pixels, or 4×4 pixels, the block categorizing unit 91 classifies the color difference signal block into the first category. On the other hand, in the event that the block size of color difference signals is one size of 4×2 pixels, 2×4 pixels, or 2×2 pixels, the block categorizing unit 91 classifies the color difference signal block into the second category.

In step S92, the block categorizing unit 91 determines whether or not the color difference signal block is a block which belongs to the first category.

In the event that determination is made in step S92 that the block does not belong to the first category, i.e., is a block belonging to the second category, the processing advances to step S93. In this case, a control signal which causes motion compensation of color difference signals to be performed is supplied from the block categorizing unit 91 to the color difference prediction motion vector generating unit 95.

On the other hand, in step S93 the color difference prediction motion vector generating unit 95 generates color difference prediction motion vector information. That is to say, as described with reference to A in FIG. 9 above, the color difference prediction motion vector generating unit 95 corresponds a single color difference signal block to multiple luminance signal blocks deemed to belong to the second category. The color difference prediction motion vector generating unit 95 then generates motion prediction vector information of the single color difference signal block, using the motion vector information obtained from the mode determining unit 82.

The generated color difference prediction motion vector information is supplied to the color difference motion vector searching unit 96. In step S94, the color difference motion vector searching unit 96 calculates the color difference motion vector difference. That is to say, the color difference motion vector searching unit 96 uses the reference image pixel values from the frame memory 72 to obtain motion vector information regarding the color difference signal block within a search range centered on the prediction motion vector information generated by the color difference prediction motion vector generating unit 95. The color difference motion vector searching unit 96 then calculates the difference between the color difference motion vector information and the color difference prediction motion vector from the color difference prediction motion vector generating unit 95.

The obtained color difference motion vector information is supplied to the motion compensation unit 83, and is used for generating the prediction image for color difference signals is step S35 of FIG. 11.

Figure 10:
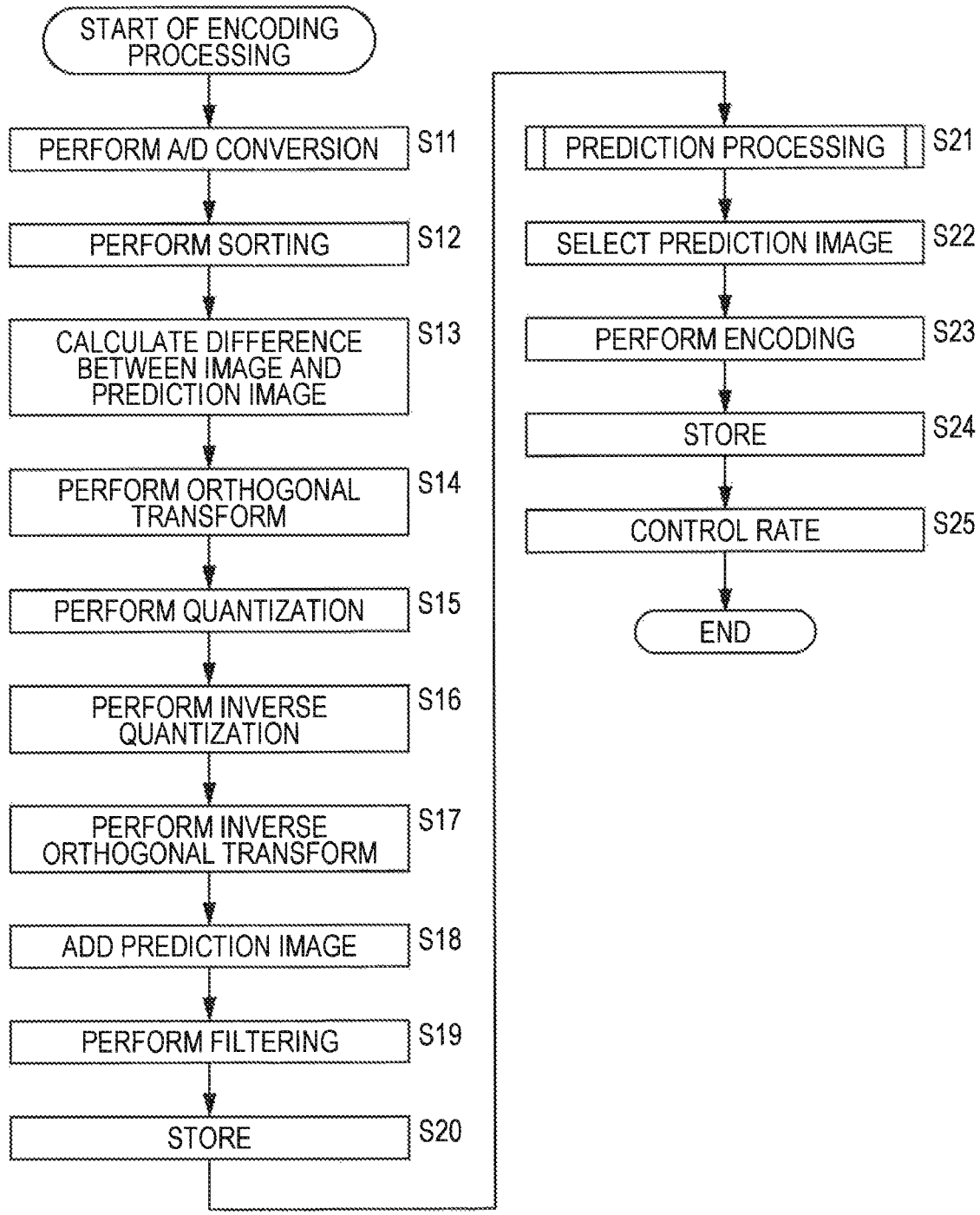
FIG. 10 is a flowchart for describing the encoding processing of the image encoding device in FIG. 4.

Also, the calculated color difference motion vector difference information is supplied to the lossless encoding unit 66, and in the event that the prediction image by inter prediction is selected in step S22 in FIG. 10, this is encoded in step S23 and added to the header of the compressed image and transmitted to the decoding side.

On the other hand, in the event that determination is made in step S92 that the block belongs to the first category, the processing advances to step S95. In this case, a control signal for causing motion prediction of color difference signals according to the H.264/AVC format to be performed is supplied from the block categorizing unit 91 to the motion compensation unit 83.

Accordingly, in step S95 the motion compensation unit 83 performs color difference motion prediction processing according to the H.264/AVC format. For example, in the event that the luminance signal block is a 8×8 pixel block, the motion compensation unit 83 performs motion prediction processing described with reference to FIG. 2 on a color difference signal block which is a 4×4 pixel block.

The generated color difference motion vector information is used for generating a prediction image of color difference signals in step S35 in FIG. 11.

The encoded compressed image is transmitted via a predetermined transmission path, and is decoded by an image decoding device.

[Configuration Example of Image Decoding Device]

Figure 17:
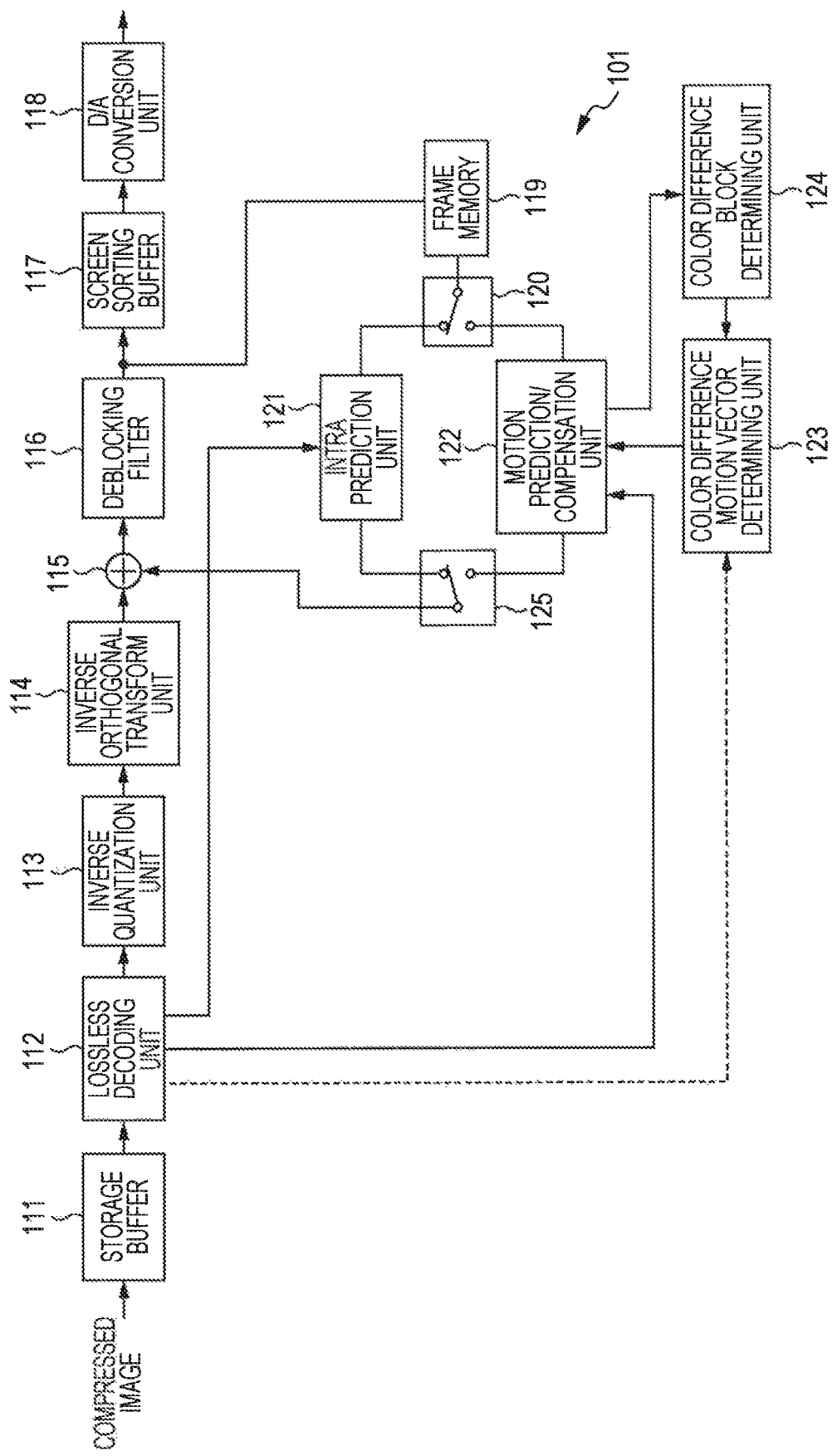
FIG. 17 is a block diagram illustrating the configuration of an embodiment of an image decoding device to which the present invention has been applied.

FIG. 17 represents the configuration of an embodiment of an image decoding device serving as the image processing device to which has been applied.

An image decoding device 101 is configured of an storage buffer 111, a lossless decoding unit 112, an inverse quantization unit 113, an inverse orthogonal transform unit 114, a computing unit 115, a deblocking filter 116, a screen rearranging buffer 117, a D/A conversion unit 118, frame memory 119, a switch 120, an intra prediction unit 121, a motion prediction/compensation unit 122, a color difference motion vector determining unit 123, a color difference block determining unit 124, and a switch 125.

The storage buffer 111 stores a transmitted compressed image. The lossless decoding unit 112 decodes information supplied from the storage buffer 111 and encoded by the lossless encoding unit 66 in FIG. 4 using a format corresponding to the encoding format of the lossless encoding unit 66. The inverse quantization unit 113 subjects the image decoded by the lossless decoding unit 112 to inverse quantization using a format corresponding to the quantization format of the quantization unit 65 in FIG. 4. The inverse orthogonal transform unit 114 subjects the output of the inverse quantization unit 113 to inverse orthogonal transform using a format corresponding to the orthogonal transform format of the orthogonal transform unit 64 in FIG. 4.

The output subject to inverse orthogonal transform is decoded by being added with the prediction image supplied from the switch 125 by the computing unit 115. The deblocking filter 116 removes the block distortion of the decoded image, then supplies to the frame memory 119 for storage, and also outputs to the screen rearranging buffer 117.

The screen rearranging buffer 117 performs rearranging of images. Specifically, the sequence of frames rearranged for encoding sequence by the screen rearranging buffer 62 in FIG. 4 is rearranged to the original display sequence. The D/A conversion unit 118 converts the image supplied from the screen rearranging buffer 117 from digital to analog, and outputs to an unshown display for display.

The switch 120 reads out an image to be subjected to inter processing and an image to be referenced from the frame memory 119, outputs to the motion prediction/compensation unit 122, and also reads out an image to be used for intra prediction from the frame memory 119, and supplies to the intra prediction unit 121.

Information indicating the intra prediction mode obtained by decoding the header information is supplied from the lossless decoding unit 112 to the intra prediction unit 121. The intra prediction unit 121 generates, based on this information, a prediction image, and outputs the generated prediction image to the switch 125.

Of the information obtained by decoding the header information, the prediction mode information, difference motion vector information, reference frame information, and so forth are supplied from the lossless decoding unit 112 to the motion prediction/compensation unit 122. The inter prediction mode information is transmitted thereto for each macroblock. The Motion vector information and reference frame information are transmitted thereto for each current block.

The motion prediction/compensation unit 122 generates pixel values of a prediction image as to the current block, with regard to luminance signals, in the prediction mode which the inter prediction mode information supplied from the lossless decoding unit 112.

Also, in the event that a control signal is supplied from the color difference block determining unit 124, the motion prediction/compensation unit 122 generates a motion vector for the color difference signals by the H.264/AVC format, and uses the generated motion vector to generate a prediction image of the current color difference signal block. In the event that color difference motion vector information is supplied from the color difference motion vector determining unit 123, the motion prediction/compensation unit 122 uses the motion vector of the color difference signals indicated by that information to generate a prediction image of the current color difference signal block. The pixel values of the generated prediction image are supplied to the computing unit 115 via the switch 125.

In the same way as with the color difference motion vector determining unit 77 in FIG. 4, the color difference motion vector determining unit 123 classifies which of the two categories the color difference signal block belongs to, based on the color difference block size information from the color difference block determining unit 124.

In the event of classifying the color difference signal block to the first category, the color difference motion vector determining unit 123 supplies a control signal to the motion prediction/compensation unit 122 so as to cause motion prediction of color difference signals to be performed by the H.264/AVC format. On the other hand, in the event of having classified the color difference signal block to the second category, the color difference motion vector determining unit 123 causes a single color difference signal block to correspond to multiple luminance signal blocks, and generates a color difference signal motion vector in this unit. For example, a motion vector for a single color difference signal block corresponded to multiple luminance signal blocks is generated using at least one of the motion vectors of the multiple luminance signal blocks. The generated color difference motion vector information is supplied to the motion prediction/compensation unit 122.

Note that in the event that color difference vector difference information is generated and sent from the image encoding device 51 (case of FIG. 16), the color difference vector difference information is supplied from the lossless decoding unit 112 to the color difference motion vector determining unit 123, as indicated by the dotted line.

In this case, the color difference motion vector determining unit 123 calculates a prediction motion vector of the single color difference signal block corresponded to the multiple luminance signal blocks, and obtains a color difference motion vector using the calculated prediction motion vector and the supplied color difference vector difference information.

As with the color difference block determining unit 124 in FIG. 4, the color difference block determining unit 124 determines the block size of the color difference signal block in accordance with the block size of the luminance signal block which the prediction mode information from the motion prediction/compensation unit 122 indicates. The color difference block determining unit 124 supplies the determined color difference block size information to the color difference motion vector determining unit 123.

The switch 125 selects the prediction image generated by the motion prediction/compensation unit 122 or intra prediction unit 121 and supplies this to the computing unit 115.

Note that with the image encoding device 51 in FIG. 4, motion vector information and encoding mode information are obtained as the result of motion searching and mode determination within the device. In contrast with this, at the image decoding device 101, these information are added to the compressed image information sent having been encoded, and obtained as the result of lossless decoding processing. Other than this point of difference, the operating principle of the image encoding device 51 in FIG. 4 and the image decoding device 101 is the same.

[Configuration Example of Motion Prediction/Compensation Unit and Color Difference Motion Vector Determining Unit]

Figure 18:
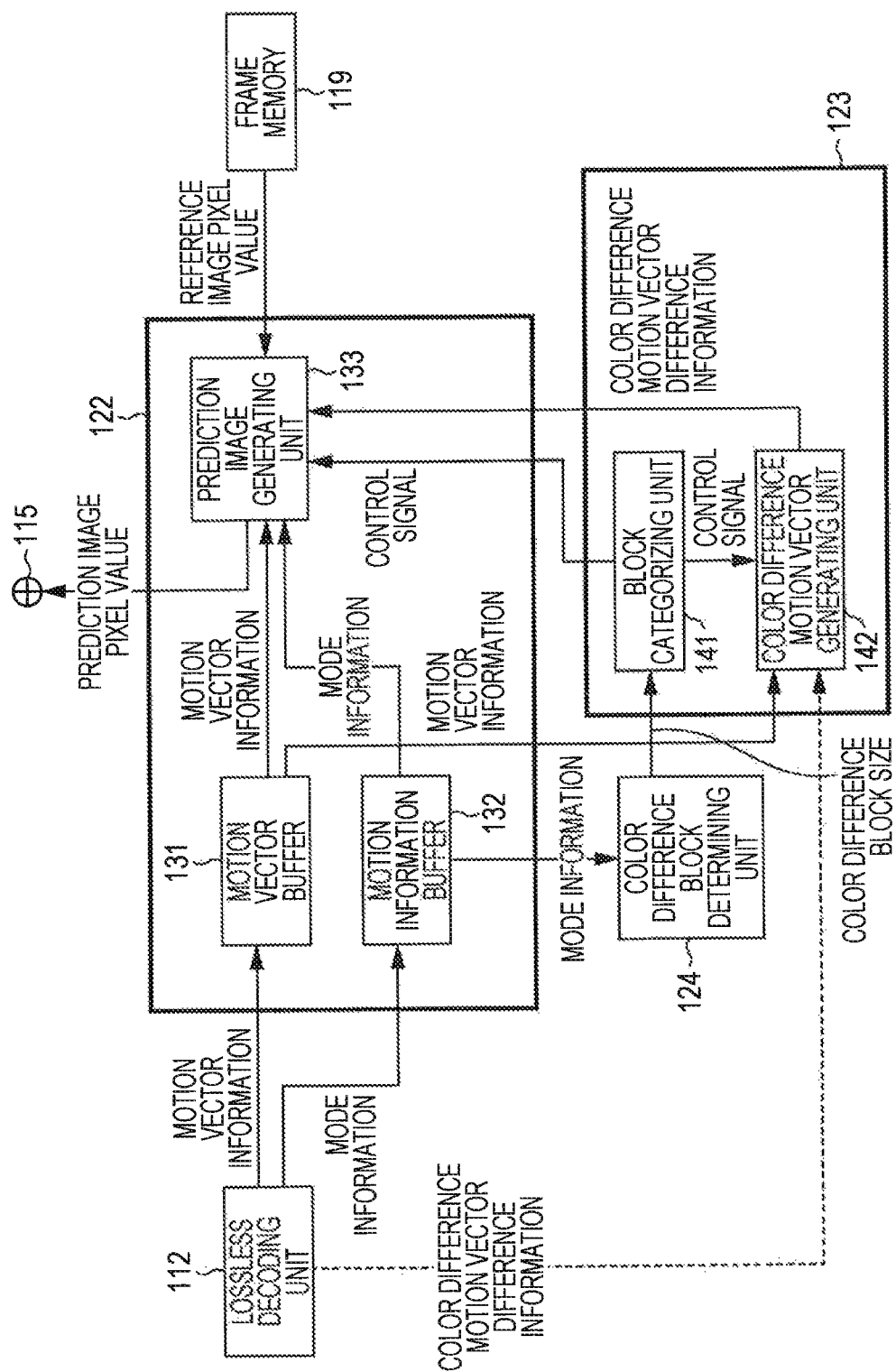
FIG. 18 is a block diagram illustrating a configuration example of the motion prediction/competition unit and color difference motion vector determining unit in FIG. 17.

FIG. 18 is a block diagram illustrating a detailed configuration example of the motion prediction/compensation unit 122 and color difference motion vector determining unit 123. Note that in FIG. 18, the switches 120 and 125 in FIG. 17 are omitted.

With the example in FIG. 18, the motion prediction/compensation unit 122 is configured of a motion vector buffer 131, a mode information buffer 132, and a prediction image generating unit 133.

The color difference motion vector determining unit 123 is configured of a block categorizing unit 141 and a color difference motion vector generating unit 142.

The motion vector buffer 131 stores motion vector information of the current block from the lossless decoding unit 112. The mode information buffer 132 stores inter prediction mode information for each macroblock from the lossless decoding unit 112.

The prediction image generating unit 133 obtains motion vector information of the current block from the motion vector buffer 131, and obtains inter prediction mode information from the mode information buffer 132. The prediction image generating unit 133 generates pixel values of the prediction image as to the current luminance signal block, using these obtained information and reference image pixel values obtained from the frame memory 119.

Also, in the event that a control signal is supplied from the block categorizing unit 141, the prediction image generating unit 133 generates a motion vector for the color difference signals by the H.264/AVC format, uses the generated motion vector to perform compensation processing, and generates a prediction image of the current color difference signal block. On the other hand, in the event that color difference motion vector information is supplied from the color difference motion vector generating unit 142, the prediction image generating unit 133 uses the motion vector of the color difference signals which the information indicates, performs compensation processing, and generates a prediction image for the current color difference signal block.

The block categorizing unit 141 classifies which of the two categories the color difference signal block belongs to, based on the color difference block size information from the color difference block determining unit 124. In the event of classifying the color difference signal block to the first category, the block categorizing unit 141 supplies a control signal to the prediction image generating unit 133 so as to cause motion prediction of color difference signals to be performed by the H.264/AVC format. On the other hand, in the event of having classified the color difference signal block to the second category, the block categorizing unit 141 supplies a control signal to the color difference motion vector generating unit 142 so as to perform color difference signal motion prediction.

Based on the control signal from the block categorizing unit 141, the color difference motion vector generating unit 142 causes a single color difference signal block to correspond to multiple luminance signal blocks. The color difference motion vector generating unit 142 then generates a motion vector of the single color difference signal block that has been corresponded, using the motion vector information of the multiple luminance signal blocks obtained from the motion vector buffer 131. The color difference motion vector generating unit 142 supplies motion vector information of the color difference signals that has been generated to the prediction image generating unit 133.

Note that in the event that color difference vector difference information is generated and sent from the image encoding device 51 (case of FIG. 16), the color difference vector difference information is supplied from the lossless decoding unit 112 to the color difference motion vector generating unit 142, as indicated by the dotted line.

In this case, the color difference motion vector generating unit 142 calculates a prediction motion vector of the single color difference signal block corresponded to the multiple luminance signal blocks as with the Expression (10) described above. The color difference motion vector generating unit 142 then obtains a color difference motion vector using the calculated prediction motion vector and the supplied color difference vector difference information.

[Description of Decoding Processing of Image Decoding Device]

Figure 19:
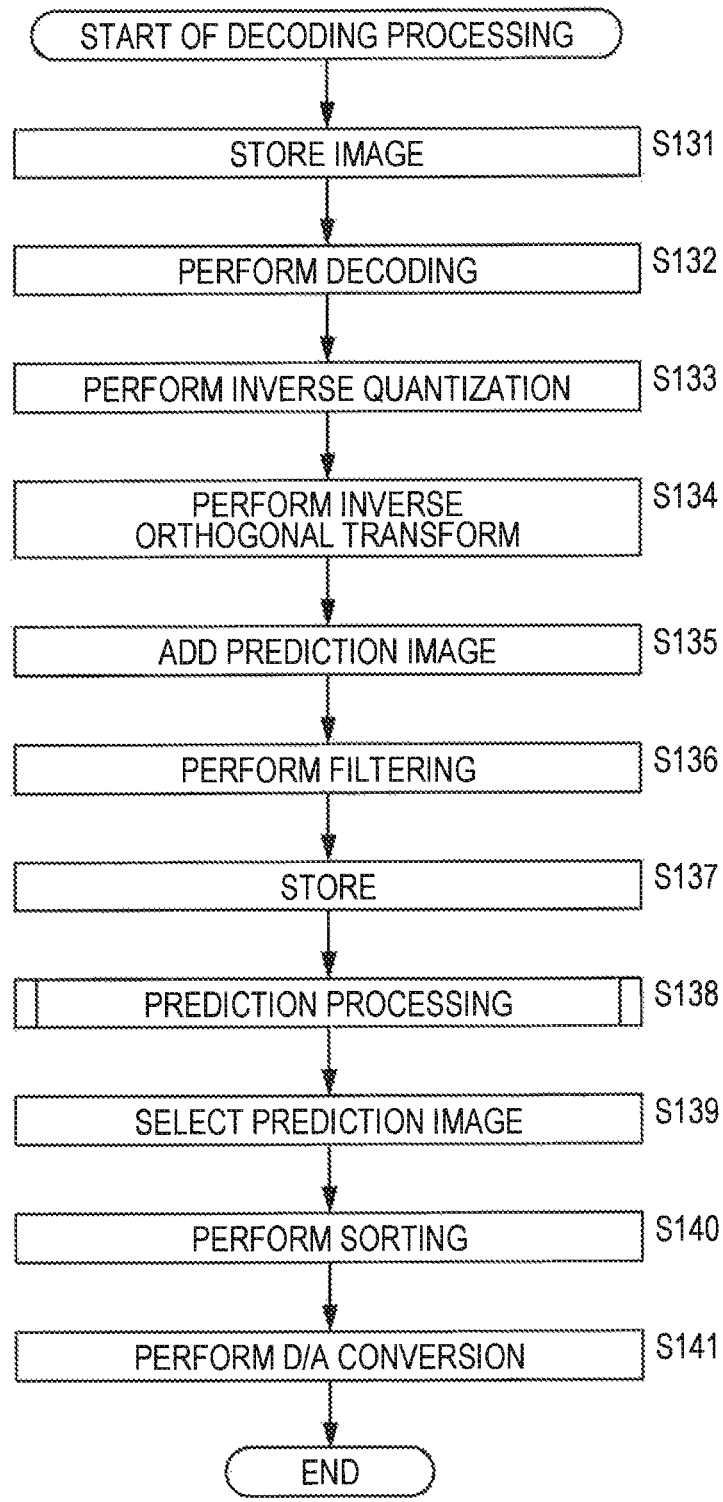
FIG. 19 is a flowchart for describing the decoding processing of the image decoding device in FIG. 17.

Next, the decoding processing that the image decoding device 101 executes will be described with reference to the flowchart in FIG. 19.

In step S131, the storage buffer 111 stores the transmitted image. In step S132, the lossless decoding unit 112 decodes the compressed image supplied from the storage buffer 111. Specifically, the I picture, P picture, and B picture encoded by the lossless encoding unit 66 in FIG. 4 are decoded.

At this time, the motion vector information, reference frame information, prediction mode information (information indicating the intra prediction mode or inter prediction mode), and so forth are also decoded.

Specifically, in the event that the prediction mode information is intra prediction mode information, the prediction mode information is supplied to the intra prediction unit 121. In the event that the prediction mode information is inter prediction mode information, the difference motion vector information and reference frame information corresponding to the prediction mode information are supplied to the motion prediction/compensation unit 122.

Also, the header of an image regarding which processing of FIG. 16 has been performed and transmitted hereto has color difference motion vector difference information added thereto as well, and in this case, the color difference motion vector difference information is also decoded and supplied to the color difference motion vector determining unit 123.

In step S133, the inverse quantization unit 113 inversely quantizes the transform coefficient decoded by the lossless decoding unit 112 using a property corresponding to the property of the quantization unit 65 in FIG. 4. In step S134, the inverse orthogonal transform unit 114 subjects the transform coefficient inversely quantized by the inverse quantization unit 113 to inverse orthogonal transform using a property corresponding to the property of the orthogonal transform unit 64 in FIG. 4. Thus, difference information corresponding to the input of the orthogonal transform unit 64 in FIG. 4 (the output of the computing unit 63) has been decoded.

In step S135, the computing unit 115 adds the prediction image selected in the processing in later-described step S139 and input via the switch 125, to the difference information. Thus, the original image is decoded. In step S136, the deblocking filter 116 subjects the image output from the computing unit 115 to filtering. Thus, block distortion is removed. In step S137, the frame memory 119 stores the filtered image.

In step S138, the intra prediction unit 121 or motion prediction/compensation unit 122 performs the corresponding image prediction processing in response to the prediction mode information supplied from the lossless decoding unit 112.

That is, in the event that the intra prediction mode information has been supplied from the lossless decoding unit 112, the intra prediction unit 121 performs the intra prediction processing in the intra prediction mode. In the event that the inter prediction mode information has been supplied from the lossless decoding unit 112, the motion prediction/compensation unit 122 performs the motion prediction and compensation processing in the inter prediction mode. At this time, for color difference signals, the motion prediction/compensation unit 122 generates pixel values of the prediction image as to the current block in accordance with the category to which classification has been made by the block size which the inter prediction mode indicates.

While the details of the prediction processing in step S138 will be described later with reference to FIG. 20, according to this processing, the prediction image generated by the intra prediction unit 121 or the prediction image generated by the motion prediction/compensation unit 122 is supplied to the switch 125.

In step S139, the switch 125 selects the prediction image. Specifically, the prediction image generated by the intra prediction unit 121 or the prediction image generated by the motion prediction/compensation unit 122 is supplied. Accordingly, the supplied prediction image is selected, supplied to the computing unit 115, and in step S134, as described above, added to the output of the inverse orthogonal transform unit 114.

In step S140, the screen rearranging buffer 117 performs rearranging. Specifically, the sequence of frames rearranged for encoding by the screen rearranging buffer 62 of the image encoding device 51 is rearranged to the original display sequence.

In step S141, the D/A conversion unit 118 performs D/A conversion of the image from the screen rearranging buffer 117. This image is output to an unshown display, and the image is displayed.

[Description of Prediction Processing of Image Decoding Device]

Next, the prediction processing in step S138 in FIG. 19 will be described with reference to the flowchart in FIG. 20.

In step S171, the intra prediction unit 121 determines whether or not the current block has been subjected to intra encoding. Upon the intra prediction mode information being supplied from the lossless decoding unit 112 to the intra prediction unit 121, in step S171 the intra prediction unit 121 determines that the current block has been subjected to intra encoding, and the processing proceeds to step S172.

In step S172, the intra prediction unit 121 obtains the intra prediction mode information, and in step S173 performs intra prediction.

That is to say, in the event that the image to be processed is an image to be subjected to intra processing, the necessary image is read out from the frame memory 119, and supplied to the intra prediction unit 121 via the switch 120. In step S173, the intra prediction unit 121 performs intra prediction in accordance with the intra prediction mode information obtained in step S172 to generate a prediction image. The generated prediction image is output to the switch 125.

On the other hand, in the event that determination is made in step S171 that intra encoding has not been performed, the processing proceeds to step S174.

In the event that the current image is an image to be subjected to inter processing, the motion prediction/compensation unit 122 is supplied with the inter prediction mode information, reference frame information, and motion vector information, from the lossless decoding unit 112.

In step S174, the motion prediction/compensation unit 122 obtains the inter prediction mode information and so forth from the lossless decoding unit 112. That is to say, the inter prediction mode information, reference frame information, and motion vector information, are obtained. The obtained motion vector information is stored in the motion vector buffer 131 and the inter prediction mode information is stored in the mode information buffer 132.

In step S175, the prediction image generating unit 133 generates a prediction image for luminance signals. That is to say, the prediction image generating unit 133 obtains motion vector information for the current block from the motion vector buffer 131, and obtains corresponding inter prediction mode information from the mode information buffer 132. The prediction image generating unit 133 generates pixel values of the prediction image corresponding to the current luminance signal block using the reference image pixel values obtained from the frame memory 119.

In step S176, motion prediction processing is performed as to the color difference signals. Details of the motion prediction processing on the color difference signals will be described later with reference to FIG. 21. Due to the processing in step S176, the current color difference signal block is classified into a first or second category by the block size indicated by the inter prediction mode information, and the motion vector of the color difference signal block is obtained in accordance with the classified category.

In step S177, the prediction image generating unit 133 uses the motion vector of the color difference signals obtained by the processing in step S176 and performs compensation processing, to generate a prediction image as to the current color difference signal block.

The generated prediction image is supplied to the computing unit 115 via the switch 125, and is added to the output of the inverse orthogonal transform unit 114 in step S134.

Next, motion prediction processing as to color difference signals in step S176 of FIG. 20 will be described with reference to the flowchart in FIG. 21.

The color difference block determining unit 124 determines the block size of the color difference signal block in accordance with the block size of the luminance signal block which the optimal inter prediction mode from the mode information buffer 132 indicates. The color difference block determining unit 124 supplies information of the color difference block size that has been determined to the block categorizing unit 141.

In step S181, the block categorizing unit 141 classifies the color difference signal blocks into which of two categories they belong to, based on the color difference block size from the color difference block determining unit 124.

For example, in the event that the block size of color difference signals is one size of 8×8 pixels, 8×4 pixels, 4×8 pixels, or 4×4 pixels, the block categorizing unit 141 classifies the color difference signal block into the first category. On the other hand, in the event that the block size of color difference signals is one size of 4×2 pixels, 2×4 pixels, or 2×2 pixels, the block categorizing unit 141 classifies the color difference signal block into the second category.

In step S182, the block categorizing unit 141 then determines whether or not the color difference signal block is a block which belongs to the first category. In the event that determination is made in step S182 that the block does not belong to the first category, i.e., is a block belonging to the second category, the processing advances to step S183. In this case, a control signal which causes motion compensation of color difference signals to be performed is supplied from the block categorizing unit 141 to the color difference motion vector generating unit 142.

Correspondingly, in step S183 the color difference motion vector generating unit 142 generates color difference motion vector information. That is to say, as described with reference to A in FIG. 9 above, the color difference motion vector generating unit 142 corresponds a single color difference signal block (e.g., one 4×4 block) to multiple luminance signal blocks (e.g., four 4×4 blocks) deemed to belong to the second category. The color difference motion vector generating unit 142 then generates motion vector information of the single color difference signal block, using the motion vector information obtained from the motion vector buffer 131.

Figure 20:
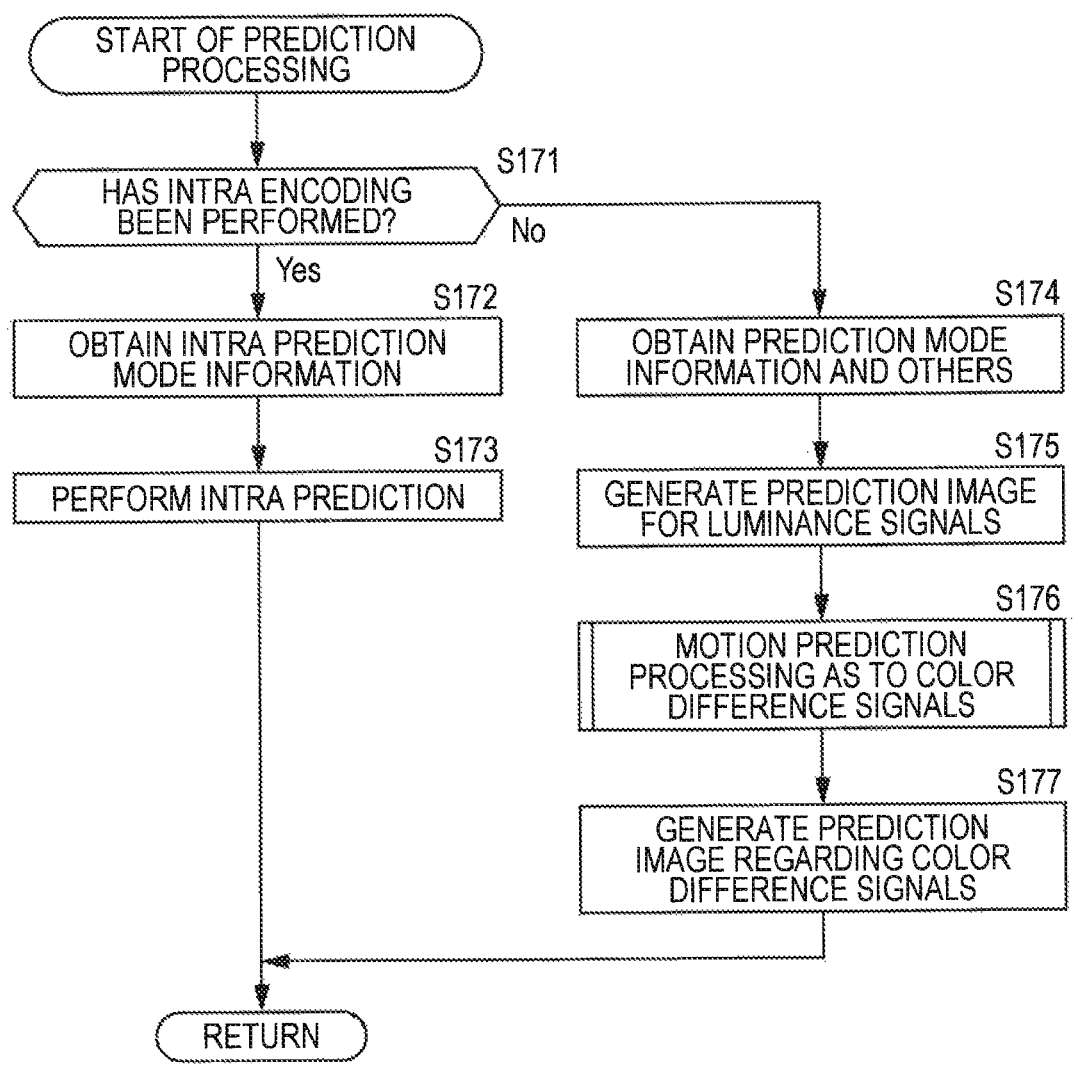
FIG. 20 is a flowchart for describing prediction processing in step S138 in FIG. 19.
Figure 21:
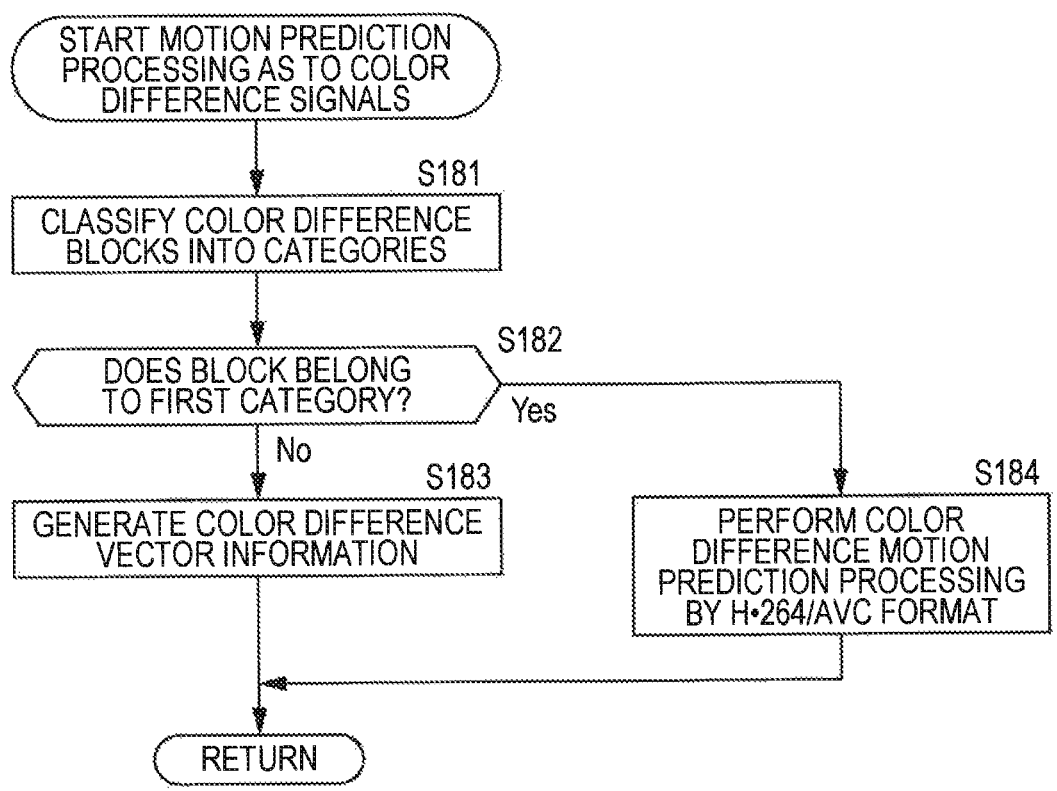
FIG. 21 is a flowchart for describing motion compensation processing as to color difference signals in step S176 in FIG. 20.

The generated color difference motion vector information is supplied to the prediction image generating unit 133, and is used for generating a color difference signal prediction image in step S177 in FIG. 20.

On the other hand, in the event that determination is made in step S182 that the block belongs to the first category, the processing advances to step S184. In this case, a control signal for causing motion prediction of color difference signals according to the H.264/AVC format to be performed is output from the block categorizing unit 171 to the prediction image generating unit 133.

Accordingly, in step S184 the prediction image generating unit 133 performs color difference motion prediction processing according to the H.264/AVC format. For example, in the event that the luminance signal block is a 8×8 pixel block, the prediction image generating unit 133 performs motion prediction processing described with reference to FIG. 2 on a color difference signal block which is a 4×4 pixel block.

The generated color difference motion vector information is used for generating a prediction image of color difference signals in step S177 in FIG. 20.

As described above, color difference motion vector information is generated using motion vector information of the luminance signal block. On the other hand, in the event that color difference motion vector difference information is sent from the encoding side, as described next, the difference of the color difference motion vector prediction information generated using the motion vector information of the luminance signal blocks is taken from the difference information, and a color difference vector is generated.

Figure 22:
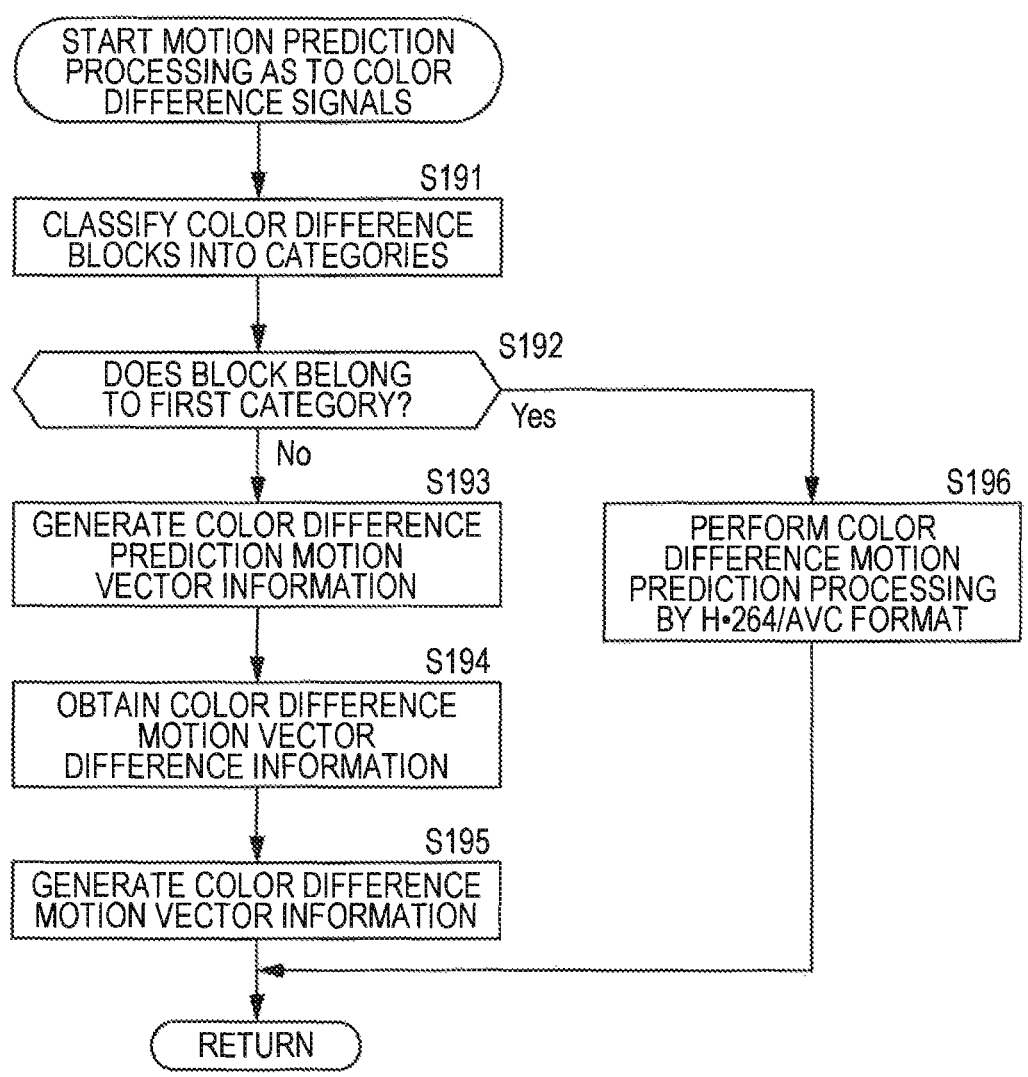
FIG. 22 is a flowchart for describing another example of motion compensation processing as to color difference signals in step S176 in FIG. 20.

Next, description will be made regarding motion prediction processing as to color difference signals in the case that color difference motion vector difference information is sent from the encoding side, with reference to the flowchart in FIG. 22. Note that the processing in steps S191, S192, and S196 in FIG. 22 is the same as the processing in steps S181, S182, and S184 in FIG. 21.

The color difference block determining unit 124 determines the block size of the color difference signal block in accordance with the block size of the luminance signal blocks which the prediction mode information from the mode information buffer 132 indicates. The color difference block determining unit 124 supplies the determined color difference block size information to the block categorizing unit 141.

In step S191, the block categorizing unit 141 classifies the color difference signal blocks into which of two categories they belong to, based on the color difference block size from the color difference block determining unit 124.

Then in step S192, the block categorizing unit 141 determines whether or not the color difference signal block is a block which belongs to the first category. In the event that determination is made in step S192 that the block does not belong to the first category, i.e., is a block belonging to the second category, the processing advances to step S193. In this case, a control signal which causes motion compensation of color difference signals to be performed is supplied from the block categorizing unit 141 to the color difference motion vector generating unit 142.

Correspondingly, in step S193 the color difference motion vector generating unit 142 generates color difference motion vector information. That is to say, as described with reference to A in FIG. 9 above, the color difference motion vector generating unit 142 corresponds a single color difference signal block to multiple luminance signal blocks deemed to belong to the second category. The color difference motion vector generating unit 142 then generates motion vector information of the single color difference signal block, using the motion vector information obtained from the motion vector buffer 131.

In step S194, the color difference motion vector generating unit 142 obtains the color difference motion vector difference information from the lossless decoding unit 112.

In step S195, the color difference motion vector generating unit 142 adds the generated motion difference prediction motion vector information and the obtained color difference motion vector difference information, thereby generating color difference motion vector information.

The generated color difference motion vector information is supplied to the prediction image generating unit 133, and is used for generating a color difference signal prediction image in step S177 in FIG. 20.

On the other hand, in the event that determination is made in step S192 that the block belongs to the first category, the processing advances to step S196. In this case, a control signal for causing motion prediction of color difference signals according to the H.264/AVC format to be performed is output to the prediction image generating unit 133.

Accordingly, in step S196 the prediction image generating unit 133 performs color difference motion prediction processing according to the H.264/AVC format. The generated color difference motion vector information is used for generating a prediction image of color difference signals in step S177 in FIG. 20.

As described above, with the image encoding device 51 and image decoding device 101, motion prediction of color difference signals is performed in accordance with categories into which classification is made according to the size of blocks for motion prediction/compensation of the color difference signals. That is to say, in the case that the block size of the current block for motion prediction/compensation of the color difference signals is smaller than the size of orthogonal transform blocks, the motion vector of a single color difference signal block made to correspond to multiple luminance signal blocks is generated using the motion vectors of the multiple luminance signal blocks.

This means that no boundaries of blocks for motion compensation exist within the 4×4 size block relating to color difference, and occurrence of non-zero coefficients due to orthogonal transform is reduced, whereby encoding efficiency can be improved.

Moreover, at the time of motion prediction, if the current block of luminance signals is 4×4 pixels, there has been the need with the H.264/AVC format to calculate addresses for four 2×2 blocks and perform memory access. In contrast with this, by performing the above-described processing, memory access calculation has to be performed only once, so the necessary memory bandwidth can be reduced.

Also, while the size of macroblocks has been described with regard to the case of 16×16 pixels in the above description, the present invention can also be applied to extended macroblock sizes as described in the above-described NPL 4.

[Description of Application to Extended Macroblock Sizes]

Figure 23:
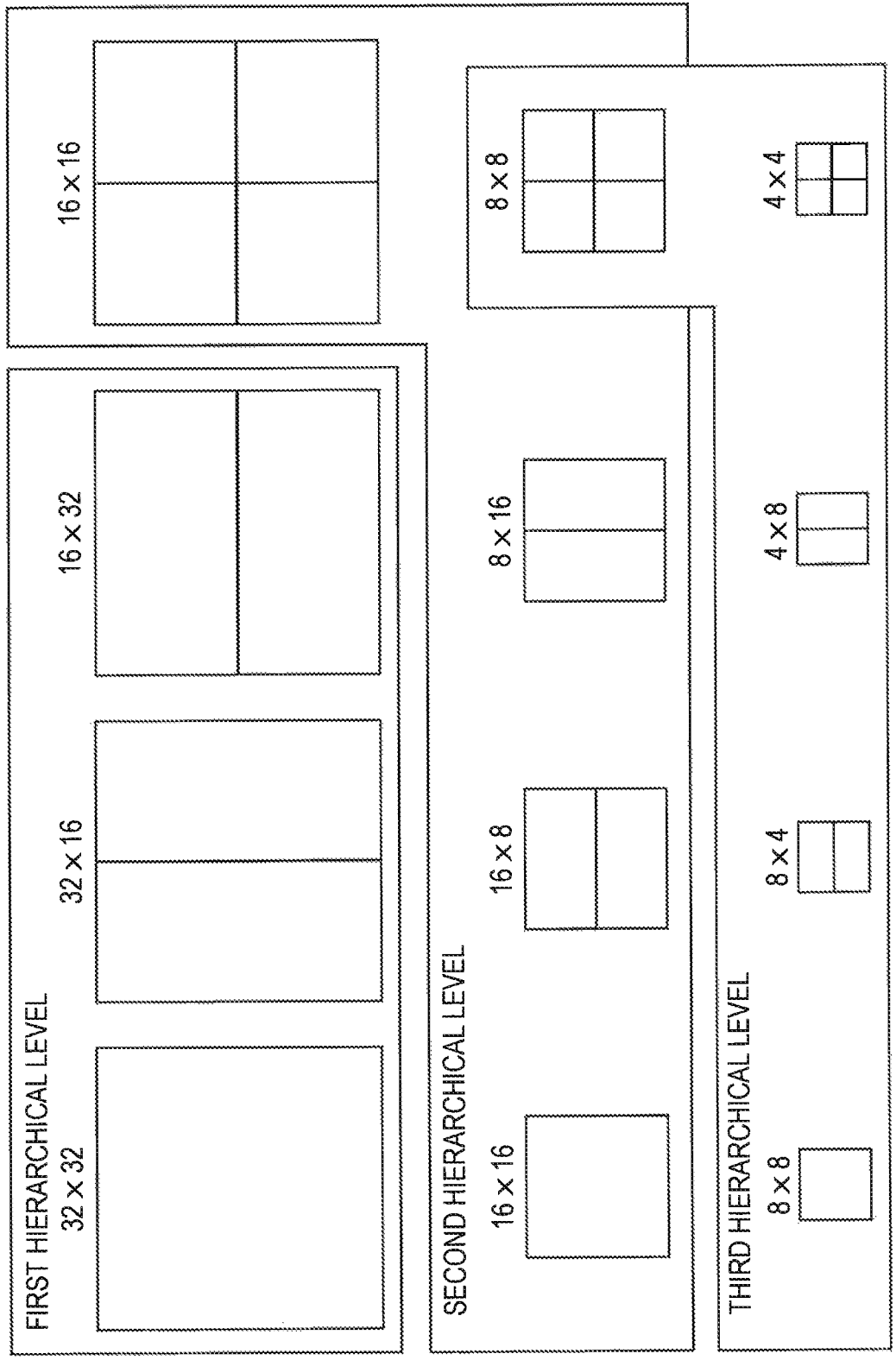
FIG. 23 is a diagram illustrating an example of an extended block size.

FIG. 23 is a diagram illustrating an example of an extended macroblock size. With NPL 4, the macroblock size is extended to 32×32 pixels.

Macroblocks made up of 32×32 pixels divided into blocks (partitions) of 32×32 pixels, 32×16 pixels, 16×32 pixels, and 16×16 pixels are shown from the left in order on the upper tier in FIG. 23. Blocks made up of 16×16 pixels divided into blocks of 16×16 pixels, 16×8 pixels, 8×16 pixels, and 8×8 pixels are shown from the left in order on the middle tier in FIG. 23. Also, blocks made up of 8×8 pixels divided into blocks of 8×8 pixels, 8×4 pixels, 4×8 pixels, and 4×4 pixels are shown from the left in order on the lower tier in FIG. 23.

In other words, the macroblocks of 32×32 pixels may be processed as blocks of 32×32 pixels, 32×16 pixels, 16×32 pixels, and 16×16 pixels shown on the upper tier in FIG. 23.

Also, the blocks of 16×16 pixels shown on the right side on the upper tier may be processed as blocks of 16×16 pixels, 16×8 pixels, 8×16 pixels, and 8×8 pixels shown on the middle tier in the same way as with the H.264/AVC format.

The blocks of 8×8 pixels shown on the right side on the middle tier may be processed with blocks of 8×8 pixels, 8×4 pixels, 4×8 pixels, and 4×4 pixels shown on the lower tier in the same way as with the H.264/AVC format.

These blocks can be classified into the following three hierarchical levels. That is to say, the blocks of 32×32 pixels, 32×16 pixels, and 16×32 pixels shown at the upper tier in FIG. 23 will be referred to as a first hierarchical level. The block of 16×16 pixels at the right hand of the upper tier, and the blocks of 16×16 pixels, 16×8 pixels, and 8×16 pixels, at the middle tier, will be referred to as a second hierarchical level. The block of 8×8 pixels at the right hand of the middle tier, and the blocks of 8×8 pixels, 8×4 pixels, 4×8 pixels, and 4×4 pixels, at the bottom tier, will be referred to as a third hierarchical level.

By employing such a hierarchical structure, with the proposal in NPL 1, regarding a 16×16-pixel block or less, a greater block is defined as a superset thereof while maintaining compatibility with the H.264/AVC format.

How to apply the present invention to extended macroblock sizes proposed as described above, is as follows.

For example, in the case of encoding a 32×32 macroblock according to the above-described hierarchical structure, the smallest unit of encoding luminance signals is 4×4 pixels as stipulated with the H.264/AVC format, i.e., the smallest unit for encoding color difference signals is 2×2 pixels. Accordingly, in the event that the smallest unit of orthogonal transform is 4×4 pixels, the method shown in A in FIG. 9 is applicable.

Also, a case may be conceived with extended macroblock sizes where, of the hierarchical structure shown in FIG. 23, no block sizes smaller than 8×8 pixels are used, so the smallest unit of orthogonal transform is 8×8 pixels including color difference signals. In the event that the format of input signals is 4:2:0 in such a case, this means that the smallest unit of color difference signal blocks is 4×4 pixels, which would be smaller than the smallest unit for orthogonal transform.

In such a case, a situation where the smallest unit of color difference blocks is smaller than the smallest unit of orthogonal transform can be suppressed, by applying the method shown in A in FIG. 9, with the size of the blocks to which 1 through 3 and C are appended in A in FIG. 9 being 8×8 pixels.

Figure 24:
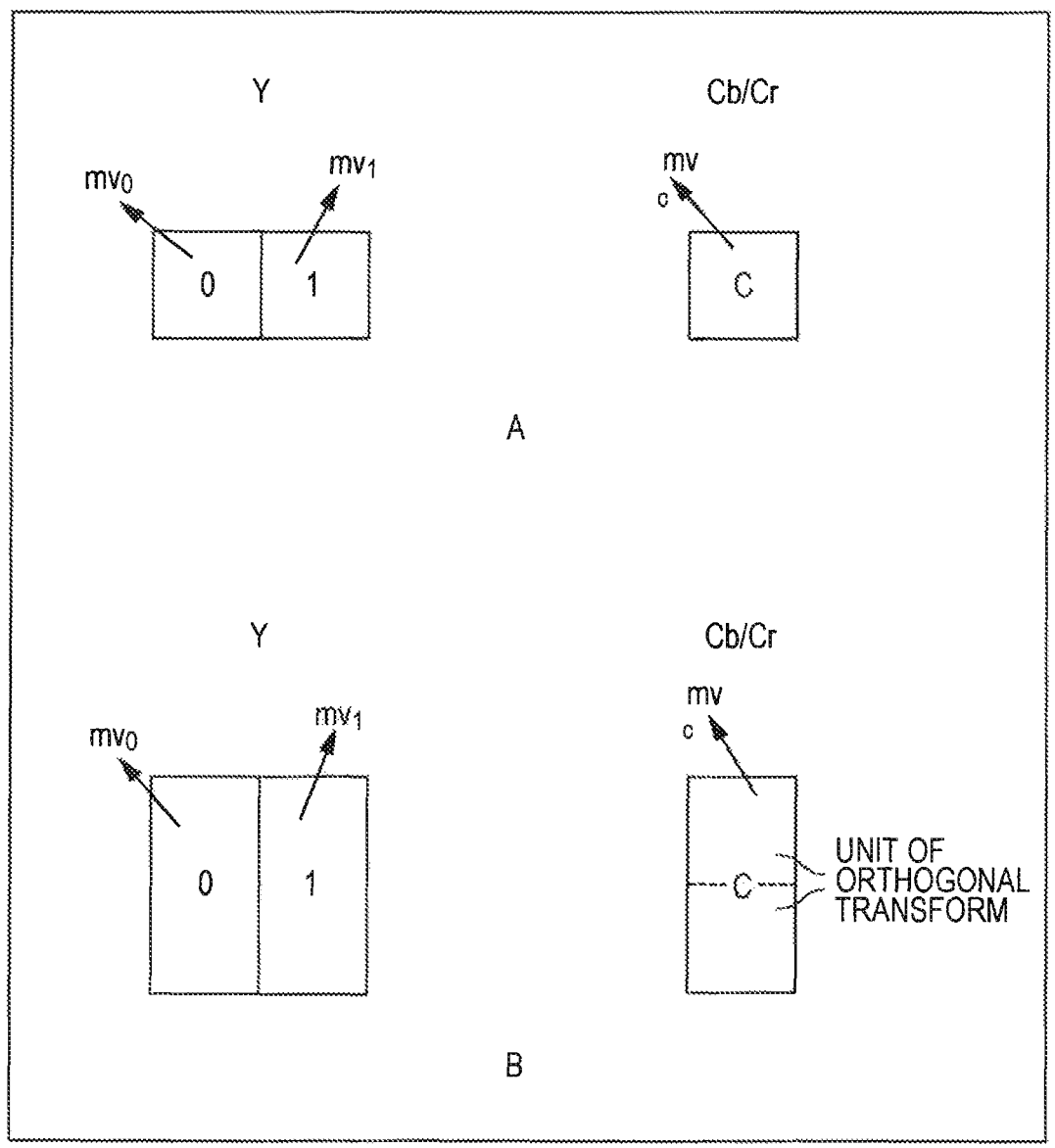
FIG. 24 is a diagram illustrating an example of a case of input signals of 4:2:2.

Further, description has been made above regarding a case where the format of the input signals is 4:2:0, but next we will consider a case where the format of the input signals is 4:2:2 with reference to FIG. 24.

Note that in the event that the format of input signals is 4:4:4, the luminance signal blocks and color difference signal blocks are the same size, so there will be no situation where the smallest unit of color difference blocks is smaller than the smallest unit of orthogonal transform such as described above.

In the event that the format of input signals is 4:2:2 and the luminance signal block is 8×4 pixels as shown in B in FIG. 9, the corresponding color difference signal block will be 4×4 pixels, so there will be no situation where the smallest unit of color difference blocks is smaller than the smallest unit of orthogonal transform.

On the other hand, in the event that the luminance signal blocks are 4×4 pixels or 4×8 pixels as shown in FIG. 24, the present invention can be applied.

That is to say, in the example in A of FIG. 24, a case is shown where the format of the input signals is 4:2:2 and the luminance signal block is 4×4 pixels. In this case, one 4×4 block of color difference signals, denoted by C, corresponds to the two 4×4 blocks of luminance signals denoted by 0 and 1.

Accordingly, in the case of A in FIG. 24, the motion vector information $mv_c$, or prediction motion vector information $pmv_c$, corresponding to the block of color difference signals denoted with C, can be generated from the motion vector information $mv_0$ and $mv_1$ corresponding to the two blocks of luminance signals denoted by 0 and 1.

Also, in the example in B of FIG. 24, a case is shown where the format of the input signals is 4:2:2 and the luminance signal block is 4×8 pixels. In this case, one 4×8 block of color difference signals, denoted by C, corresponds to the two 4×8 blocks of luminance signals denoted by 0 and 1.

Accordingly, in the case of B in FIG. 24 as well, the motion vector information $mv_c$, or prediction motion vector information $pmv_c$, corresponding to the block of color difference signals denoted with C, can be generated from the motion vector information $mv_0$ and $mv_1$ corresponding to the two blocks of luminance signals denoted by 0 and 1.

Note however, that while the size of the block of color difference signals denoted with C is 4×8, the size of orthogonal transform is 4×4 pixels, as shown in B in FIG. 24.

Description has been made so far based on the H.264/AVC format for an encoding format, but the present invention is not restricted to this, an another encoding format/decoding format may be applied where one macroblock is divided into multiple motion partitions, motion compensation is performed, and orthogonal transform is performed as to difference values.

Note that the present invention may be applied to an image encoding device and an image decoding device used at the time of receiving image information (bit streams) compressed by orthogonal transform such as discrete cosine transform or the like and motion compensation via a network medium such as satellite broadcasting, a cable television, the Internet, a cellular phone, or the like, for example, as with MPEG, H.26x, or the like. Also, the present invention may be applied to an image encoding device and an image decoding device used at the time of processing image information on storage media such as an optical disc, a magnetic disk, and flash memory. Further, the present invention may be applied to a motion prediction compensation device included in such an image encoding device and an image decoding device and so forth.

The above-described series of processing may be executed by hardware, or may be executed by software. In the event of executing the series of processing by software, a program making up the software thereof is installed in a computer. Here, examples of the computer include a computer built into dedicated hardware, and a general-purpose personal computer whereby various functions can be executed by various types of programs being installed thereto.

[Configuration Example of Personal Computer]

Figure 25:
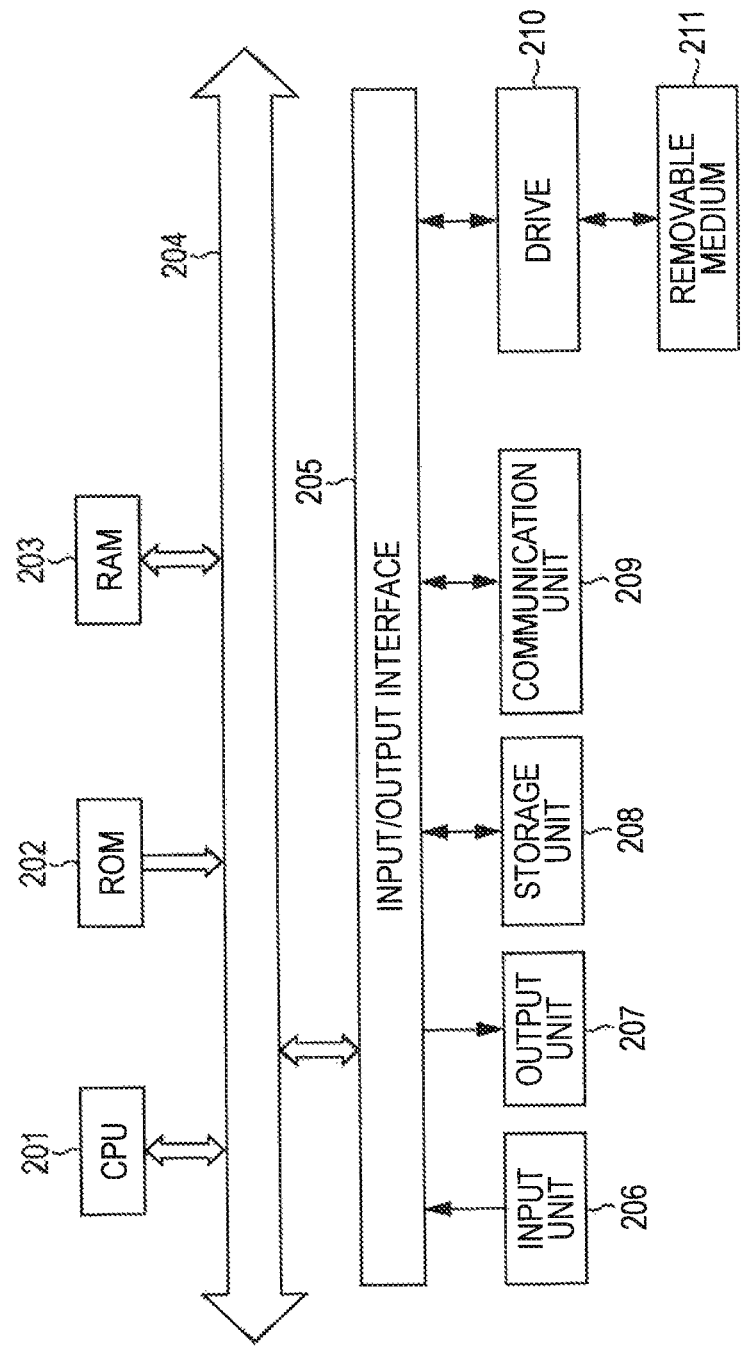
FIG. 25 is a block diagram illustrating a configuration example of the hardware of a computer.

FIG. 25 is a block diagram illustrating a configuration example of the hardware of a computer which executes the above-described series of processing using a program.

With the computer, a CPU (Central Processing Unit) 201, ROM (Read Only Memory) 202, and RAM (Random Access Memory) 203 are mutually connected by a bus 204.

Further, an input/output interface 205 is connected to the bus 204. An input unit 206, an output unit 207, a storage unit 208, a communication unit 209, and a drive 310 are connected to the input/output interface 205.

The input unit 206 is made up of a keyboard, a mouse, a microphone, and so forth. The output unit 207 is made up of a display, a speaker, and so forth. The storage unit 208 is made up of a hard disk, nonvolatile memory, and so forth. The communication unit 209 is made up of a network interface and so forth. The drive 210 drives a removable medium 211 such as a magnetic disk, an optical disc, a magneto-optical disk, semiconductor memory, or the like.

With the computer thus configured, for example, the CPU 201 loads a program stored in the storage unit 208 to the RAM 203 via the input/output interface 205 and bus 204, and executes the program, and accordingly, the above-described series of processing is performed.

The program that the computer (CPU 201) executes may be provided by being recorded in the removable medium 211 serving as a package medium or the like, for example. Also, the program may be provided via a cable or wireless transmission medium such as a local area network, the Internet, or digital broadcasting.

With the computer, the program may be installed in the storage unit 208 via the input/output interface 205 by mounting the removable medium 211 on the drive 210. Also, the program may be received by the communication unit 209 via a cable or wireless transmission medium, and installed in the storage unit 208. Additionally, the program may be installed in the ROM 202 or the storage unit 208 beforehand.

Note that the program that the computer executes may be a program wherein the processing is performed in the time sequence along the sequence described in the present Specification, or may be a program wherein the processing is performed in parallel or at necessary timing such as when call-up is performed.

The embodiments of the present invention are not restricted to the above-described embodiment, and various modifications may be made without departing from the essence of the present invention.

For example, the above-described image encoding device 51 and image decoding device 101 may be applied to an optional electronic device. Hereafter, an example thereof will be described.

[Configuration Example of Television Receiver]

Figure 26:
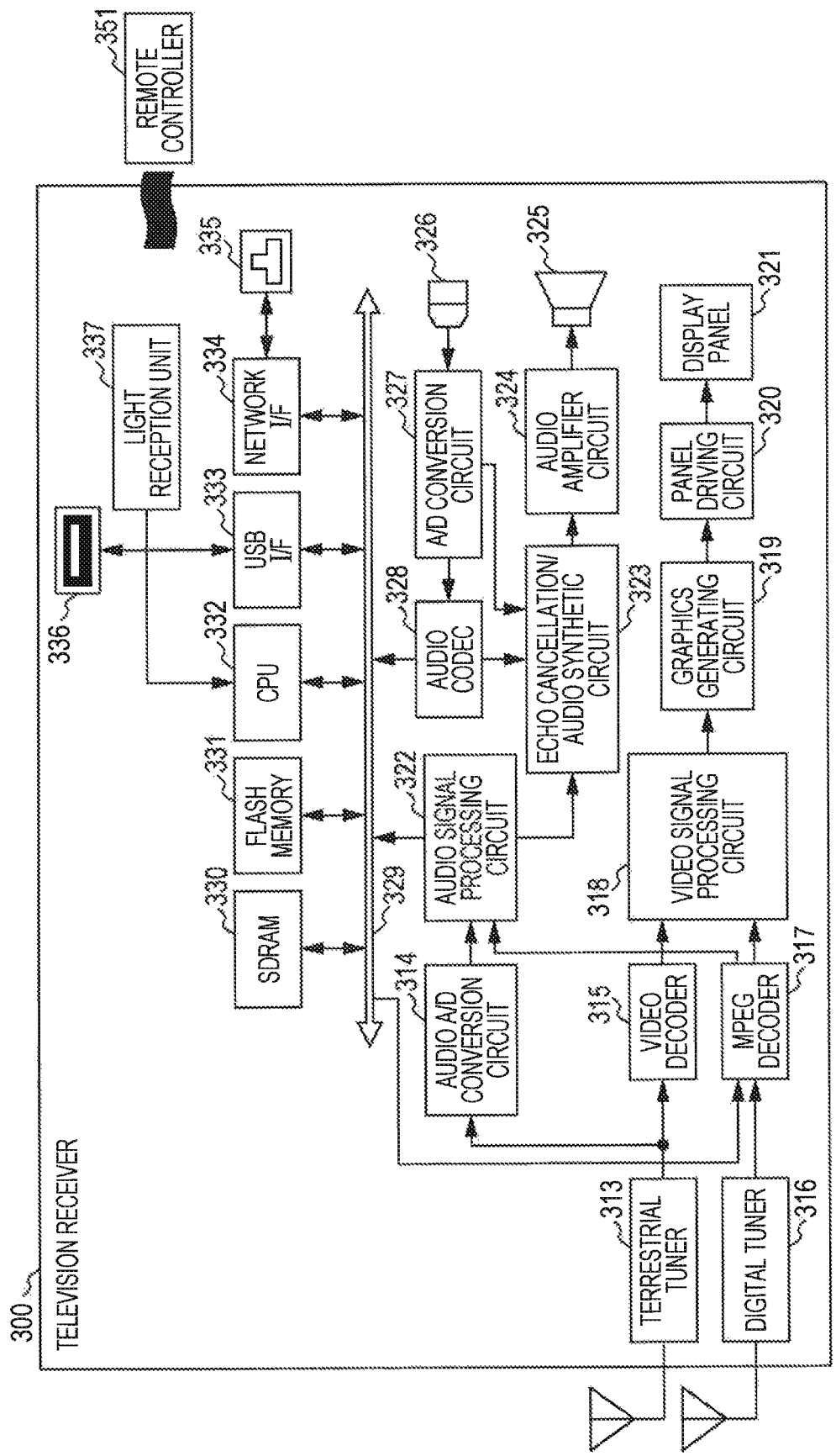
FIG. 26 is a block diagram illustrating a principal configuration example of a television receiver to which the present invention has been applied.
Figure 27:
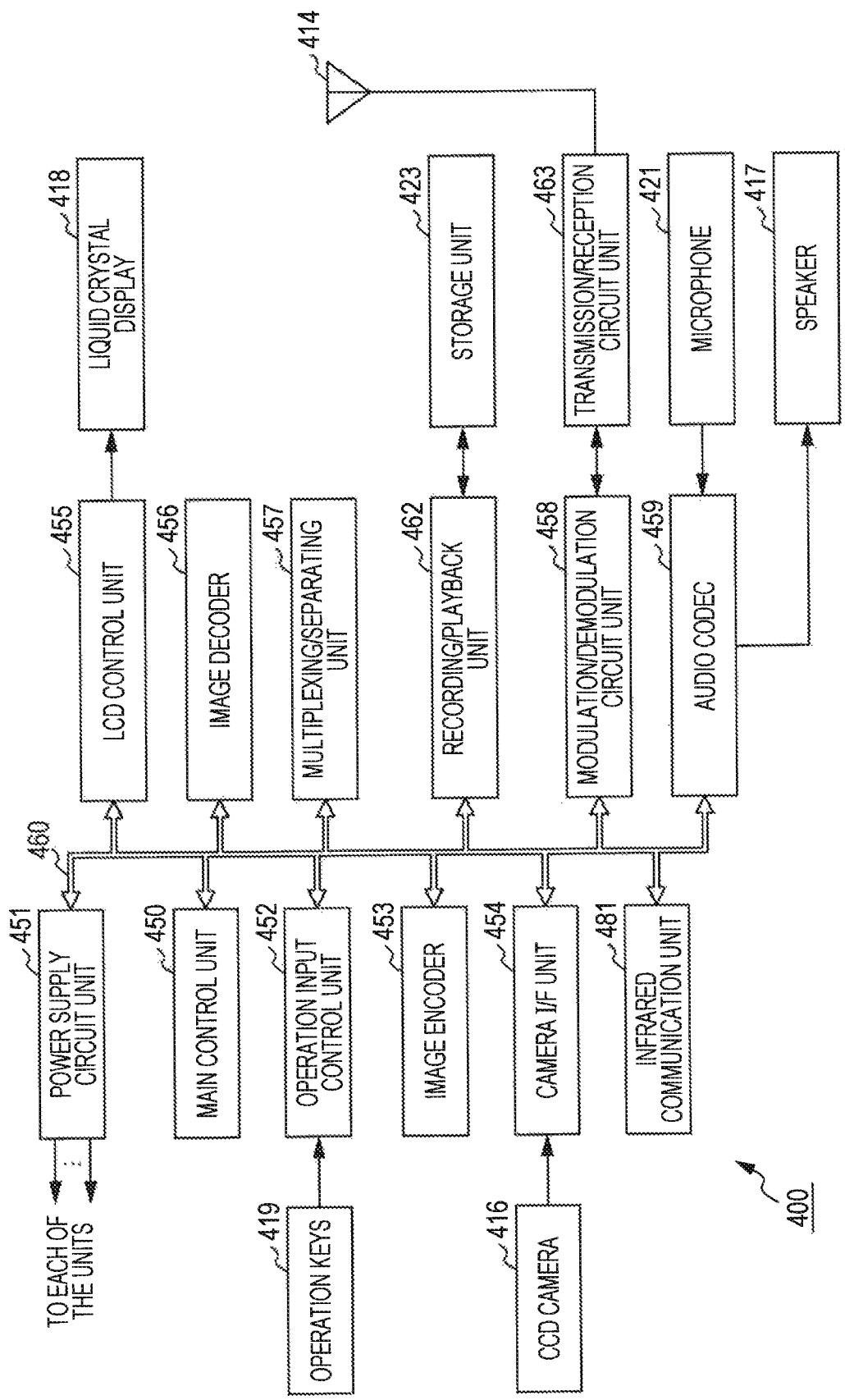
FIG. 27 is a block diagram illustrating a principal configuration example of a cellular phone to which the present invention has been applied.
Figure 28:
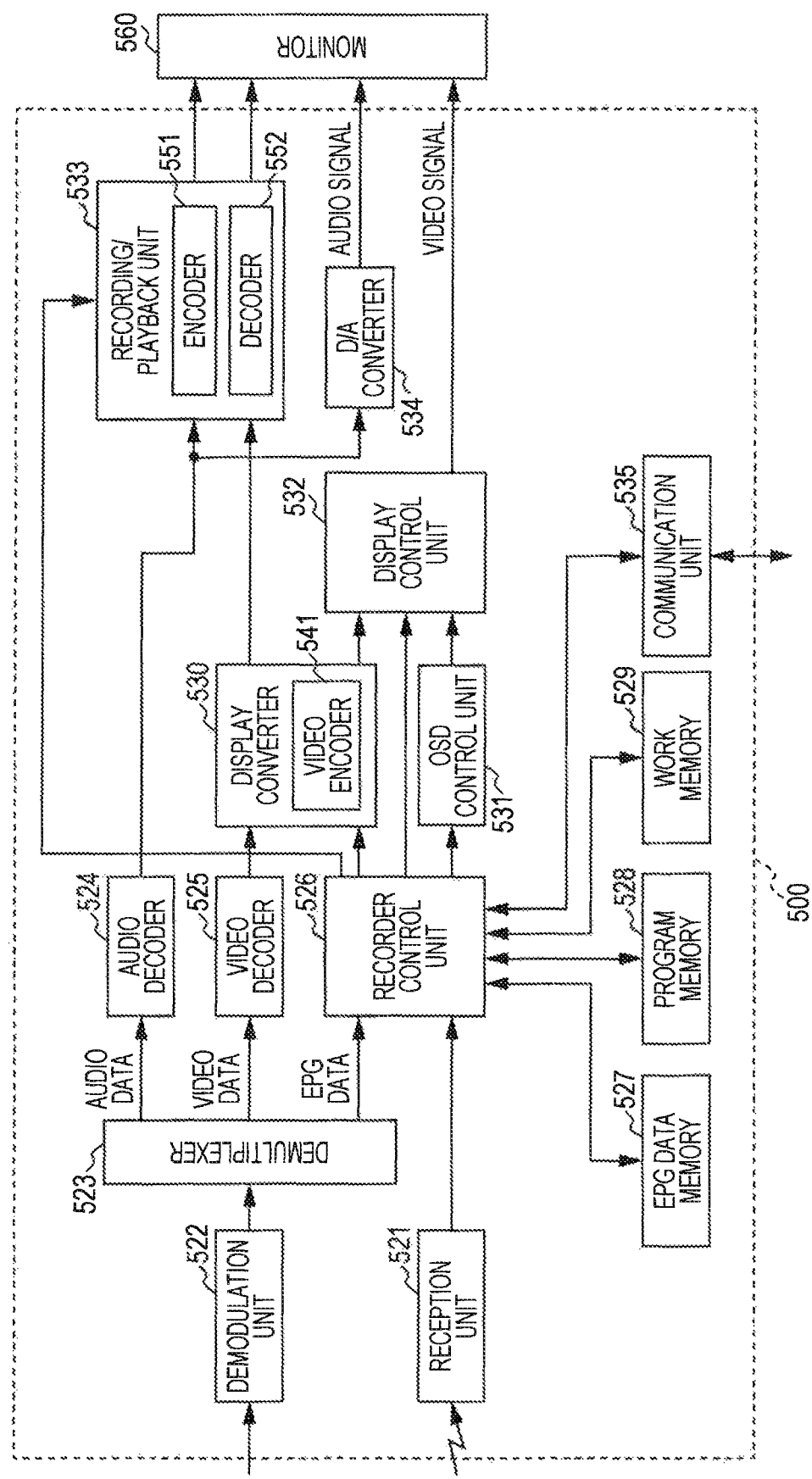
FIG. 28 is a block diagram illustrating a principal configuration example of a hard disk recorder to which the present invention has been applied.
Figure 29:
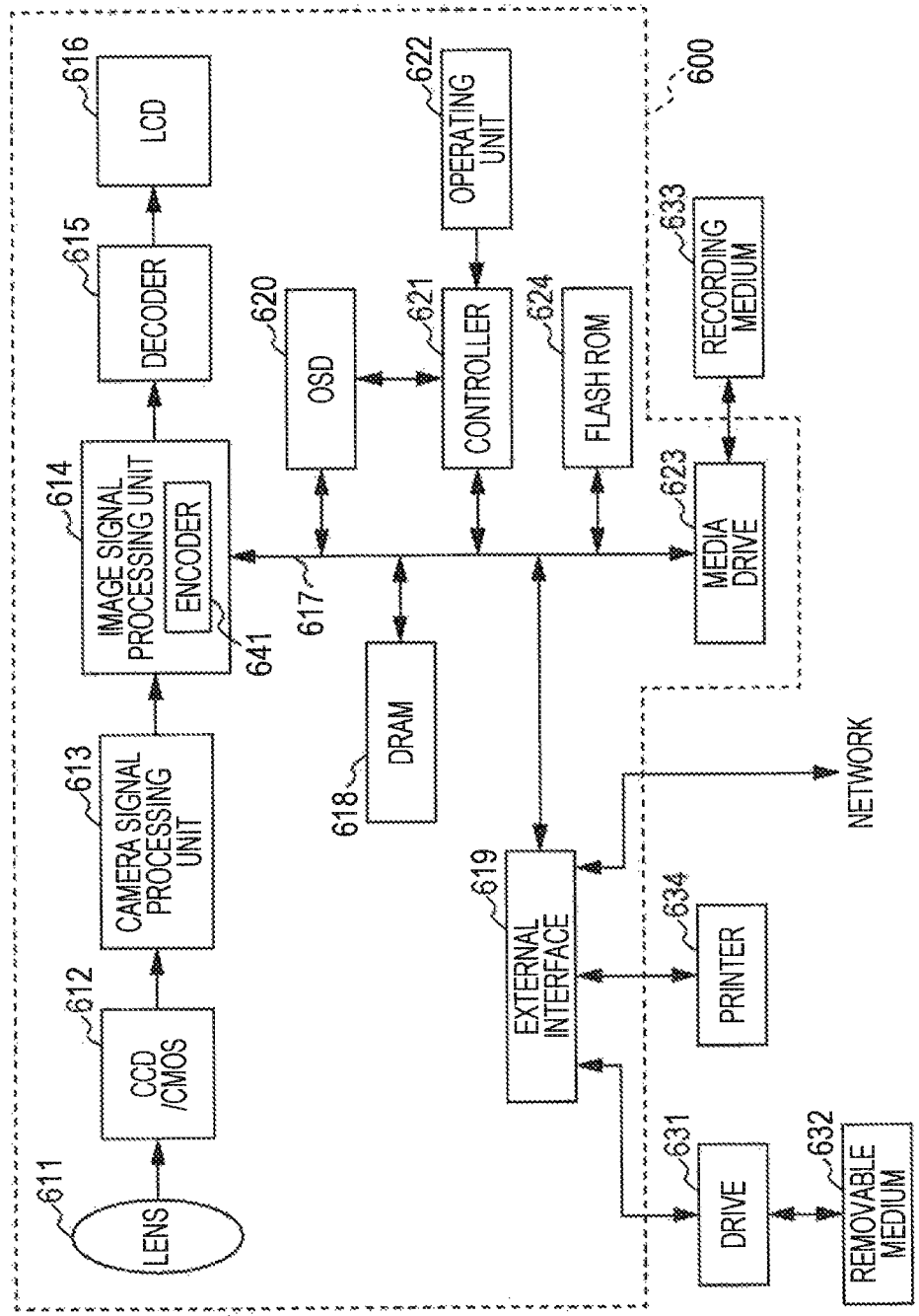
FIG. 29 is a block diagram illustrating a principal configuration example of a camera to which the present invention has been applied.

FIG. 26 is a block diagram illustrating a principal configuration example of a television receiver using the image decoding device to which the present invention has been applied.

A television receiver 300 shown in FIG. 26 includes a terrestrial tuner 313, a video decoder 315, a video signal processing circuit 318, a graphics generating circuit 319, a panel driving circuit 320, and a display panel 321.

The terrestrial tuner 313 receives the broadcast wave signals of a terrestrial analog broadcast via an antenna, demodulates, obtains video signals, and supplies these to the video decoder 315. The video decoder 315 subjects the video signals supplied from the terrestrial tuner 313 to decoding processing, and supplies the obtained digital component signals to the video signal processing circuit 318.

The video signal processing circuit 318 subjects the video data supplied from the video decoder 315 to predetermined processing such as noise removal or the like, and supplies the obtained video data to the graphics generating circuit 319.

The graphics generating circuit 319 generates the video data of a program to be displayed on a display panel 321, or image data due to processing based on an application to be supplied via a network, or the like, and supplies the generated video data or image data to the panel driving circuit 320. Also, the graphics generating circuit 319 also performs processing such as supplying video data obtained by generating video data (graphics) for the user displaying a screen used for selection of an item or the like, and superimposing this on the video data of a program, to the panel driving circuit 320 as appropriate.

The panel driving circuit 320 drives the display panel 321 based on the data supplied from the graphics generating circuit 319 to display the video of a program, or the above-described various screens on the display panel 321.

The display panel 321 is made up of an LCD (Liquid Crystal Display) and so forth, and displays the video of a program or the like in accordance with the control by the panel driving circuit 320.

Also, the television receiver 300 also includes an audio A/D (Analog/Digital) conversion circuit 314, an audio signal processing circuit 322, an echo cancellation/audio synthesizing circuit 323, an audio amplifier circuit 324, and a speaker 325.

The terrestrial tuner 313 demodulates the received broadcast wave signal, thereby obtaining not only a video signal but also an audio signal. The terrestrial tuner 313 supplies the obtained audio signal to the audio A/D conversion circuit 314.

The audio A/D conversion circuit 314 subjects the audio signal supplied from the terrestrial tuner 313 to A/D conversion processing, and supplies the obtained digital audio signal to the audio signal processing circuit 322.

The audio signal processing circuit 322 subjects the audio data supplied from the audio A/D conversion circuit 314 to predetermined processing such as noise removal or the like, and supplies the obtained audio data to the echo cancellation/audio synthesizing circuit 323.

The echo cancellation/audio synthesizing circuit 323 supplies the audio data supplied from the audio signal processing circuit 322 to the audio amplifier circuit 324.

The audio amplifier circuit 324 subjects the audio data supplied from the echo cancellation/audio synthesizing circuit 323 to D/A conversion processing, subjects to amplifier processing to adjust to predetermined volume, and then outputs the audio from the speaker 325.

Further, the television receiver 300 also includes a digital tuner 316, and an MPEG decoder 317.

The digital tuner 316 receives the broadcast wave signals of a digital broadcast (terrestrial digital broadcast, BS (Broadcasting Satellite)/CS (Communications Satellite) digital broadcast) via the antenna, demodulates to obtain MPEG-TS (Moving Picture Experts Group-Transport Stream), and supplies this to the MPEG decoder 317.

The MPEG decoder 317 descrambles the scrambling given to the MPEG-TS supplied from the digital tuner 316, and extracts a stream including the data of a program serving as a playback object (viewing object). The MPEG decoder 317 decodes an audio packet making up the extracted stream, supplies the obtained audio data to the audio signal processing circuit 322, and also decodes a video packet making up the stream, and supplies the obtained video data to the video signal processing circuit 318. Also, the MPEG decoder 317 supplies EPG (Electronic Program Guide) data extracted from the MPEG-TS to a CPU 332 via an unshown path.

The television receiver 300 uses the above-described image decoding device 101 as the MPEG decoder 317 for decoding video packets in this way. Accordingly, in the same way as with the case of the image decoding device 101, in the event that the block size of the color difference signals is smaller than the block size of orthogonal transform, the MPEG decoder 317 generates a motion vector for a single block of color difference signals made to correspond to multiple luminance signal blocks, using motion vectors of the multiple luminance signal blocks. Accordingly, occurrence of non-zero coefficients due to orthogonal transform is reduced, so encoding efficiency can be improved. Also, memory access calculation has to be performed only once, so the necessary memory bandwidth can be reduced.

The video data supplied from the MPEG decoder 317 is, in the same way as with the case of the video data supplied from the video decoder 315, subjected to predetermined processing at the video signal processing circuit 318. The video data subjected to predetermined processing is then superimposed as appropriate on the generated video data and so forth at the graphics generating circuit 319, supplied to the display panel 321 via the panel driving circuit 320, and the image thereof is displayed thereon.

The audio data supplied from the MPEG decoder 317 is, in the same way as with the case of the audio data supplied from the audio A/D conversion circuit 314, subjected to predetermined processing at the audio signal processing circuit 322. The audio data subjected to predetermined processing is then supplied to the audio amplifier circuit 324 via the echo cancellation/audio synthesizing circuit 323, and subjected to D/A conversion processing and amplifier processing. As a result thereof, the audio adjusted in predetermined volume is output from the speaker 325.

Also, the television receiver 300 also includes a microphone 326, and an A/D conversion circuit 327.

The A/D conversion circuit 327 receives the user's audio signal collected by the microphone 326 provided to the television receiver 300 serving as for audio conversation. The A/D conversion circuit 327 subjects the received audio signal to A/D conversion processing, and supplies the obtained digital audio data to the echo cancellation/audio synthesizing circuit 323.

In the event that the user (user A)'s audio data of the television receiver 300 has been supplied from the A/D conversion circuit 327, the echo cancellation/audio synthesizing circuit 323 perform echo cancellation with the user A's audio data taken as a object. After echo cancellation, the echo cancellation/audio synthesizing circuit 323 outputs audio data obtained by synthesizing with other audio data and so forth, from the speaker 325 via the audio amplifier circuit 324.

Further, the television receiver 300 also includes an audio codec 328, an internal bus 329, SDRAM (Synchronous Dynamic Random Access Memory) 330, flash memory 331, a CPU 332, a USB (Universal Serial Bus) I/F 333, and a network I/F 334.

The A/D conversion circuit 327 receives the user's audio signal collected by the microphone 326 provided to the television receiver 300 serving as for audio conversation. The A/D conversion circuit 327 subjects the received audio signal to A/D conversion processing, and supplies the obtained digital audio data to the audio codec 328.

The audio codec 328 converts the audio data supplied from the A/D conversion circuit 327 into the data of a predetermined format for transmission via a network, and supplies to the network I/F 334 via the internal bus 329.

The network I/F 334 is connected to the network via a cable mounted on a network terminal 335. The network I/F 334 transmits the audio data supplied from the audio codec 328 to another device connected to the network thereof, for example. Also, the network I/F 334 receives, via the network terminal 335, the audio data transmitted from another device connected thereto via the network for example, and supplies this to the audio codec 328 via the internal bus 329.

The audio codec 328 converts the audio data supplied from the network I/F 334 into the data of a predetermined format, and supplies this to the echo cancellation/audio synthesizing circuit 323.

The echo cancellation/audio synthesizing circuit 323 performs echo cancellation with the audio data supplied from the audio codec 328 taken as a object, and outputs the data of audio obtained by synthesizing with other audio data and so forth, from the speaker 325 via the audio amplifier circuit 324.

The SDRAM 330 stores various types of data necessary for the CPU 332 performing processing.

The flash memory 331 stores a program to be executed by the CPU 332. The program stored in the flash memory 331 is read out by the CPU 332 at predetermined timing such as when activating the television receiver 300, or the like. EPG data obtained via a digital broadcast, data obtained from a predetermined server via the network, and so forth are also stored in the flash memory 331.

For example, MPEG-TS including the content data obtained from a predetermined server via the network by the control of the CPU 332 is stored in the flash memory 331. The flash memory 331 supplies the MPEG-TS thereof to the MPEG decoder 317 via the internal bus 329 by the control of the CPU 332, for example.

The MPEG decoder 317 processes the MPEG-TS thereof in the same way as with the case of the MPEG-TS supplied from the digital tuner 316. In this way, the television receiver 300 receives the content data made up of video, audio, and so forth via the network, decodes using the MPEG decoder 317, whereby video thereof can be displayed, and audio thereof can be output.

Also, the television receiver 300 also includes a light reception unit 337 for receiving the infrared signal transmitted from a remote controller 351.

The light reception unit 337 receives infrared rays from the remote controller 351, and outputs a control code representing the content of the user's operation obtained by demodulation, to the CPU 332.

The CPU 332 executes the program stored in the flash memory 331 to control the entire operation of the television receiver 300 according to the control code supplied from the light reception unit 337, and so forth. The CPU 332, and the units of the television receiver 300 are connected via an unshown path.

The USB I/F 333 performs transmission/reception of data as to an external device of the television receiver 300 which is connected via a USB cable mounted on a USB terminal 336. The network I/F 334 connects to the network via a cable mounted on the network terminal 335, also performs transmission/reception of data other than audio data as to various devices connected to the network.

The television receiver 300 uses the image decoding device 101 as the MPEG decoder 317, whereby encoding efficiency can be improved. As a result thereof, the television receiver 300 can obtain a decoded image with higher precision from broadcast wave signals received via the antenna, or the content data obtained via the network, and display this.

[Configuration Example of Cellular Phone]

FIG. 31 is a block diagram illustrating a principal configuration example of a cellular phone using the image encoding device and image decoding device to which the present invention has been applied.

A cellular phone 400 shown in FIG. 31 includes a main control unit 450 configured so as to integrally control the units, a power supply circuit unit 451, an operation input control unit 452, an image encoder 453, a camera I/F unit 454, an LCD control unit 455, an image decoder 456, a multiplexing/separating unit 457, a recording/playback unit 462, a modulation/demodulation circuit unit 458, and an audio codec 459. These are mutually connected via a bus 460.

Also, the cellular phone 400 includes operation keys 419, a CCD (Charge Coupled Devices) camera 416, a liquid crystal display 418, a storage unit 423, a transmission/reception circuit unit 463, an antenna 414, a microphone (MIC) 421, and a speaker 417.

Upon a call being ended and a power key being turned on by the user's operation, the power supply circuit unit 451 activates the cellular phone 400 in an operational state by supplying power to the units from a battery pack.

The cellular phone 400 performs various operations such as transmission/reception of an audio signal, transmission/reception of an e-mail and image data, image shooting, data recoding, and so forth, in various modes such as a voice call mode, a data communication mode, and so forth, under control of a main control unit 450 made up of a CPU, ROM, RAM, and so forth.

For example, in the voice call mode, the cellular phone 400 converts the audio signal collected by the microphone (MIC) 421 into digital audio data by the audio codec 459, subjects this to spectrum spread processing at the modulation/demodulation circuit unit 458, subjects this to digital/analog conversion processing and frequency conversion processing at the transmission/reception circuit unit 463. The cellular phone 400 transmits the signal for transmission obtained by the conversion processing thereof to an unshown base station via the antenna 414. The signal for transmission (audio signal) transmitted to the base station is supplied to the communication partner's cellular phone via the public telephone network.

Also, for example, in the voice call mode, the cellular phone 400 amplifies the reception signal received at the antenna 414, at the transmission/reception circuit unit 463, further subjects to frequency conversion processing and analog/digital conversion processing, subjects to spectrum inverse spread processing at the modulation/demodulation circuit unit 458, and converts into an analog audio signal by the audio codec 459. The cellular phone 400 outputs the converted and obtained analog audio signal thereof from the speaker 417.

Further, for example, in the event of transmitting an e-mail in the data communication mode, the cellular phone 400 accepts the text data of the e-mail input by the operation of the operation keys 419 at the operation input control unit 452. The cellular phone 400 processes the text data thereof at the main control unit 450, and displays on the liquid crystal display 418 via the LCD control unit 455 as an image.

Also, the cellular phone 400 generates e-mail data at the main control unit 450 based on the text data accepted by the operation input control unit 452, the user's instructions, and so forth. The cellular phone 400 subjects the e-mail data thereof to spectrum spread processing at the modulation/demodulation circuit unit 458, and subjects to digital/analog conversion processing and frequency conversion processing at the transmission/reception circuit unit 463. The cellular phone 400 transmits the signal for transmission obtained by the conversion processing thereof to an unshown base station via the antenna 414. The signal for transmission (e-mail) transmitted to the base station is supplied to a predetermined destination via the network, mail server, and so forth.

Also, for example, in the event of receiving an e-mail in the data communication mode, the cellular phone 400 receives the signal transmitted from the base station via the antenna 414 with the transmission/reception circuit unit 463, amplifies, and further subjects to frequency conversion processing and analog/digital conversion processing. The cellular phone 400 subjects the reception signal thereof to spectrum inverse spread processing at the modulation/demodulation circuit unit 458 to restore the original e-mail data. The cellular phone 400 displays the restored e-mail data on the liquid crystal display 418 via the LCD control unit 455.

Note that the cellular phone 400 may record (store) the received e-mail data in the storage unit 423 via the recording/playback unit 462.

This storage unit 423 is an optional rewritable storage medium. The storage unit 423 may be, for example, semiconductor memory such as RAM, built-in flash memory, or the like, may be a hard disk, or may be a removable medium such as a magnetic disk, a magneto-optical disk, an optical disc, USB memory, a memory card, or the like. It goes without saying that the storage unit 423 may be other than these.

Further, for example, in the event of transmitting image data in the data communication mode, the cellular phone 400 generates image data by imaging at the CCD camera 416. The CCD camera 416 includes a CCD serving as an optical device such as a lens, diaphragm, and so forth, and serving as a photoelectric device, which images a subject, converts the intensity of received light into an electrical signal, and generates the image data of an image of the subject. The image data thereof is subjected to compression encoding at the image encoder 453 using a predetermined encoding format, for example, such as MPEG2, MPEG4, or the like, via the camera I/F unit 454, and accordingly, the image data thereof is converted into encoded image data.

The cellular phone 400 employs the above-described image encoding device 51 as the image encoder 453 for performing such processing. Accordingly, in the same way as with the case of the image encoding device 51, in the event that the block size of the color difference signals is smaller than the block size of orthogonal transform, the image encoder 453 generates a motion vector for a single block of color difference signals made to correspond to multiple luminance signal blocks, using motion vectors of the multiple luminance signal blocks. Accordingly, occurrence of non-zero coefficients due to orthogonal transform is reduced, so encoding efficiency can be improved. Also, memory access calculation has to be performed only once, so the necessary memory bandwidth can be reduced.

Note that, at this time simultaneously, the cellular phone 400 converts the audio collected at the microphone (MIC) 421 from analog to digital at the audio codec 459, and further encodes this during imaging by the CCD camera 416.

The cellular phone 400 multiplexes the encoded image data supplied from the image encoder 453, and the digital audio data supplied from the audio codec 459 at the multiplexing/separating unit 457 using a predetermined method. The cellular phone 400 subjects the multiplexed data obtained as a result thereof to spectrum spread processing at the modulation/demodulation circuit unit 458, and subjects to digital/analog conversion processing and frequency conversion processing at the transmission/reception circuit unit 463. The cellular phone 400 transmits the signal for transmission obtained by the conversion processing thereof to an unshown base station via the antenna 414. The signal for transmission (image data) transmitted to the base station is supplied to the communication partner via the network or the like.

Note that in the event that image data is not transmitted, the cellular phone 400 may also display the image data generated at the CCD camera 416 on the liquid crystal display 418 via the LCD control unit 455 instead of the image encoder 453.

Also, for example, in the event of receiving the data of a moving image file linked to a simple website or the like in the data communication mode, the cellular phone 400 receives the signal transmitted from the base station at the transmission/reception circuit unit 463 via the antenna 414, amplifies, and further subjects to frequency conversion processing and analog/digital conversion processing. The cellular phone 400 subjects the received signal to spectrum inverse spread processing at the modulation/demodulation circuit unit 458 to restore the original multiplexed data. The cellular phone 400 separates the multiplexed data thereof at the multiplexing/separating unit 457 into encoded image data and audio data.

The cellular phone 400 decodes the encoded image data at the image decoder 456 using the decoding format corresponding to a predetermined encoding format such as MPEG2, MPEG4, or the like, thereby generating playback moving image data, and displays this on the liquid crystal display 418 via the LCD control unit 455. Thus, moving image data included in a moving image file linked to a simple website is displayed on the liquid crystal display 418, for example.

The cellular phone 400 employs the above-described image decoding device 101 as the image decoder 456 for performing such processing. Accordingly, in the same way as with the image decoding device 101, in the event that the block size of color difference signals is smaller than the orthogonal transform block size, the image decoder 456 generates a motion vector for a single color difference signal block corresponding to multiple luminance signal blocks, using the motion vectors of the multiple luminance signal blocks. Accordingly, occurrence of non-zero coefficients due to orthogonal transform is reduced, so encoding efficiency can be improved. Also, memory access calculation has to be performed only once, so the necessary memory bandwidth can be reduced.

At this time, simultaneously, the cellular phone 400 converts the digital audio data into an analog audio signal at the audio codec 459, and outputs this from the speaker 417. Thus, audio data included in a moving image file linked to a simple website is played, for example.

Note that, in the same way as with the case of e-mail, the cellular phone 400 may record (store) the received data liked to a simile website or the like in the storage unit 423 via the recording/playback unit 462.

Also, the cellular phone 400 analyzes the two-dimensional code obtained by being imaged by the CCD camera 416 at the main control unit 450, whereby information recorded in the two-dimensional code can be obtained.

Further, the cellular phone 400 can communicate with an external device at the infrared communication unit 481 using infrared rays.

The cellular phone 400 employs the image encoding device 51 as the image encoder 453, whereby high-speed processing can be realized, and also the encoding efficiency can be improved. As a result, the cellular phone 400 can provide encoded data (image data) with excellent encoding efficiency to another device at higher speeds.

Also, the cellular phone 400 employs the image decoding device 101 as the image decoder 456, whereby high-speed processing can be realized, and also encoding efficiency can be improved. As a result thereof, the cellular phone 400 can obtain a decoded image with higher precision from a moving image file linked to a simple website, and display this, at higher speeds, for example.

Note that description has been made so far wherein the cellular phone 400 employs the CCD camera 416, but the cellular phone 400 may employ an image sensor (CMOS image sensor) using CMOS (Complementary Metal Oxide Semiconductor) instead of this CCD camera 416. In this case as well, the cellular phone 400 can image a subject and generate the image data of an image of the subject in the same way as with the case of employing the CCD camera 416.

Also, description has been made so far regarding the cellular phone 400, but the image encoding device 51 and image decoding device 101 may be applied to any kind of device in the same way as with the case of the cellular phone 400 as long as it is a device having the same imaging function and communication function as those of the cellular phone 400, for example, such as a PDA (Personal Digital Assistants), smart phone, UMPC (Ultra Mobile Personal Computer), net book, notebook-sized personal computer, or the like.

[Configuration Example of Hard Disk Recorder]

FIG. 32 is a block diagram illustrating a principal configuration example of a hard disk recorder which employs the image encoding device and image decoding device to which the present invention has been applied.

A hard disk recorder (HDD recorder) 500 shown in FIG. 32 is a device which stores, in a built-in hard disk, audio data and video data of a broadcast program included in broadcast wave signals (television signals) received by a tuner and transmitted from a satellite or a terrestrial antenna or the like, and provides the stored data to the user at timing according to the user's instructions.

The hard disk recorder 500 can extract audio data and video data from broadcast wave signals, decode these as appropriate, and store in the built-in hard disk, for example. Also, the hard disk recorder 500 can also obtain audio data and video data from another device via the network, decode these as appropriate, and store in the built-in hard disk, for example.

Further, the hard disk recorder 500 decodes audio data and video data recorded in the built-in hard disk, supplies to a monitor 560, and displays an image thereof on the screen of the monitor 560, for example. Also, the hard disk recorder 500 can output sound thereof from the speaker of the monitor 560.

The hard disk recorder 500 decodes audio data and video data extracted from the broadcast wave signals obtained via the tuner, or the audio data and video data obtained from another device via the network, supplies to the monitor 560, and displays an image thereof on the screen of the monitor 560, for example. Also, the hard disk recorder 500 can output sound thereof from the speaker of the monitor 560.

It goes without saying that operations other than these may be performed.

As shown in FIG. 32, the hard disk recorder 500 includes a reception unit 521, a demodulation unit 522, a demultiplexer 523, an audio decoder 524, a video decoder 525, and a recorder control unit 526. The hard disk recorder 500 further includes EPG data memory 527, program memory 528, work memory 529, a display converter 530, an OSD (On Screen Display) control unit 531, a display control unit 532, a recording/playback unit 533, a D/A converter 534, and a communication unit 535.

Also, the display converter 530 includes a video encoder 541. The recording/playback unit 533 includes an encoder 551 and a decoder 552.

The reception unit 521 receives the infrared signal from the remote controller (not shown), converts into an electrical signal, and outputs to the recorder control unit 526. The recorder control unit 526 is configured of, for example, a microprocessor and so forth, and executes various types of processing in accordance with the program stored in the program memory 528. At this time, the recorder control unit 526 uses the work memory 529 according to need.

The communication unit 535, which is connected to the network, performs communication processing with another device via the network. For example, the communication unit 535 is controlled by the recorder control unit 526 to communicate with a tuner (not shown), and to principally output a channel selection control signal to the tuner.

The demodulation unit 522 demodulates the signal supplied from the tuner, and outputs to the demultiplexer 523. The demultiplexer 523 separates the data supplied from the demodulation unit 522 into audio data, video data, and EPG data, and outputs to the audio decoder 524, video decoder 525, and recorder control unit 526, respectively.

The audio decoder 524 decodes the input audio data, for example, using the MPEG format, and outputs to the recording/playback unit 533. The video decoder 525 decodes the input video data, for example, using the MPEG format, and outputs to the display converter 530. The recorder control unit 526 supplies the input EPG data to the EPG data memory 527 for storing.

The display converter 530 encodes the video data supplied from the video decoder 525 or recorder control unit 526 into, for example, the video data conforming to the NTSC (National Television Standards Committee) format using the video encoder 541, and outputs to the recording/playback unit 533. Also, the display converter 530 converts the size of the screen of the video data supplied from the video decoder 525 or recorder control unit 526 into the size corresponding to the size of the monitor 560. The display converter 530 further converts the video data of which the screen size has been converted into the video data conforming to the NTSC format using the video encoder 541, converts into an analog signal, and outputs to the display control unit 532.

The display control unit 532 superimposes, under the control of the recorder control unit 526, the OSD signal output from the OSD (On Screen Display) control unit 531 on the video signal input from the display converter 530, and outputs to the display of the monitor 560 for display.

Also, the audio data output from the audio decoder 524 has been converted into an analog signal using the D/A converter 534, and supplied to the monitor 560. The monitor 560 outputs this audio signal from a built-in speaker.

The recording/playback unit 533 includes a hard disk as a storage medium in which video data, audio data, and so forth are recorded.

The recording/playback unit 533 encodes the audio data supplied from the audio decoder 524 by the encoder 551 using the MPEG format, for example. Also, the recording/playback unit 533 encodes the video data supplied from the video encoder 541 of the display converter 530 by the encoder 551 using the MPEG format. The recording/playback unit 533 synthesizes the encoded data of the audio data thereof, and the encoded data of the video data thereof using the multiplexer. The recording/playback unit 533 amplifies the synthesized data by channel coding, and writes the data thereof in the hard disk via a recording head.

The recording/playback unit 533 plays the data recorded in the hard disk via a playback head, amplifies, and separates into audio data and video data using the demultiplexer. The recording/playback unit 533 decodes the audio data and video data by the decoder 552 using the MPEG format. The recording/playback unit 533 converts the decoded audio data from digital to analog, and outputs to the speaker of the monitor 560. Also, the recording/playback unit 533 converts the decoded video data from digital to analog, and outputs to the display of the monitor 560.

The recorder control unit 526 reads out the latest EPG data from the EPG data memory 527 based on the user's instructions indicated by the infrared signal from the remote controller which is received via the reception unit 521, and supplies to the OSD control unit 531. The OSD control unit 531 generates image data corresponding to the input EPG data, and outputs to the display control unit 532. The display control unit 532 outputs the video data input from the OSD control unit 531 to the display of the monitor 560 for display. Thus, EPG (Electronic Program Guide) is displayed on the display of the monitor 560.

Also, the hard disk recorder 500 can obtain various types of data such as video data, audio data, EPG data, and so forth supplied from another device via the network such as the Internet or the like.

The communication unit 535 is controlled by the recorder control unit 526 to obtain encoded data such as video data, audio data, EPG data, and so forth transmitted from another device via the network, and to supply this to the recorder control unit 526. The recorder control unit 526 supplies the encoded data of the obtained video data and audio data to the recording/playback unit 533, and stores in the hard disk, for example. At this time, the recorder control unit 526 and recording/playback unit 533 may perform processing such as re-encoding or the like according to need.

Also, the recorder control unit 526 decodes the encoded data of the obtained video data and audio data, and supplies the obtained video data to the display converter 530. The display converter 530 processes, in the same way as the video data supplied from the video decoder 525, the video data supplied from the recorder control unit 526, supplies to the monitor 560 via the display control unit 532 for displaying an image thereof.

Alternatively, an arrangement may be made wherein in accordance with this image display, the recorder control unit 526 supplies the decoded audio data to the monitor 560 via the D/A converter 534, and outputs audio thereof from the speaker.

Further, the recorder control unit 526 decodes the encoded data of the obtained EPG data, and supplies the decoded EPG data to the EPG data memory 527.

The hard disk recorder 500 thus configured employs the image decoding device 101 as the video decoder 525, decoder 552, and a decoder housed in the recorder control unit 526. Accordingly, in the same way as with the image decoding device 101, in the event that the block size of color difference signals is smaller than the orthogonal transform block size, the video decoder 525, decoder 552, and decoder housed in the recorder control unit 526 generate a motion vector for a single color difference signal block corresponding to multiple luminance signal blocks, using the motion vectors of the multiple luminance signal blocks. Accordingly, occurrence of non-zero coefficients due to orthogonal transform is reduced, so encoding efficiency can be improved. Also, memory access calculation has to be performed only once, so the necessary memory bandwidth can be reduced.

Accordingly, the hard disk recorder 500 can realize high-speed processing. As a result thereof, the hard disk recorder 500 can obtain a decoded image, for example, from the encoded data of video data received via the tuner, the encoded data of video data read out from the hard disk of the recording/playback unit 533, or the encoded data of video data obtained via the network, and display on the monitor 560, at higher speeds.

Also, the hard disk recorder 500 employs the image encoding device 51 as the encoder 551. Accordingly, in the same way as with the encoder 551, in the event that the block size of the color difference signal is smaller than the orthogonal transform block size, the encoder 551 generates the motion vector of a single color difference signal block corresponding to multiple luminance signal blocks, using the motion vectors of the multiple luminance signal blocks. Accordingly, occurrence of non-zero coefficients due to orthogonal transform is reduced, so encoding efficiency can be improved. Also, memory access calculation has to be performed only once, so the necessary memory bandwidth can be reduced.

Accordingly, the hard disk recorder 500 can realize high-speed processing, and also improve the encoding efficiency of encoded data to be recorded in the hard disk, for example. As a result thereof, the hard disk recorder 500 can use the storage region of the hard disk more efficiently.

Note that description has been made so far regarding the hard disk recorder 500 for recording video data and audio data in the hard disk, but it goes without saying that any kind of recording medium may be employed. For example, even with a recorder to which a recording medium other than a hard disk, such as flash memory, optical disc, a video tape, or the like, is applied, in the same way as with the case of the above-described hard disk recorder 500, the image encoding device 51 and image decoding device 101 can be applied thereto.

[Configuration Example of Camera]

FIG. 33 is a block diagram illustrating a principal configuration example of a camera employing the image decoding device and image encoding device to which the present invention has been applied.

A camera 600 shown in FIG. 33 images a subject, displays an image of the subject on an LCD 616, and records this in a recording medium 633 as image data.

A lens block 611 inputs light (i.e., video of a subject) to a CCD/CMOS 612. The CCD/CMOS 612 is an image sensor employing a CCD or CMOS, converts the intensity of received light into an electrical signal, and supplies to a camera signal processing unit 613.

The camera signal processing unit 613 converts the electrical signal supplied from the CCD/CMOS 612 into color difference signals of Y, Cr, and Cb, and supplies to an image signal processing unit 614. The image signal processing unit 614 subjects, under the control of a controller 621, the image signal supplied from the camera signal processing unit 613 to predetermined image processing, or encodes the image signal thereof by an encoder 641 using the MPEG format for example. The image signal processing unit 614 supplies encoded data generated by encoding an image signal, to a decoder 615. Further, the image signal processing unit 614 obtains data for display generated at an on-screen display (OSD) 620, and supplies this to the decoder 615.

With the above-described processing, the camera signal processing unit 613 takes advantage of DRAM (Dynamic Random Access Memory) 618 connected via a bus 617 to hold image data, encoded data encoded from the image data thereof, and so forth in the DRAM 618 thereof according to need.

The decoder 615 decodes the encoded data supplied from the image signal processing unit 614, and supplies obtained image data (decoded image data) to the LCD 616. Also, the decoder 615 supplies the data for display supplied from the image signal processing unit 614 to the LCD 616. The LCD 616 synthesizes the image of the decoded image data, and the image of the data for display, supplied from the decoder 615 as appropriate, and displays a synthesizing image thereof.

The on-screen display 620 outputs, under the control of the controller 621, data for display such as a menu screen or icon or the like made up of a symbol, characters, or a figure to the image signal processing unit 614 via the bus 617.

Based on a signal indicating the content commanded by the user using an operating unit 622, the controller 621 executes various types of processing, and also controls the image signal processing unit 614, DRAM 618, external interface 619, on-screen display 620, media drive 623, and so forth via the bus 617. A program, data, and so forth necessary for the controller 621 executing various types of processing are stored in FLASH ROM 624.

For example, the controller 621 can encode image data stored in the DRAM 618, or decode encoded data stored in the DRAM 618 instead of the image signal processing unit 614 and decoder 615. At this time, the controller 621 may perform encoding and decoding processing using the same format as the encoding and decoding format of the image signal processing unit 614 and decoder 615, or may perform encoding and decoding processing using a format that neither the image signal processing unit 614 nor the decoder 615 can handle.

Also, for example, in the event that start of image printing has been instructed from the operating unit 622, the controller 621 reads out image data from the DRAM 618, and supplies this to a printer 634 connected to the external interface 619 via the bus 617 for printing.

Further, for example, in the event that image recording has been instructed from the operating unit 622, the controller 621 reads out encoded data from the DRAM 618, and supplies this to a recording medium 633 mounted on the media drive 623 via the bus 617 for storing.

The recording medium 633 is an optional readable/writable removable medium, for example, such as a magnetic tape, a magneto-optical disk, an optical disc, semiconductor memory, or the like. It goes without saying that the recording medium 633 is also optional regarding the type of a removable medium, and accordingly may be a tape device, or may be a disc, or may be a memory card. It goes without saying that the recoding medium 633 may be a non-contact IC card or the like.

Alternatively, the media drive 623 and the recording medium 633 may be configured so as to be integrated into a non-transportable recording medium such as a built-in hard disk drive, SSD (Solid State Drive), or the like.

The external interface 619 is configured of, for example, a USB input/output terminal and so forth, and is connected to the printer 634 in the event of performing printing of images. Also, a drive 631 is connected to the external interface 619 according to need, on which the removable medium 632 such as a magnetic disk, optical disc, or magneto-optical disk or the like is mounted as appropriate, and a computer program read out therefrom is installed in the FLASH ROM 624 according to need.

Further, the external interface 619 includes a network interface to be connected to a predetermined network such as a LAN, the Internet, or the like. For example, in accordance with the instructions from the operating unit 622, the controller 621 can read out encoded data from the DRAM 618, and supply this from the external interface 619 to another device connected via the network. Also, the controller 621 can obtain, via the external interface 619, encoded data or image data supplied from another device via the network, and hold this in the DRAM 618, or supply this to the image signal processing unit 614.

The camera 600 thus configured employs the image decoding device 101 as the decoder 615. Accordingly, in the same way as with the image decoding device 101, in the event that the block size of color difference signals is smaller than the orthogonal transform block size, the decoder 615 generates a motion vector for a single color difference signal block corresponding to multiple luminance signal blocks, using the motion vectors of the multiple luminance signal blocks. Accordingly, occurrence of non-zero coefficients due to orthogonal transform is reduced, so encoding efficiency can be improved. Also, memory access calculation has to be performed only once, so the necessary memory bandwidth can be reduced.

Accordingly, the camera 600 can realize high-speed processing, and also generate a prediction image with high precision. As a result thereof, the camera 600 can obtain a decoded image with higher precision, for example, from the image data generated at the CCD/CMOS 612, the encoded data of video data read out from the DRAM 618 or recording medium 633, or the encoded data of video data obtained via the network, and display on the LCD 616 at higher speeds.

Also, the camera 600 employs the image encoding device 51 as the encoder 641. Accordingly, in the same way as with the image decoding device 51, in the event that the block size of color difference signals is smaller than the orthogonal transform block size, the encoder 641 generates a motion vector for a single color difference signal block corresponding to multiple luminance signal blocks, using the motion vectors of the multiple luminance signal blocks. Accordingly, occurrence of non-zero coefficients due to orthogonal transform is reduced, so encoding efficiency can be improved. Also, memory access calculation has to be performed only once, so the necessary memory bandwidth can be reduced.

Accordingly, the camera 600 can improve encoding efficiency of encoded data to be recorded in the hard disk, for example. As a result thereof, the camera 600 can use the storage region of the DRAM 618 or recording medium 633 in a more effective manner at higher speeds.

Note that the decoding method of the image decoding device 101 may be applied to the decoding processing that the controller 621 performs. Similarly, the encoding format of the image encoding device 51 may be applied to the encoding processing that the controller 621 performs.

Also, the image data that the camera 600 image may be a moving image, or may be a still image.

It goes without saying that the image encoding device 51 and image decoding device 101 may be applied to a device or system other than the above-described devices.

REFERENCE SIGNS LIST

51 image encoding device
66 lossless encoding unit
74 intra prediction unit
75 motion prediction/compensation unit
76 color difference block determining unit
77 color difference motion vector determining unit
81 motion searching unit
82 mode determining unit
83 motion compensation unit
91 block categorizing unit
92 color difference motion vector generating unit
95 color difference prediction motion vector generating unit
96 color difference motion vector searching unit
101 image decoding device
112 lossless decoding unit
121 intra prediction unit
122 motion prediction/compensation unit
123 color difference motion vector precision determining unit
124 color difference block determining unit
131 motion vector buffer
132 mode information buffer
133 prediction image generating unit
141 block categorizing unit
142 color difference motion vector generating unit

The invention claimed is:

1. An image decoding method for decoding an image signal of a 4:2:0 format which comprises a N×N-sized luma block and a first (N/2)×(N/2)-sized chroma block corresponding to the N×N-sized luma block and a second (N/2)×(N/2)-sized chroma block corresponding to the N×N-sized luma block;
the method comprising:
partitioning the N×N-sized luma block into four (N/2)×(N/2)-sized luma sub-blocks;
decoding the four (N/2)×(N/2)-sized luma sub-blocks; and,
in the case where a size of the (N/2)×(N/2)-sized luma sub-block is greater than 4×4 pixels:
partitioning the first (N/2)×(N/2)-sized chroma block into four (N/4)×(N/4)-sized first chroma sub-blocks, and decoding the four (N/4)×(N/4)-sized first chroma sub-blocks, and
partitioning the second (N/2)×(N/2)-sized chroma block into four (N/4)×(N/4)-sized second chroma sub-blocks, and decoding the four (N/4)×(N/4)-sized second chroma sub-blocks; and,
in the case where the size of the (N/2)×(N/2)-sized luma sub-block is equal to 4×4 pixels:
decoding the first (N/2)×(N/2)-sized chroma block, without partitioning the first (N/2)×(N/2)-sized chroma block, by deriving a single motion vector of the first (N/2)×(N/2)-sized chroma block from a motion vector of one of the four (N/2)×(N/2)-sized luma sub-blocks, and
decoding the second (N/2)×(N/2)-sized chroma block, without partitioning the second (N/2)×(N/2)-sized chroma block, by deriving a single motion vector of the second (N/2)×(N/2)-sized chroma block from a motion vector of one of the four (N/2)×(N/2)-sized luma sub-blocks.

2. The image decoding method according to claim 1, wherein, the format is a color format written as Y/Cb/Cr;
a luma component is Y;
a first chroma component is Cb; and,
a second chroma component is Cr.

3. An image decoding apparatus comprising:
circuitry configured to:
decode an image signal of a 4:2:0 format which comprises a N×N-sized luma block and a first (N/2)×(N/2)-sized chroma block corresponding to the N×N-sized luma block and a second (N/2)×(N/2)-sized chroma block corresponding to the N×N-sized luma block;
partition the N×N-sized luma block into four (N/2)×(N/2)-sized luma sub-blocks;
decode the four (N/2)×(N/2)-sized luma sub-blocks; and,
in the case where a size of the (N/2)×(N/2)-sized luma sub-block is greater than 4×4 pixels:
partition the first (N/2)×(N/2)-sized chroma block into four (N/4)×(N/4)-sized first chroma sub-blocks, and decode the four (N/4)×(N/4)-sized first chroma sub-blocks, and
partition the second (N/2)×(N/2)-sized chroma block into four (N/4)×(N/4)-sized second chroma sub-blocks, and decode the four (N/4)×(N/4)-sized second chroma sub-blocks; and,
in the case where the size of the (N/2)×(N/2)-sized luma sub-block is equal to 4×4 pixels:
decode the first (N/2)×(N/2)-sized chroma block, without partitioning the first (N/2)×(N/2)-sized chroma block, by deriving a single motion vector of the first (N/2)×(N/2)-sized chroma block from a motion vector of one of the four (N/2)×(N/2)-sized luma sub-blocks, and
decode the second (N/2)×(N/2)-sized chroma block, without partitioning the second (N/2)×(N/2)-sized chroma block, by deriving a single motion vector of the second (N/2)×(N/2)-sized chroma block from a motion vector of one of the four (N/2)×(N/2)-sized luma sub-blocks.

4. The image decoding apparatus according to claim 3, wherein,
the format is a color format written as Y/Cb/Cr;
a luma component is Y;
a first chroma component is Cb; and,
a second chroma component is Cr.

5. A non-transitory computer-readable medium having embodied thereon a program, which when executed by a computer causes the computer to execute a method;
the method being suitable for decoding an image signal of a 4:2:0 format which comprises a N×N-sized luma block and a first (N/2)×(N/2)-sized chroma block corresponding to the N×N-sized luma block and a second (N/2)×(N/2)-sized chroma block corresponding to the N×N-sized luma block;

and, the method comprising:
- partitioning the N×N-sized luma block into four (N/2)×(N/2)-sized luma sub-blocks;
- decoding the four (N/2)×(N/2)-sized luma sub-blocks; and,
- in the case where a size of the (N/2)×(N/2)-sized luma sub-block is greater than 4×4 pixels:
  - partitioning the first (N/2)×(N/2)-sized chroma block into four (N/4)×(N/4)-sized first chroma sub-blocks, and decoding the four (N/4)×(N/4)-sized first chroma sub-blocks, and
  - partitioning the second (N/2)×(N/2)-sized chroma block into four (N/4)×(N/4)-sized second chroma sub-blocks, and decoding the four (N/4)×(N/4)-sized second chroma sub-blocks; and,
- in the case where the size of the (N/2)×(N/2)-sized luma sub-block is equal to 4×4 pixels:
  - decoding the first (N/2)×(N/2)-sized chroma block, without partitioning the first (N/2)×(N/2)-sized chroma block, by deriving a single motion vector of the first (N/2)×(N/2)-sized chroma block from a motion vector of one of the four (N/2)×(N/2)-sized luma sub-blocks, and
  - decoding the second (N/2)×(N/2)-sized chroma block, without partitioning the second (N/2)×(N/2)-sized chroma block, by deriving a single motion vector of the second (N/2)×(N/2)-sized chroma block from a motion vector of one of the four (N/2)×(N/2)-sized luma sub-blocks.

6. The non-transitory computer-readable medium according to claim 5, wherein,
- the format is a color format written as Y/Cb/Cr;
- a luma component is Y;
- a first chroma component is Cb; and,
- a second chroma component is Cr.

* * * * *